Inventors
ROBERT O. GUNDERSON
SIDNEY L. VALENTINE
MARTIN H. JURICK
PAUL HIGASHI

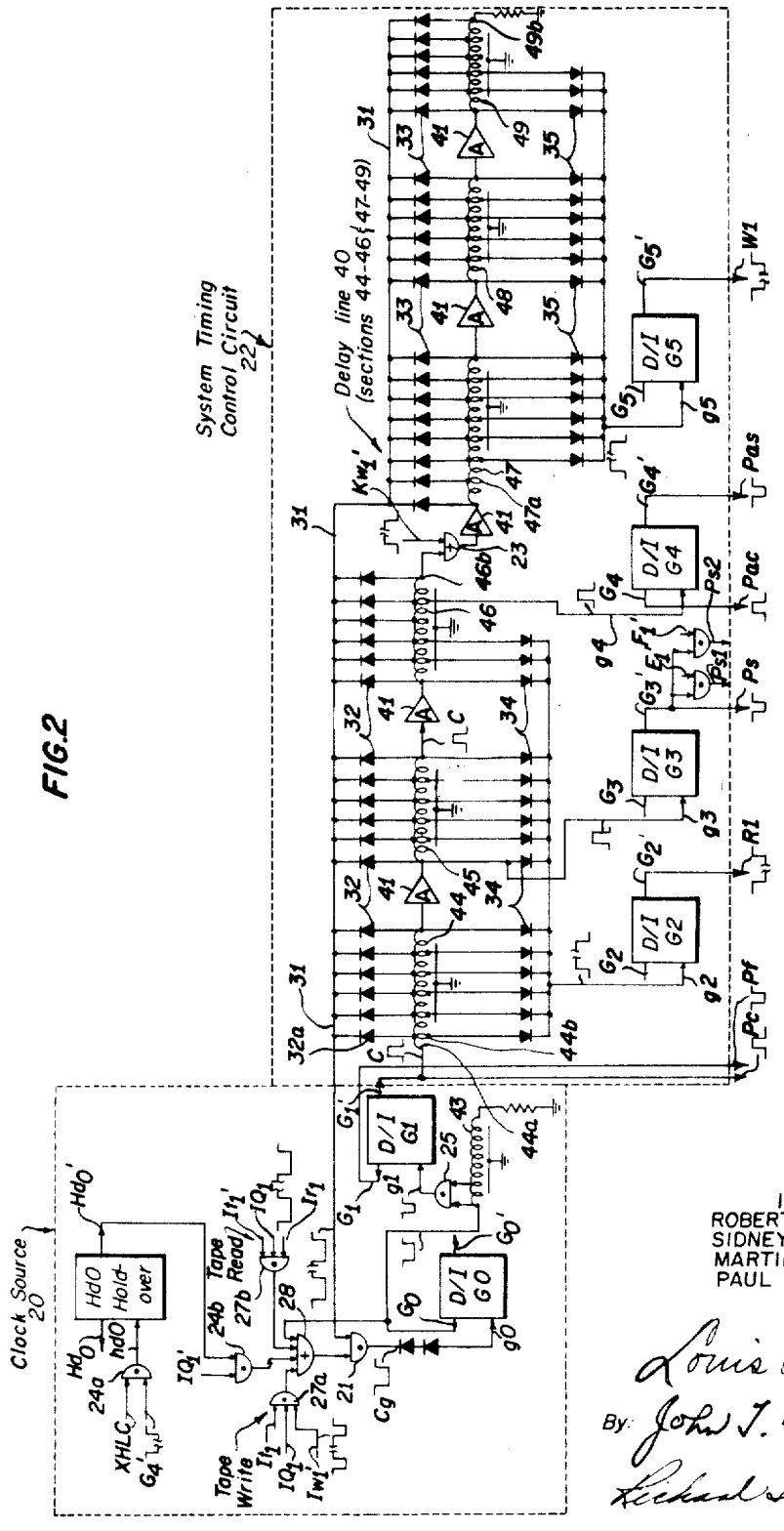

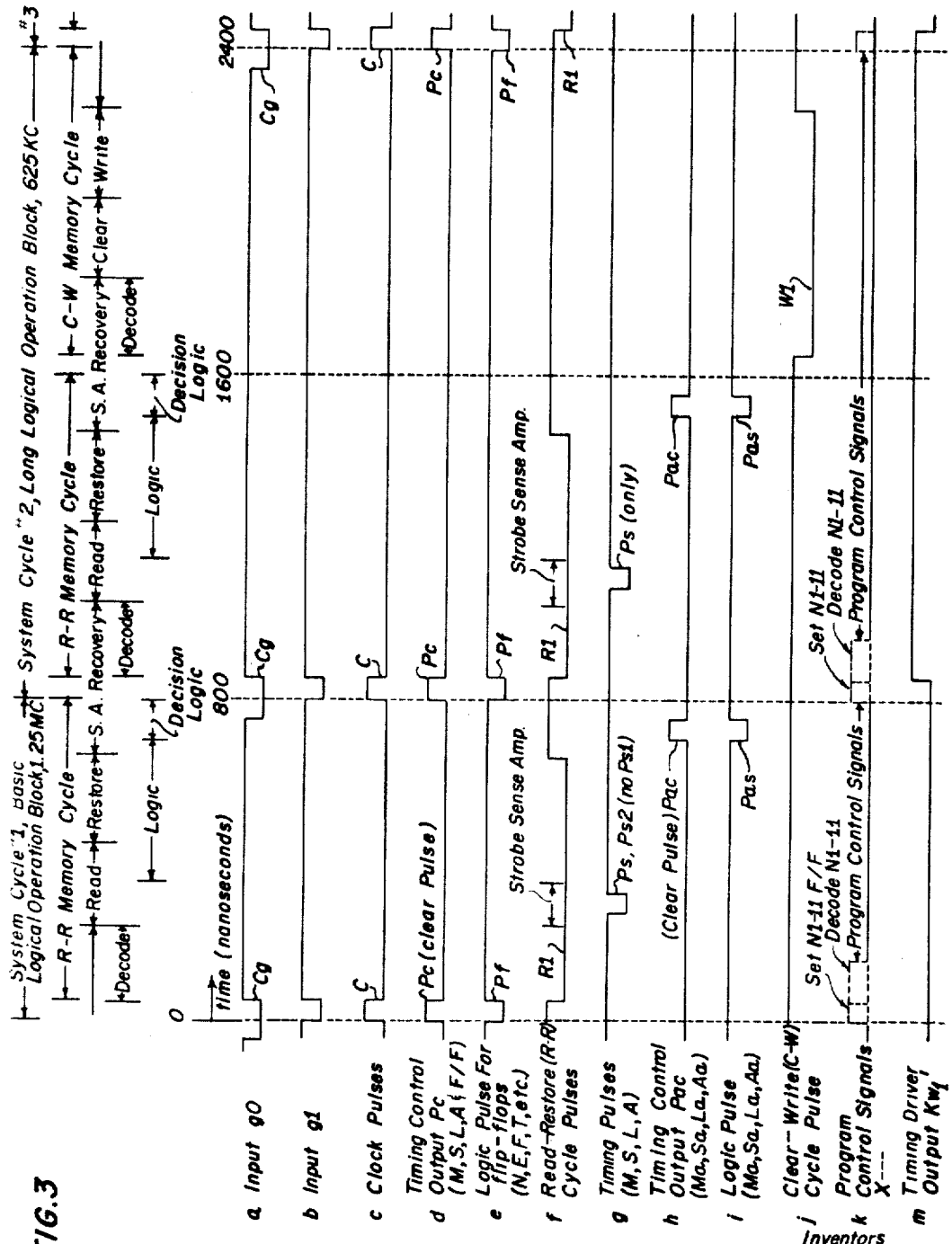

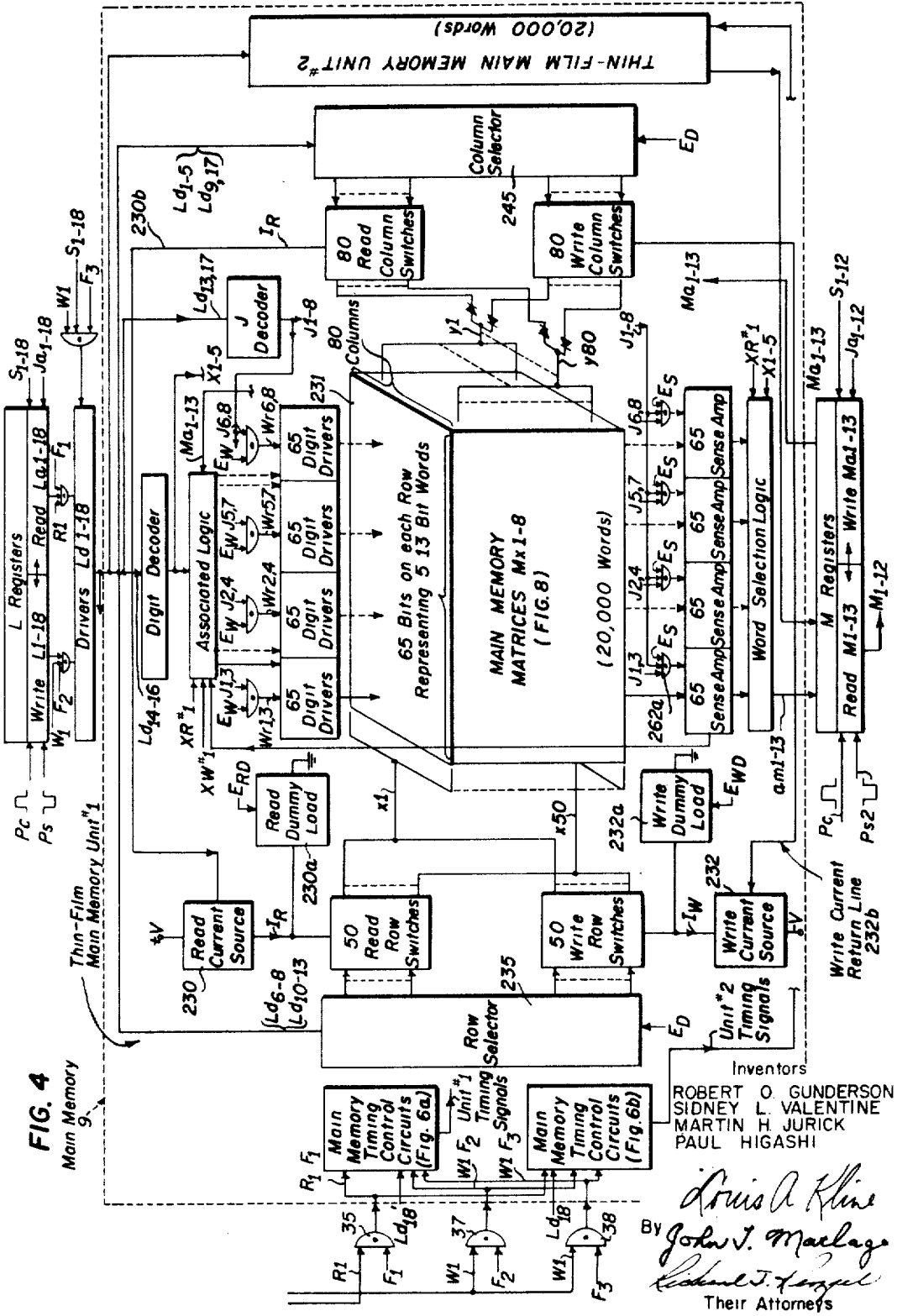

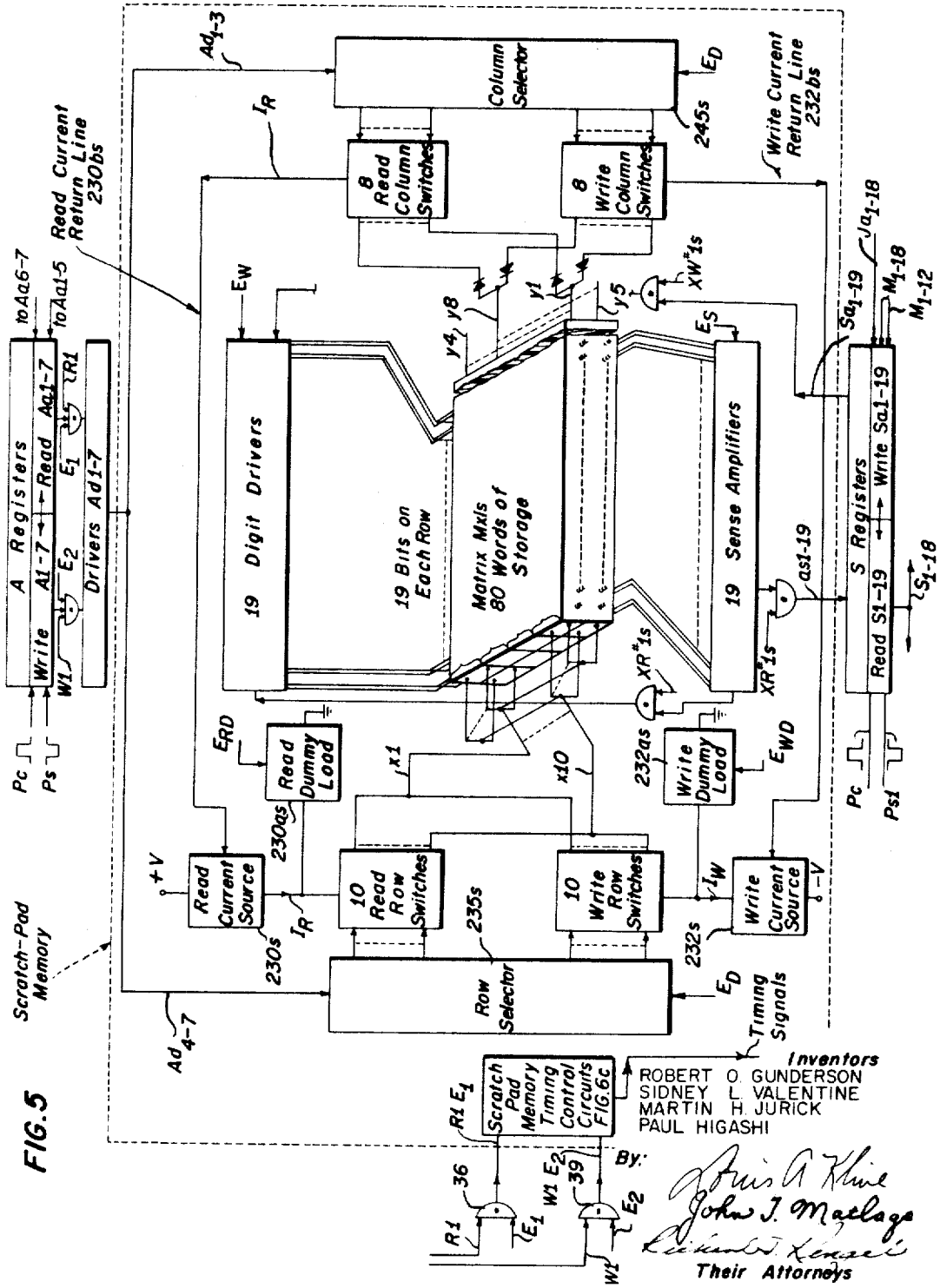

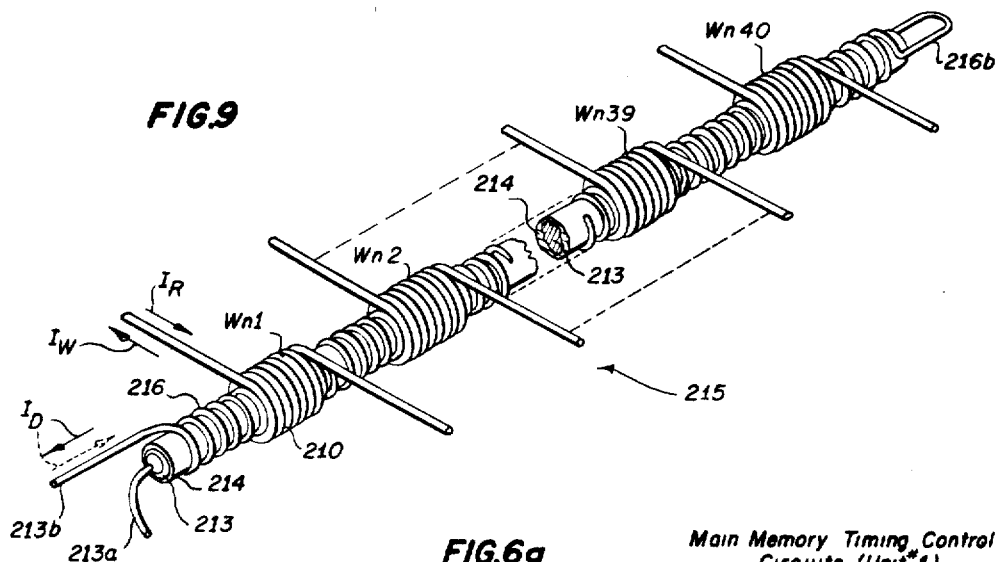
FIG.9
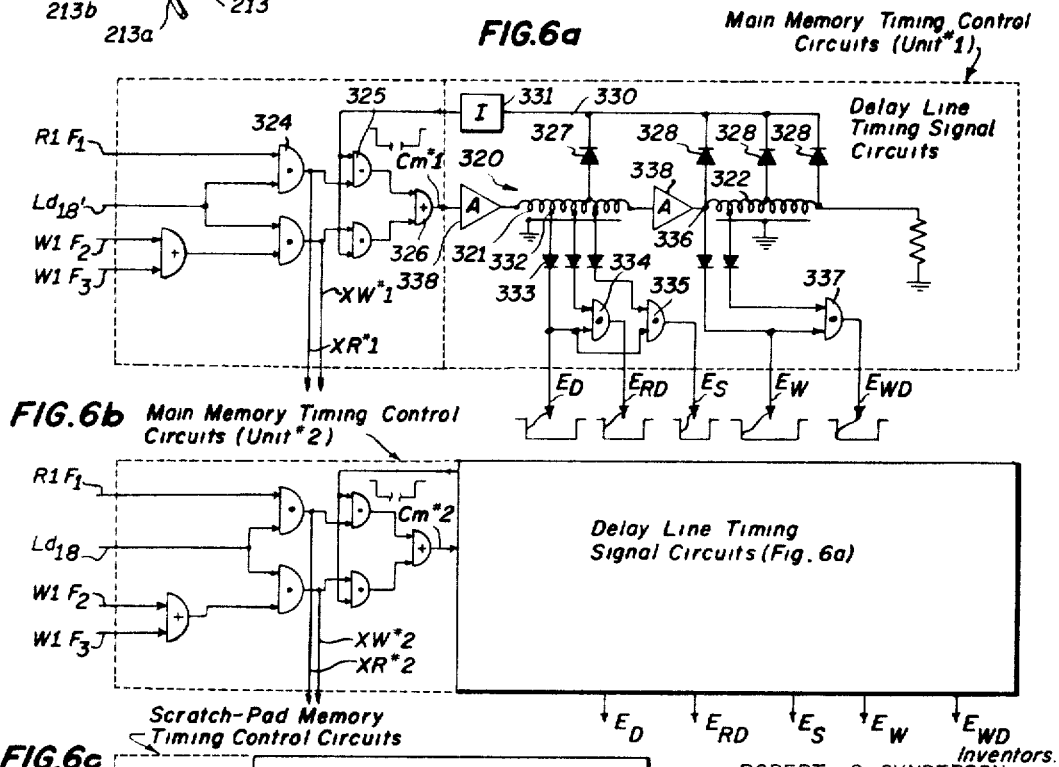
FIG.6a — Main Memory Timing Control Circuits (Unit #1)
FIG.6b — Main Memory Timing Control Circuits (Unit #2)
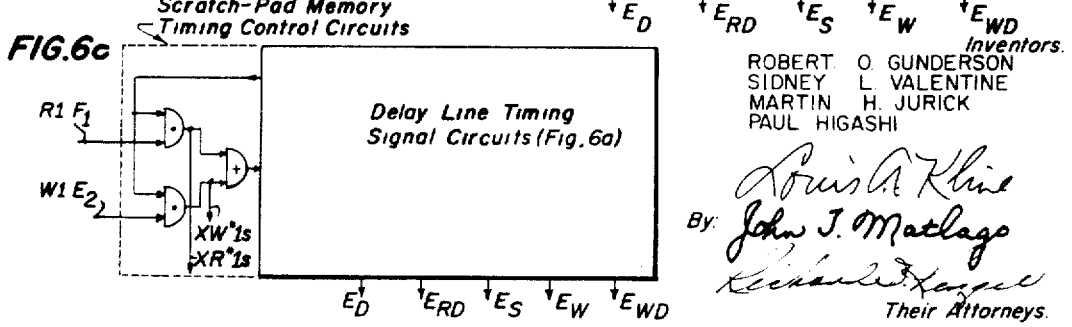
FIG.6c — Scratch-Pad Memory Timing Control Circuits
Inventors.
ROBERT O. GUNDERSON
SIDNEY L. VALENTINE
MARTIN H. JURICK
PAUL HIGASHI

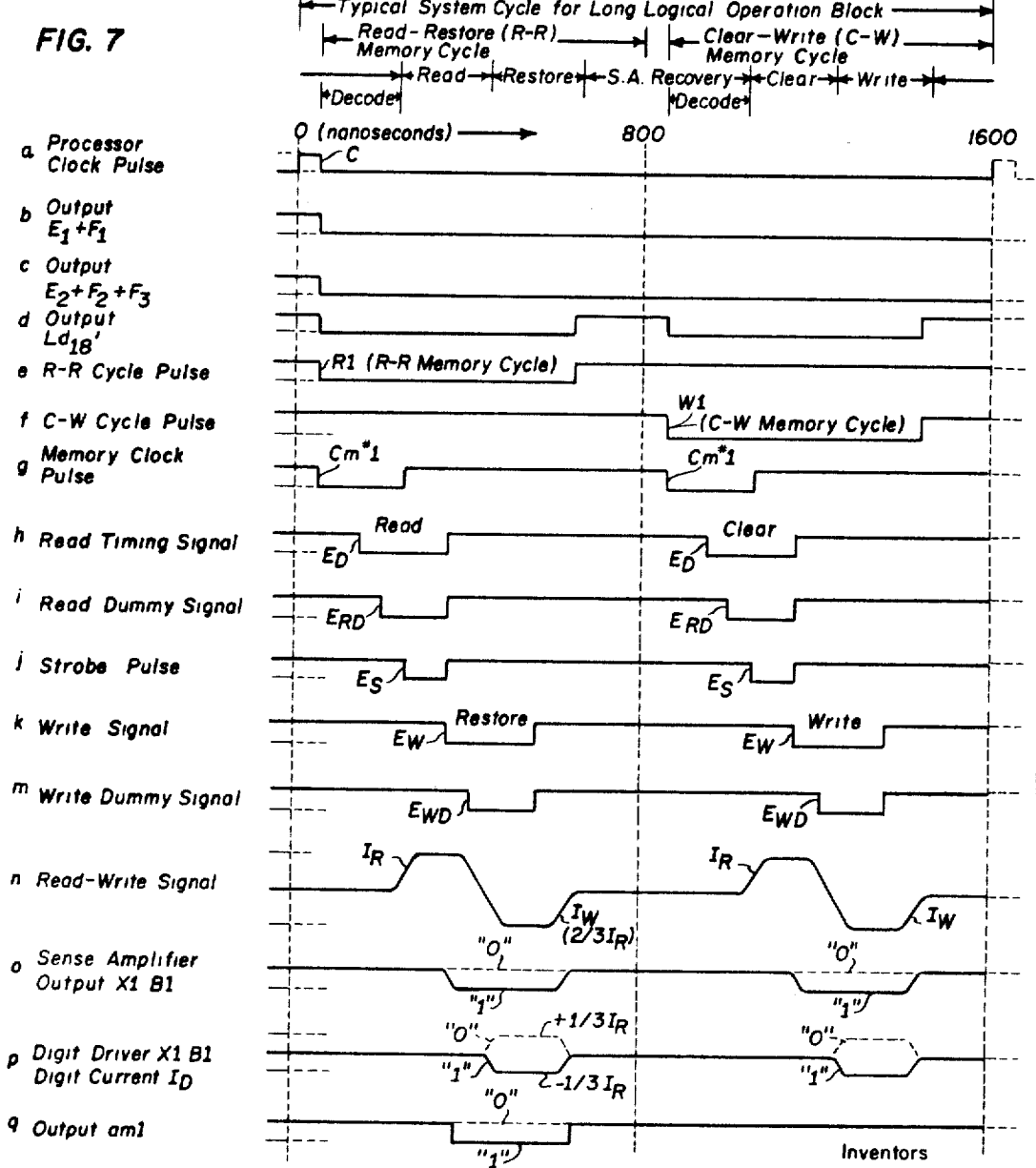

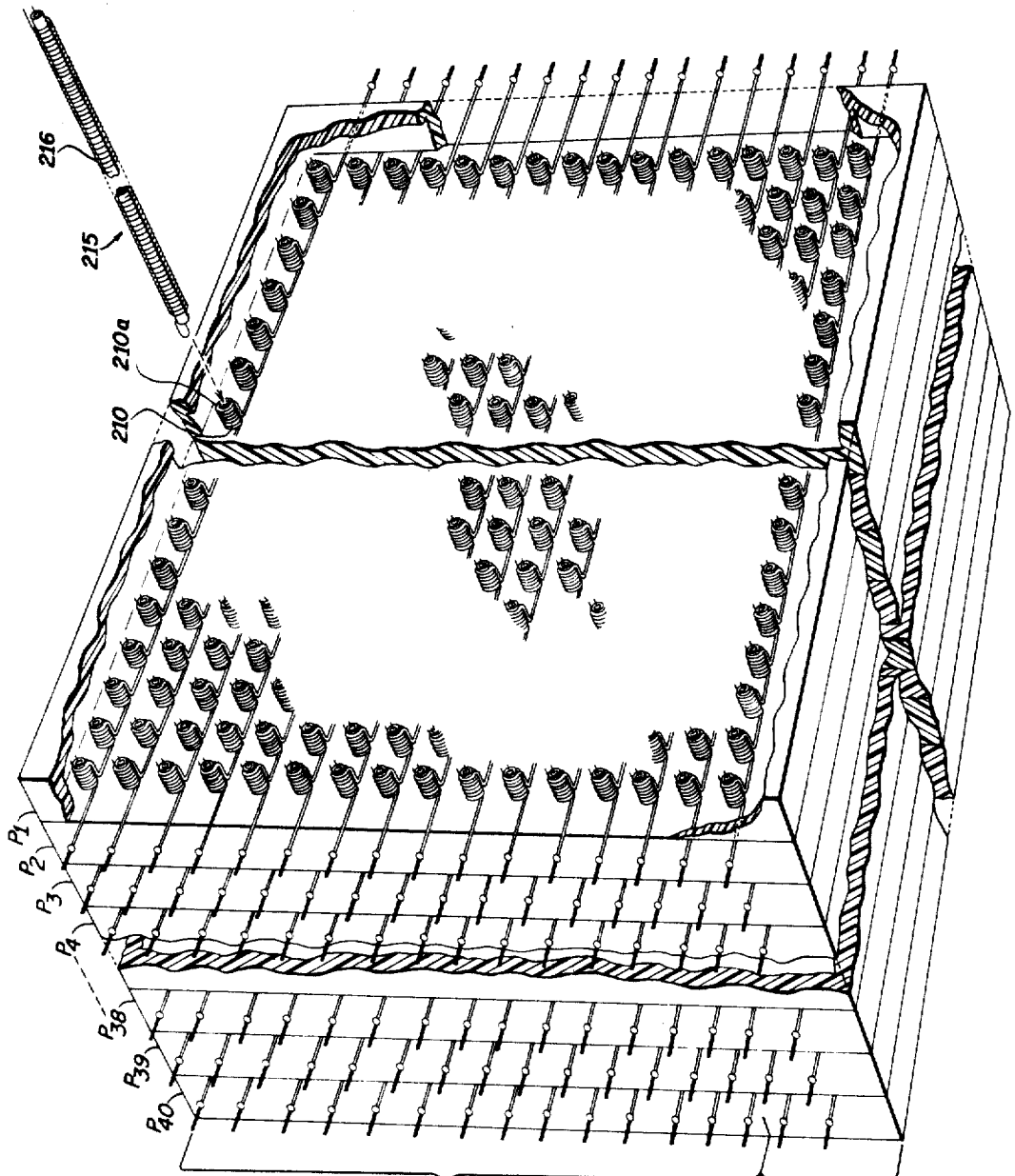

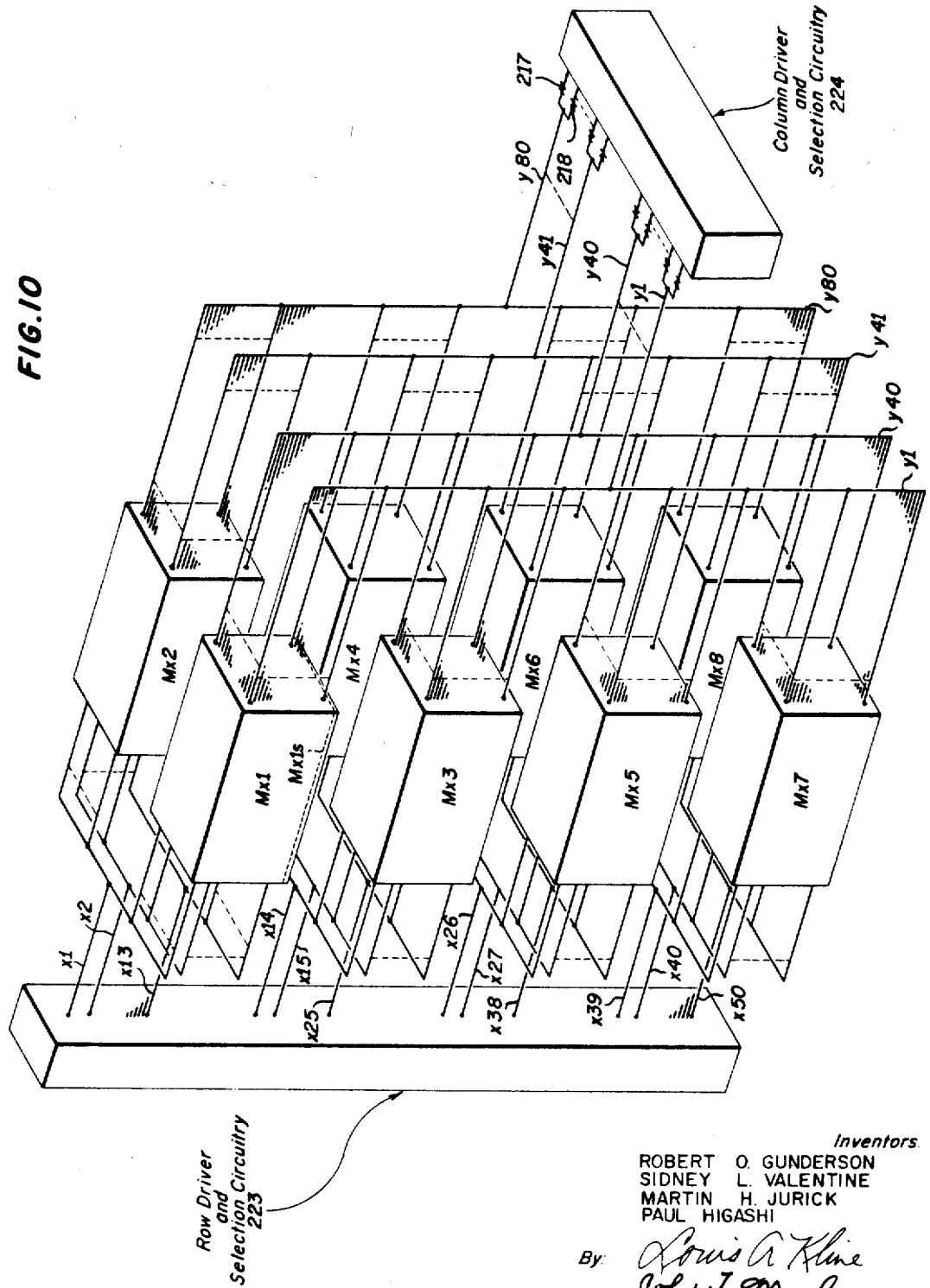

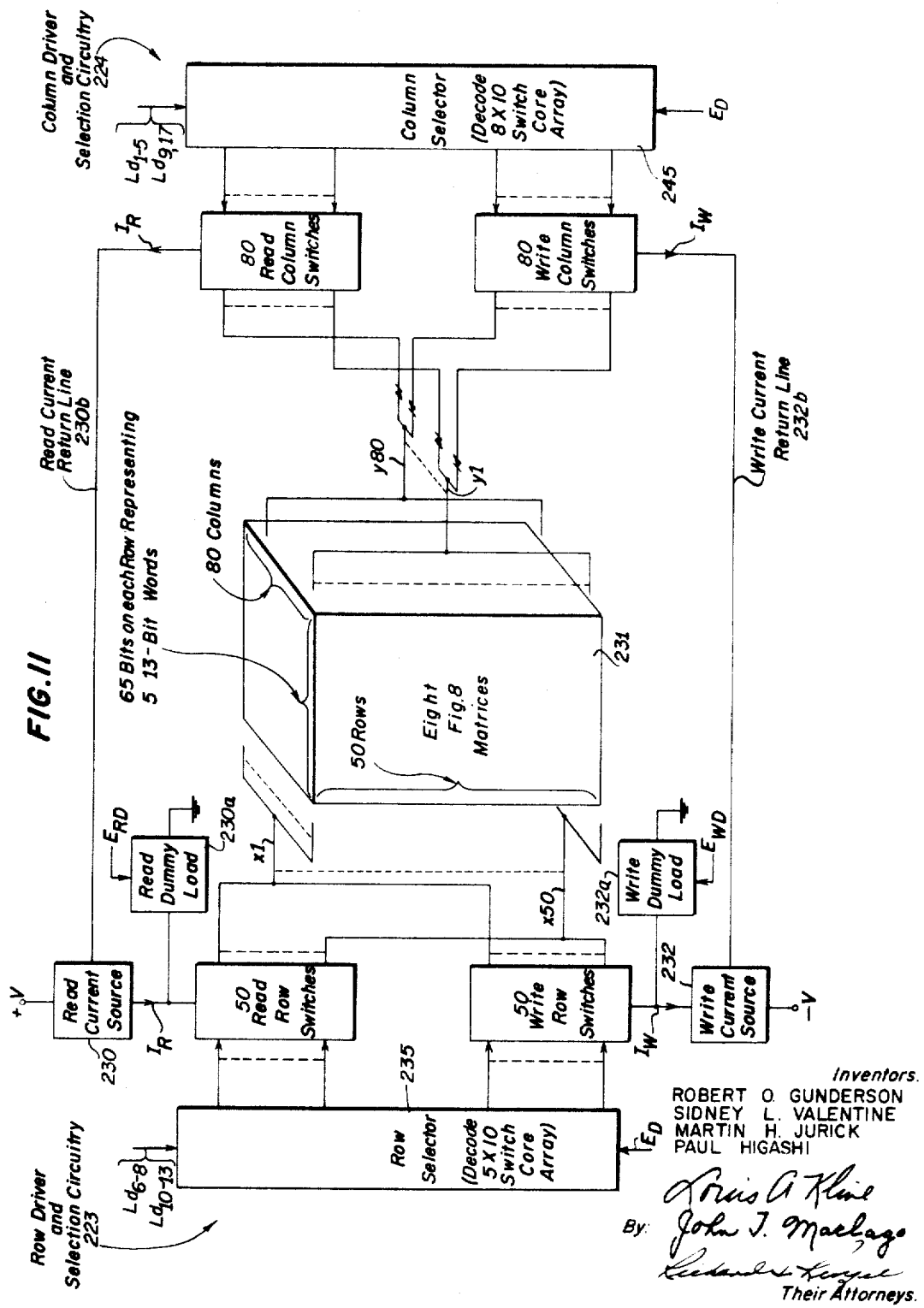

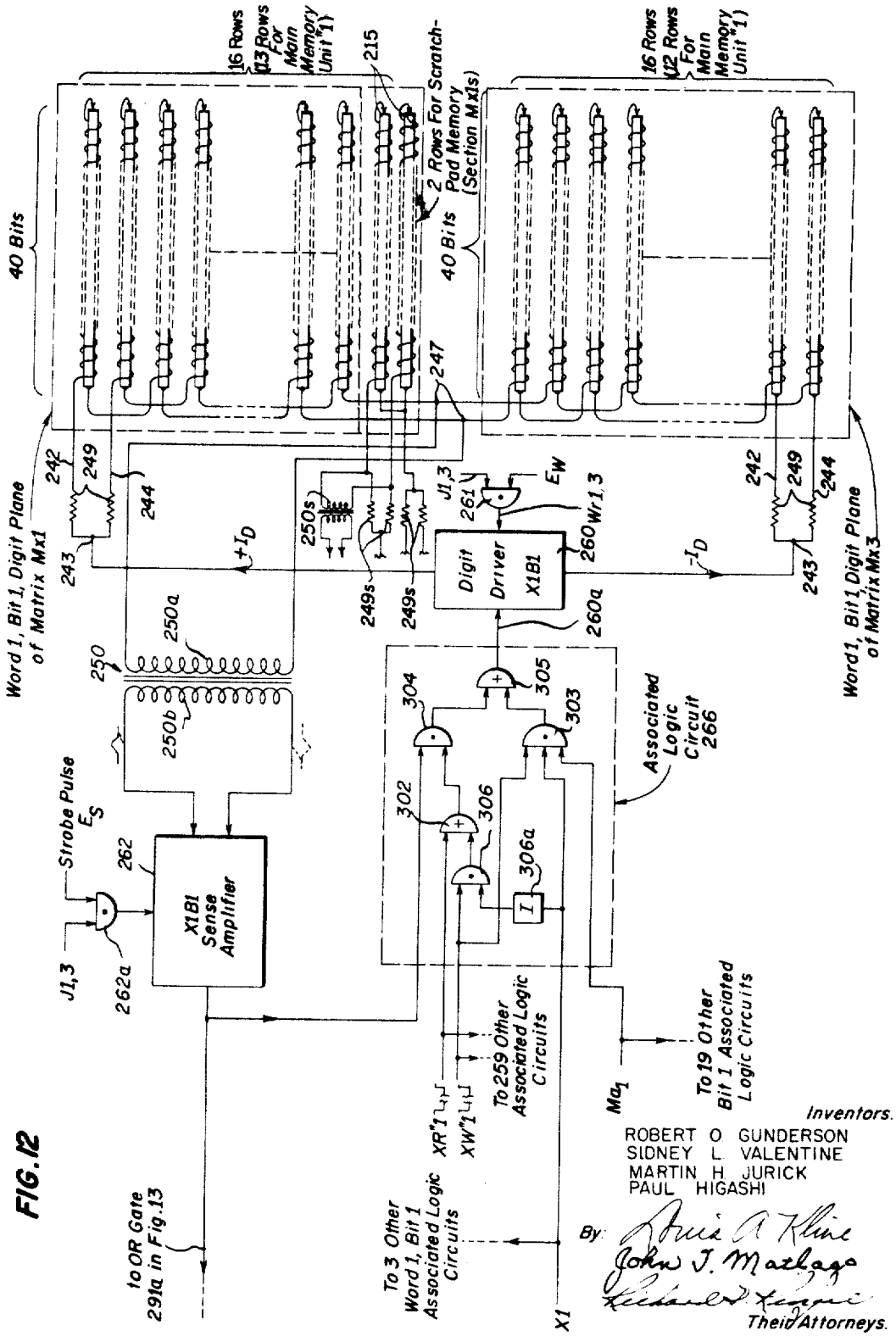

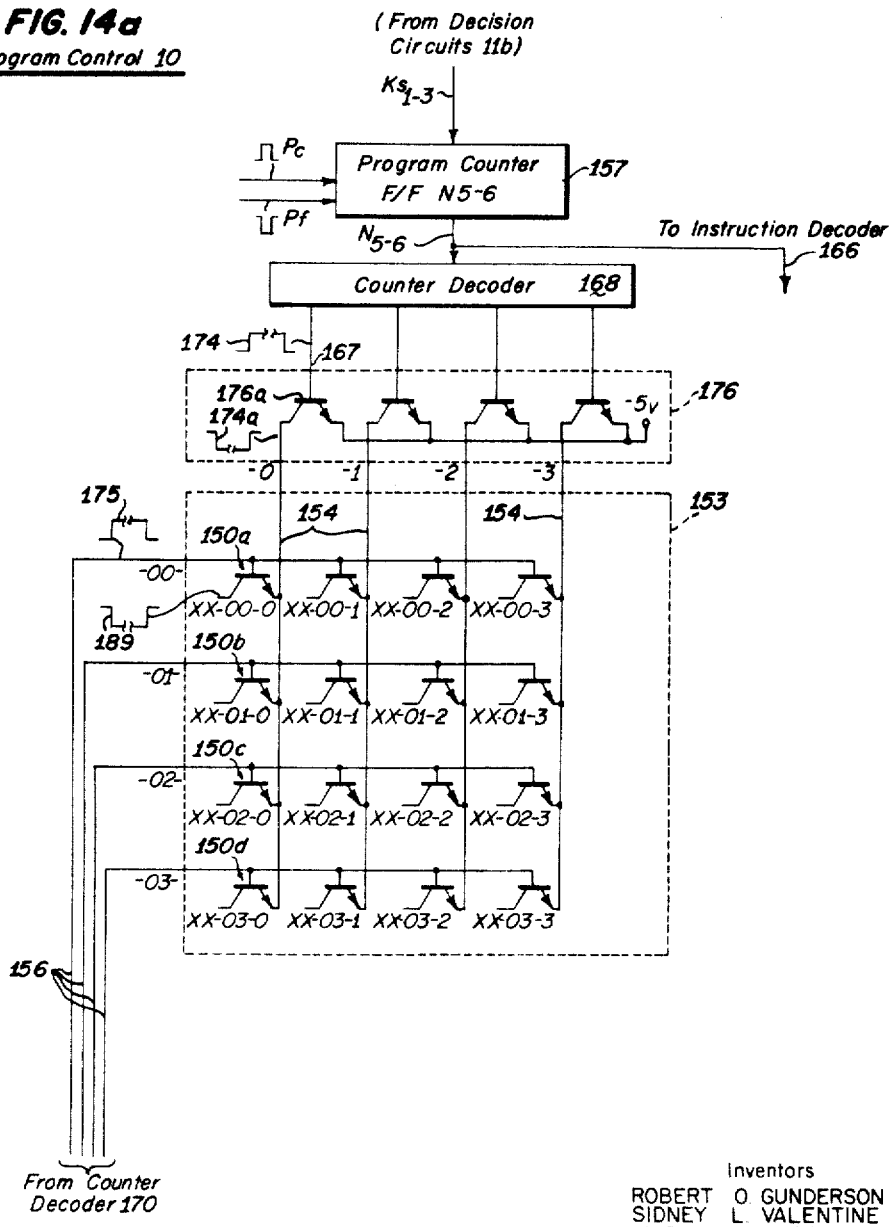

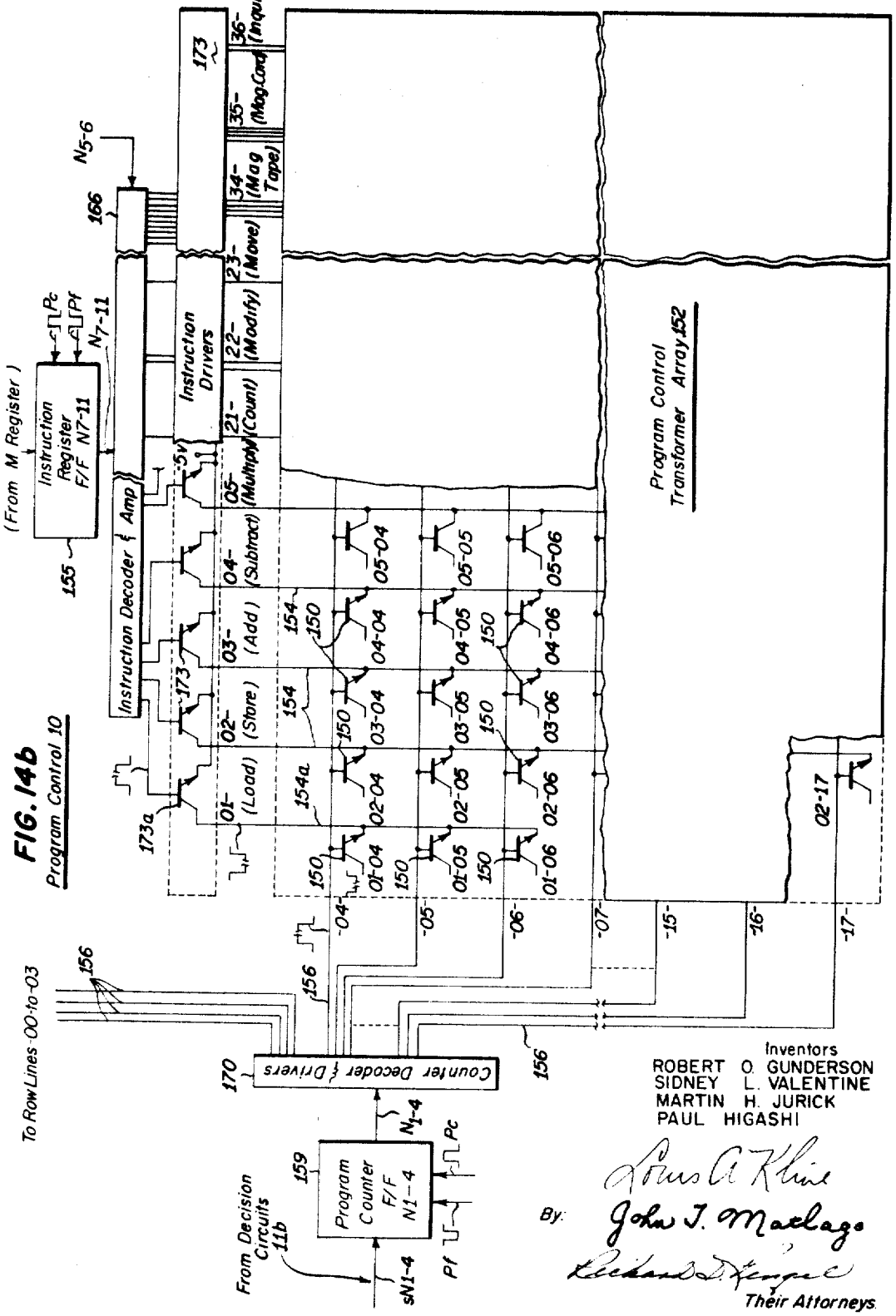

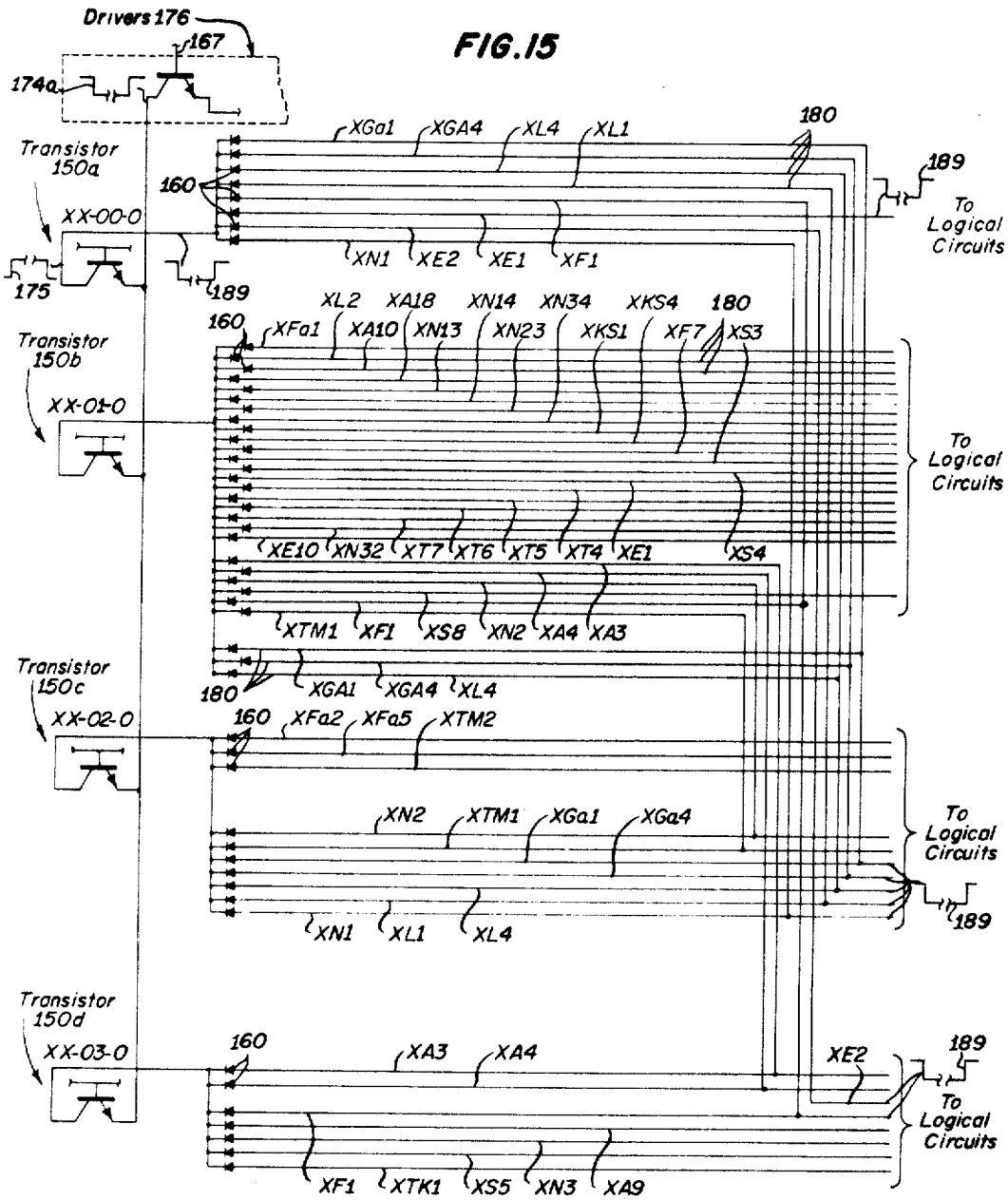

FIG.16

| | Column | Command | Instruction Register F/F | | | | | | Program Counter F/F | |
|---|---|---|---|---|---|---|---|---|---|---|
| | | | N11 | N10 | N9 | N8 | N7 | | N6 | N5 |
| Single Stage Commands | 01- | Load | 0 | 0 | 0 | 0 | 1 | | 0 | 0 |
| | 02- | Store | 0 | 0 | 0 | 1 | 0 | | 0 | 0 |
| | 03- | Add | 0 | 0 | 0 | 1 | 1 | | 0 | 0 |
| | 04- | Subtract | 0 | 0 | 1 | 0 | 0 | | 0 | 0 |
| | 05- | Multiply | 0 | 0 | 1 | 0 | 1 | | 0/1 | 0/1 |
| Double Stage Commands | 21- | Count | 1 | 0 | 0 | 0 | 1 | | 0 | 0 |
| | 22- | Modify | 1 | 0 | 0 | 1 | 0 | | 0 | 0/1 |
| | 23- | Move | 1 | 0 | 0 | 1 | 1 | | 0 | 0 |
| | 34- | Mag.Tape | 1 | 1 | 1 | 0 | 0 | | 0/1 | 0/1 |
| | 35- | Mag.Card | 1 | 1 | 1 | 0 | 1 | | 0/1 | 0/1 |
| | 36- | Inquiry | 1 | 1 | 1 | 1 | 0 | | 0 | 0/1 |

FIG.17

| Row | Program Counter F/F | | | | | | |
|---|---|---|---|---|---|---|---|
| | N6 | N5 | N4 | N3 | N2 | N1 | |
| -00- | 0/1 | 0/1 | 0 | 0 | 0 | 0 | Command Level (Array 153) |
| -01- | 0/1 | 0/1 | 0 | 0 | 0 | 1 | |
| -02- | 0/1 | 0/1 | 0 | 0 | 1 | 0 | |
| -03- | 0/1 | 0/1 | 0 | 0 | 1 | 1 | |
| -04- | 0/1 | 0/1 | 0 | 1 | 0 | 0 | Individual Commands by Columns (Array 152) |
| -05- | 0/1 | 0/1 | 0 | 1 | 0 | 1 | |
| -06- | 0/1 | 0/1 | 0 | 1 | 1 | 0 | |
| -07- | 0/1 | 0/1 | 0 | 1 | 1 | 1 | |
| -10- | 0/1 | 0/1 | 1 | 0 | 0 | 0 | |
| -11- | 0/1 | 0/1 | 1 | 0 | 0 | 1 | |
| -12- | 0/1 | 0/1 | 1 | 0 | 1 | 0 | |
| -13- | 0/1 | 0/1 | 1 | 0 | 1 | 1 | |
| -14- | 0/1 | 0/1 | 1 | 1 | 0 | 0 | |
| -15- | 0/1 | 0/1 | 1 | 1 | 0 | 1 | |
| -16- | 0/1 | 0/1 | 1 | 1 | 1 | 0 | |
| -17- | 0/1 | 0/1 | 1 | 1 | 1 | 1 | |

Inventors.
ROBERT O. GUNDERSON
SIDNEY L. VALENTINE
MARTIN H. JURICK
PAUL HIGASHI

FIG.18

| | Operation Block | Instruction Register F/F | | | | | Program Counter F/F | | | | | |
|---|---|---|---|---|---|---|---|---|---|---|---|---|
| | | N11 | N10 | N9 | N8 | N7 | N6 | N5 | N4 | N3 | N2 | N1 |
| Set up all Commands | XX-00-0 | 0 | 0 | 0 | 0 | 0 | 0 | 0 | 0 | 0 | 0 | 0 |
| | XX-01-0 | 0 | 0 | 0 | 0 | 0 | 0 | 0 | 0 | 0 | 0 | 1 |
| Set up Single Stage Commands | XX-02-0 | 0 | 0 | 0 | 0 | 1 | 0 | 0 | 0 | 0 | 1 | 0 |
| | XX-03-0 | 0 | 0 | 0 | 0 | 1 | 0 | 0 | 0 | 0 | 1 | 1 |
| "Load" Command | 01-04-0 | 0 | 0 | 0 | 0 | 1 | 0 | 0 | 0 | 1 | 0 | 0 |
| | 01-05-0 | 0 | 0 | 0 | 0 | 1 | 0 | 0 | 0 | 1 | 0 | 1 |
| | 01-06-0 | 0 | 0 | 0 | 0 | 1 | 0 | 0 | 0 | 1 | 1 | 1 |
| Skips | XX-00-3 | 0 | 0 | 0 | 0 | 0 | 1 | 1 | 0 | 0 | 0 | 0 |
| "Move" Command | XX-00-1 | 1 | 0 | 0 | 1 | 1 | 0 | 1 | 0 | 0 | 0 | 0 |

FIG.19

| | Operation Block | Instruction Register F/F | | | | | Program Counter F/F | | | | | |
|---|---|---|---|---|---|---|---|---|---|---|---|---|
| | | N11 | N10 | N9 | N8 | N7 | N6 | N5 | N4 | N3 | N2 | N1 |
| Set up all Commands | XX-00-0 | 0 | 0 | 0 | 0 | 1 | 0 | 0 | 0 | 0 | 0 | 0 |
| | XX-01-0 | 0 | 0 | 0 | 0 | 1 | 0 | 0 | 0 | 0 | 0 | 1 |
| Set up Double Stage Commands | XX-00-1 | 1 | 0 | 0 | 1 | 1 | 0 | 1 | 0 | 0 | 0 | 0 |
| | XX-01-1 | 1 | 0 | 0 | 1 | 1 | 0 | 1 | 0 | 0 | 0 | 1 |
| | XX-02-1 | 1 | 0 | 0 | 1 | 1 | 0 | 1 | 0 | 0 | 1 | 0 |
| | XX-03-1 | 1 | 0 | 0 | 1 | 1 | 0 | 1 | 0 | 0 | 1 | 1 |
| "Move" Command | 23-04 | 1 | 0 | 0 | 1 | 1 | 0 | 0 | 0 | 1 | 0 | 0 |
| | 23-05 | 1 | 0 | 0 | 1 | 1 | 0 | 0 | 0 | 1 | 0 | 1 |
| | 23-06 | 1 | 0 | 0 | 1 | 1 | 0 | 0 | 0 | 1 | 1 | 0 |
| | 23-07 | 1 | 0 | 0 | 1 | 1 | 0 | 0 | 0 | 1 | 1 | 1 |
| | 23-10 | 1 | 0 | 0 | 1 | 1 | 0 | 0 | 1 | 0 | 0 | 0 |
| | 23-11 | 1 | 0 | 0 | 1 | 1 | 0 | 0 | 1 | 0 | 0 | 1 |
| | 23-12 | 1 | 0 | 0 | 1 | 1 | 0 | 0 | 1 | 0 | 1 | 0 |
| | 23-13 | 1 | 0 | 0 | 1 | 1 | 0 | 0 | 1 | 0 | 1 | 1 |
| | 23-14 | 1 | 0 | 0 | 1 | 1 | 0 | 0 | 1 | 1 | 0 | 0 |
| | 23-15 | 1 | 0 | 0 | 1 | 1 | 0 | 0 | 1 | 1 | 0 | 1 |
| | 23-16 | 1 | 0 | 0 | 1 | 1 | 0 | 0 | 1 | 1 | 1 | 0 |
| | 23-17 | 1 | 0 | 0 | 1 | 1 | 0 | 0 | 1 | 1 | 1 | 1 |

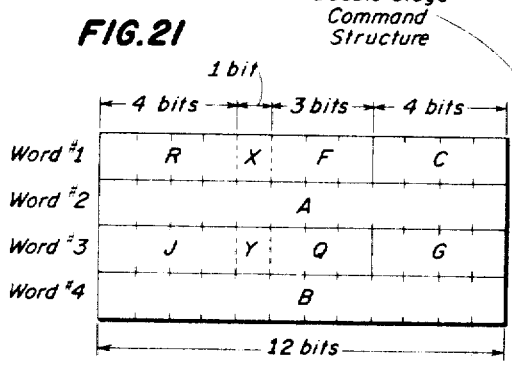

FIG.21 Double Stage Command Structure

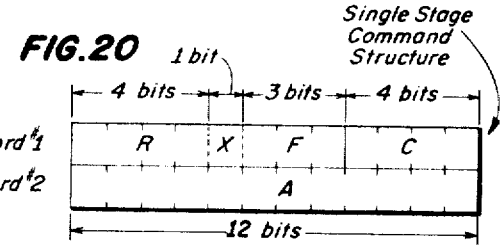

FIG.20 Single Stage Command Structure

Inventors
ROBERT O. GUNDERSON
SIDNEY L. VALENTINE
MARTIN H. JURICK
PAUL HIGASHI

Their Attorneys

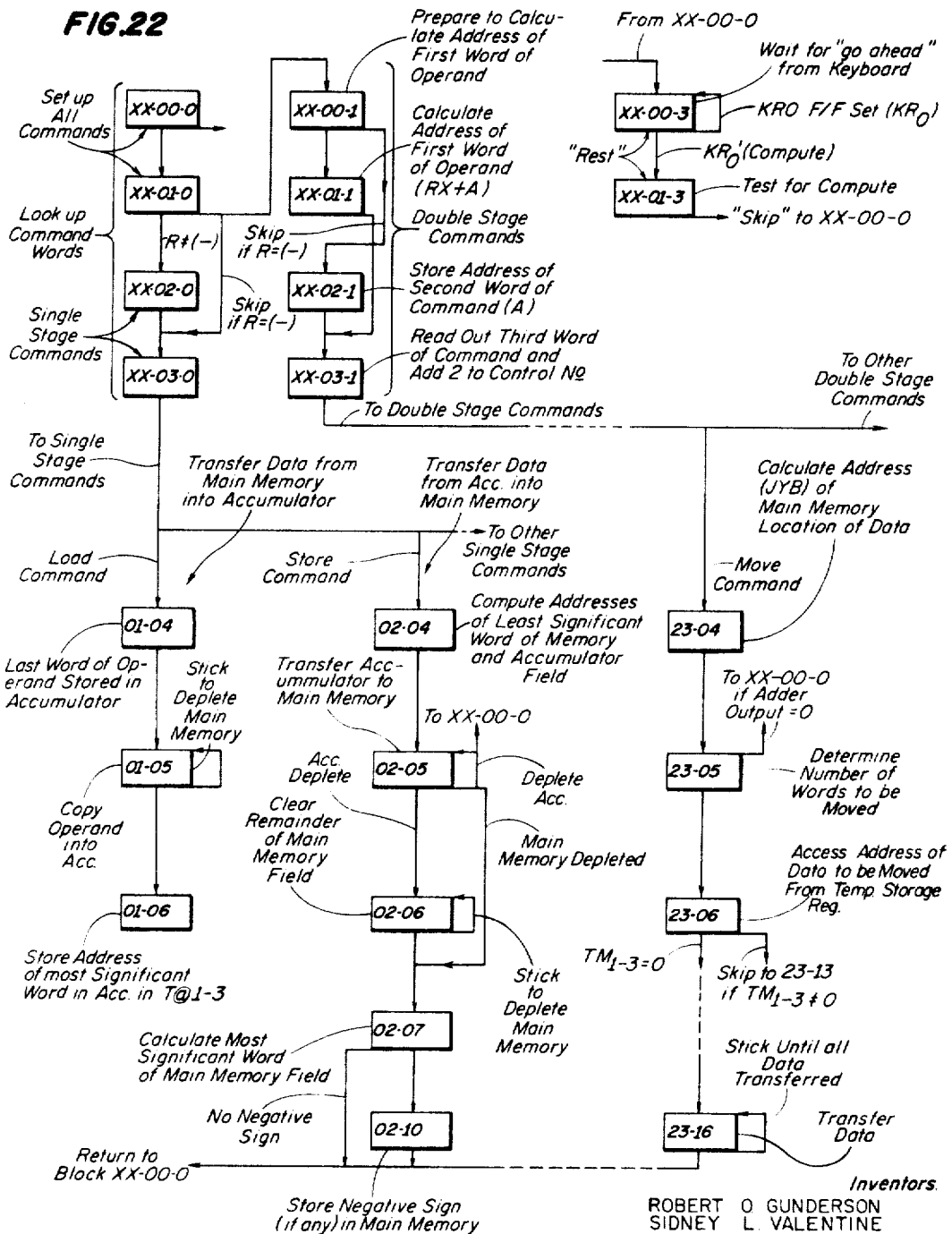

FIG. 23

XX-00-0 Look up Control N°

Scratch-Pad memory cycle: Control N° (address of first word of command) "read out" of Scratch Pad memory into S Reg.

Address of first word of command copied via the adder from S Reg. into L Reg.

Set Program counter to go to block XX-01-0.

If KR0 flip-flop is set by rest button being depressed to provide $Ks_3$, go to "rest" block XX-00-3 to await next command.

Basic block (Read-Restore memory cycle)

Adder:
$dGa1\text{-}4 = S_{1\text{-}4} XGa1$
$dGa5\text{-}12 = S_{5\text{-}12} XGa4$
$dJa13\text{-}18 = S_{13\text{-}18} (Carry\ Count\ Up) XJa1'$
$dFa1\text{-}12 = 0$ L Registers:
$dLa1\text{-}18 = Ja_{1\text{-}18} XL1\ Pas + La_{1\text{-}18} Pac$
$dL1\text{-}18 = La_{1\text{-}18} Ps + L_{1\text{-}18} Pc$ A Registers:
$dAa1\text{-}3 = A_{1\text{-}3} XA3'\ Pas + Aa_{1\text{-}3} Pac$
$dAa4\text{-}7 = A_{4\text{-}7} XA4'\ Pas + Aa_{4\text{-}7} Pac$
$dA1\text{-}7 = Aa_{1\text{-}7} Ps + A_{1\text{-}7} Pc$
$dAd1\text{-}7 = Aa_{1\text{-}7} E_1 R1$ N Registers: (Pf, Pc)
$sN1 = Ks_1' Ks_2' Ks_3' XN1$
$sN7\text{-}10 = N_{7\text{-}10} XN34'$
$sN2\text{-}4 = 0$
$sN5\text{-}6 = Ks_3$ Decision:
$dKs1 = 0$
$dKs2 = 0$
$dKs3 = KR_0$ M Registers:
$dM1\text{-}12 = Ma_{1\text{-}12} Ps + M_{1\text{-}12} Pc$
$dMa1\text{-}12 = 0$
$sF1 = Ks_1' Ks_2' Ks_3' XF1$
$sF2 = 0$
$sF3 = 0$ S Registers:
$dS1\text{-}18 = as1\text{-}18 + S_{1\text{-}18} Pc$
$dSa1\text{-}18 = 0$
$sE1 = Ks_1' Ks_2' Ks_3' XE1$
$sE2 = Ks_1' K_2' K_3' XE2$ T Registers: (Pf, Pc)
$sT1\text{-}4 = T_{1\text{-}4} XT4'$
$sT5\text{-}8 = T_{5\text{-}8} XT5'$
$sT9\text{-}12 = T_{9\text{-}12} XT6'$
$sTM1\text{-}3 = TM_{1\text{-}3} XTM1'$
$sT@1\text{-}3 = T@_{1\text{-}3} XT@1'$
$sTK1\text{-}3 = 0$ Inventors
ROBERT O. GUNDERSON
SIDNEY L. VALENTINE
MARTIN H. JURICK
PAUL HIGASHI Their Attorneys.

FIG. 24

XX-01-0 Look up first word of command

> Main Memory Cycle: First word of command "read out" of main memory into M Reg. by a R-R main memory cycle.
>
> First word of command copied from M Reg. into T Reg.
>
> First 5 bits (RX) portion of first word copied from M Reg. (M8-12) into A Reg. (Address of index Reg.).
>
> Command code (C) for load command copied from M Reg. (M1-4) into instruction Reg. (N7-10).
>
> Add 1 to address in L Reg. for address of second word of command (count up).
>
> Scratch-Pad Memory Cycle: "read out" control N°. Add 2 to control N° in S Reg., in adder, to provide the address of the next command. "Write back" new control N°.
>
> Program counter set: (1) block XX-00-1 if $(Ks_1 \cdot Ks_2)$ a double stage command; (2) block XX-03-0 if $(Ks_1' \cdot Ks_2')$ first digit is (−), then second word of command (A) is operand address; (3) block XX-02-0 if $(Ks_1' \cdot Ks_2' \cdot Ks_3')$ Single stage command
>
> Long block (Read-Restore, Clear-Write memory cycles).

Adder:
$dFa2 = XFa1$
$dGa1-4 = S_{1-4} XGa1$
$dGa5-12 = S_{5-12} XGa4$
$dGa13-18 = S_{13-18}$ (Carry Count Up) $XJa1'$ Decision:
$dKs1 = (M_1 M_2 M_3 M_4 + M_1' \cdot M_2' \cdot M_3' \cdot M_4') XKs1$
$dKs2 = (M_1 M_2 M_3 M_4 + M_1' \cdot M_2' \cdot M_3' \cdot M_4') XKs1 + M_9 M_{10} M_{11} M_{12} XKs4$
$dKs3 = 0$ L Registers:
$dLa1-18 = L_{1-18}$ (Count Up) $XL2$ $Pas + La_{1-18} Pac$
$dL1-18 = La_{1-18} Ps + L_{1-18} Pc$
$dLd1-18 = La_{1-18} F_1 R1$ M Registers:
$dM1-12 = am1-12 + M_{1-12} Pc$
$dMa1-12 = 0$
$sF1 = Ks_1' \cdot Ks_2' \cdot Ks_3' \cdot XF1 + Ks_1 Ks_2 XF7$
$sF2 = 0$
$sF3 = 0$ A Registers:
$dAa1-3 = M_{9-11} XA10 Pas + Aa_{1-3} Pac$
$dAa4 = M_{12} XA18 Pas + Aa_4 Pac$
$dAa5 = M_8 XA18 Pas + Aa_5 Pac$
$dA1-7 = Aa_{1-7} Ps + A_{1-7} Pc$
$dAd1-7 = Aa_{1-7} E_1 R1 + A_{1-7} E_2 W1$ S Registers:
$dS1-18 = as1-18 + S_{1-18} Pc$
$dSa1-4 = Ja_{1-4} XS8 Pas + Sa_{1-4} Pac$
$dSa5-12 = Ja_{5-12} XS3 Pas + Sa_{5-12} Pac$
$dSa13-18 = Ja_{13-18} XS4 Pas + Sa_{13-18} Pac$
$sE1 = Ks_1' Ks_2' Ks_3' XE1 + Ks_1 Ks_2 XE10$
$sE2 = 0$ N Registers: (Pf, Pc)
$sN1 = Ks_1' Ks_2 XN13$
$sN2 = (Ks_1' Ks_2' XN2 + Ks_1' Ks_2 XN14)$
$sN5 = Ks_1 Ks_2 XN23$
$sN7-10 = M_{1-4} XN32$
$sN6 = 0$
$sN3-4 = 0$ T Registers: (Pf, Pc)
$sT1-12 = M_{1-12} XT7$
$sTM1-3 = 0$
$sT@1-3 = T@_{1-3} XT@1'$
$sTK1-3 = 0$

FIG.25  XX-02-0 Look up second word of command

> Main Memory Cycle: "read out" of main memory into M Reg.
>
> Scratch-Pad Memory Cycle: "read out" index register.
>
> Add second word of command in M Reg. to contents of S Reg. in adder and put sum into L Reg.
>
> Field length (F) of the operand copied from T Reg. (T5–7) into TM Reg. (TM1–3).
>
> Program counter set to go to block XX-03-0.
>
> Basic block (Read-Restore memory cycle).

*Adder:*
$dFa\,1-4 = M_{1-4}\,XFa\,2$
$dFa\,5-8 = M_{5-8}\,XFa\,5$
$dFa\,9-12 = M_{9-12}\,Km_0'\,XFa\,5$
$dGa\,1-4 = S_{1-4}\,XGa\,1$
$dGa\,5-12 = S_{5-12}\,XGa\,4$
$dJa\,13-18 = S_{13-18}(Carry\,Count\,Up)XJa\,1'$

*L Registers:*
$dLa\,1-18 = Ja_{1-18}\,XL\,1\,Pas + La_{1-18}\,Pac$
$dL\,1-18 = La_{1-18}\,Ps + L_{1-18}\,Pc$
$dLd1-18 = La_{1-18}\,F_1\,R1$

*A Registers:*
$dAa\,1-3 = A_{1-3}\,XA3'\,Pas + Aa_{1-3}\,Pac$
$dAa\,4-7 = A_{4-7}\,XA4'\,Pas + Aa_{4-7}\,Pac$
$dA\,1-7 = Aa_{1-7}\,Ps + A_{1-7}\,Pc$
$dAd1-7 = Aa_{1-7}\,E_1\,R1$

*N Registers: (Pf, Pc)*
$sN1 = Ks_1'\,Ks_2'\,XN1$
$sN2 = Ks_1'\,Ks_2'\,XN2$
$sN3-6 = 0$
$sN7-10 = N_{7-10}\,XN34'$

*Decision:*
$dKs\,1 = 0$
$dKs\,2 = 0$
$dKs\,3 = 0$

*M Registers:*
$dM1-12 = a\,m1-12 + M_{1-12}\,Pc$
$dMa\,1-12 = 0$
$sF1 = 0$
$sF2 = 0$
$sF3 = 0$

*S Registers:*
$dS1-18 = a.s1-18 + S_{1-18}\,Pc$
$dSa\,1-18 = 0$
$sE1 = 0$
$sE2 = 0$

*T Registers: (Pf, Pc)*
$sT1-4 = T_{1-4}\,XT4'$
$sT5-8 = T_{5-8}\,XT5'$
$sT9-12 = T_{9-12}\,XT6'$
$sTM1-3 = T_{5-7}\,XTM2$
$sT@1-3 = T@_{1-3}\,XT@1'$
$sTK\,1-3 = 0$ Inventors.
ROBERT O. GUNDERSON
SIDNEY L. VALENTINE
MARTIN H. JURICK
PAUL HIGASHI By *(signatures)*

Their Attorneys.

FIG. 26

XX-03-0 Prepare to look up operand

Transfer field length (F) from TM Reg. (TM1-3) to TK Reg. (TK1-3).

Copy address in L Reg. into S Reg.

Program counter set to go to row -04- (if Load Command go to block 01-04-0).

Basic Block (No memory cycle).

Adder:
$dFa\,1\text{-}12 = 0$
$dGa\,1\text{-}12 = 0$

Decision:
$dKs\,1 = 0$
$dKs\,2 = 0$
$dKs\,3 = 0$

L Registers:
$dLa\,1\text{-}18 = L_{1\text{-}18}\,XL4'\,Pas + La_{1\text{-}18}\,Pac$
$dL\,1\text{-}18 = La_{1\text{-}18}\,Ps + L_{1\text{-}18}\,Pc$

M Registers:
$dM1\text{-}12 = Ma_{1\text{-}12}\,Ps + M_{1\text{-}12}\,Pc$
$dMa\,1\text{-}12 = 0$
$sF1 = Ks_1'\,Ks_2'\,Ks_3'\,XF1$
$sF2 = 0$
$sF3 = 0$

A Registers:
$dAa\,1\text{-}6 = 0$
$dAa\,7 = XA9\,Pas + Aa_7\,Pac$
$dA\,1\text{-}7 = Aa_{1\text{-}7}\,Ps + A_{1\text{-}7}\,Pc$

S Registers:
$dS1\text{-}18 = Sa_{1\text{-}18}\,Ps + S_{1\text{-}18}\,Pc$
$dSa\,1\text{-}18 = L_{1\text{-}18}\,XS5\,Pas + Sa_{1\text{-}18}\,Pac$
$sE1 = 0$
$sE2 = Ks_1'\,Ks_2'\,Ks_3'\,XE2$

N Registers: (Pf, Pc)
$sN3 = Ks_1'\,Ks_2'\,XN3$
$sN7\text{-}10 = N_{7\text{-}10}\,XN34'$
$sN1\text{-}2 = 0$
$sN4\text{-}6 = 0$

T Registers (Pf, Pc)
$sT1\text{-}4 = T_{1\text{-}4}\,XT4'$
$sT5\text{-}8 = T_{5\text{-}8}\,XT5'$
$sT9\text{-}12 = T_{9\text{-}12}\,XT6'$
$sTM1\text{-}3 = TM_{1\text{-}3}\,XTM1'$
$sT@1\text{-}3 = T@_{1\text{-}3}\,XT@1'$
$sTK1\text{-}3 = TM_{1\text{-}3}\,XTK1$ Feb. 4, 1969      R. O. GUNDERSON ET AL      3,426,328
ELECTRONIC DATA PROCESSING SYSTEM
Filed Jan. 18, 1965                     Sheet 23 of 38
FIG. 27a
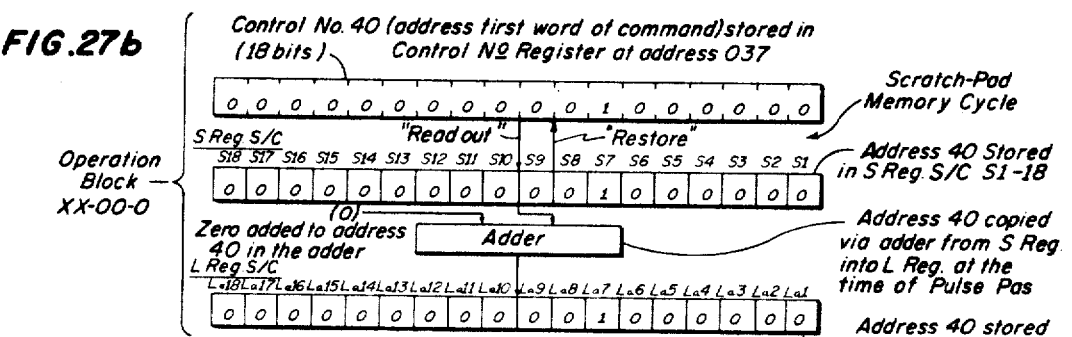
FIG. 27b
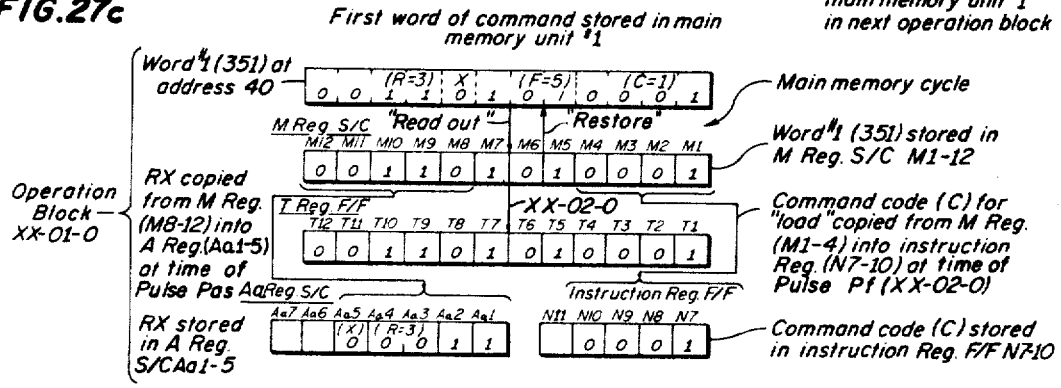
FIG. 27c
FIG. 27d
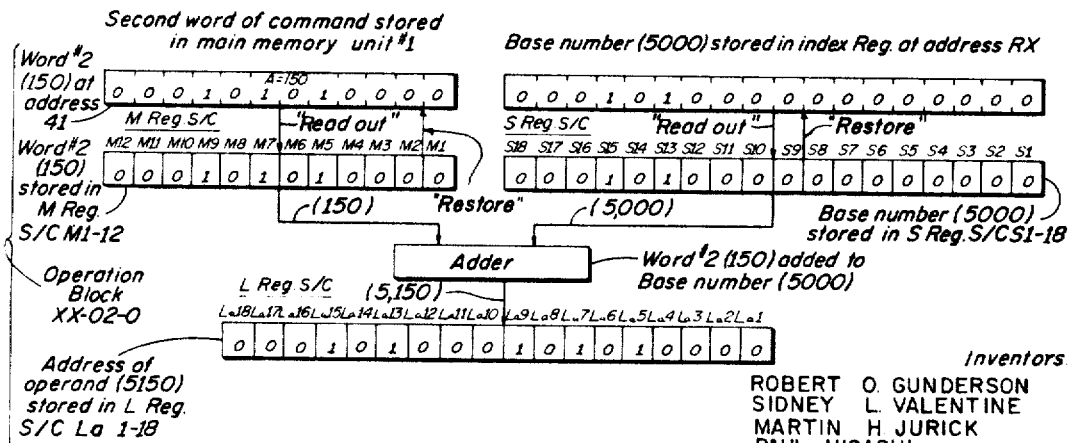
Inventors
ROBERT O. GUNDERSON
SIDNEY L. VALENTINE
MARTIN H. JURICK
PAUL HIGASHI
By
Their Attorneys.

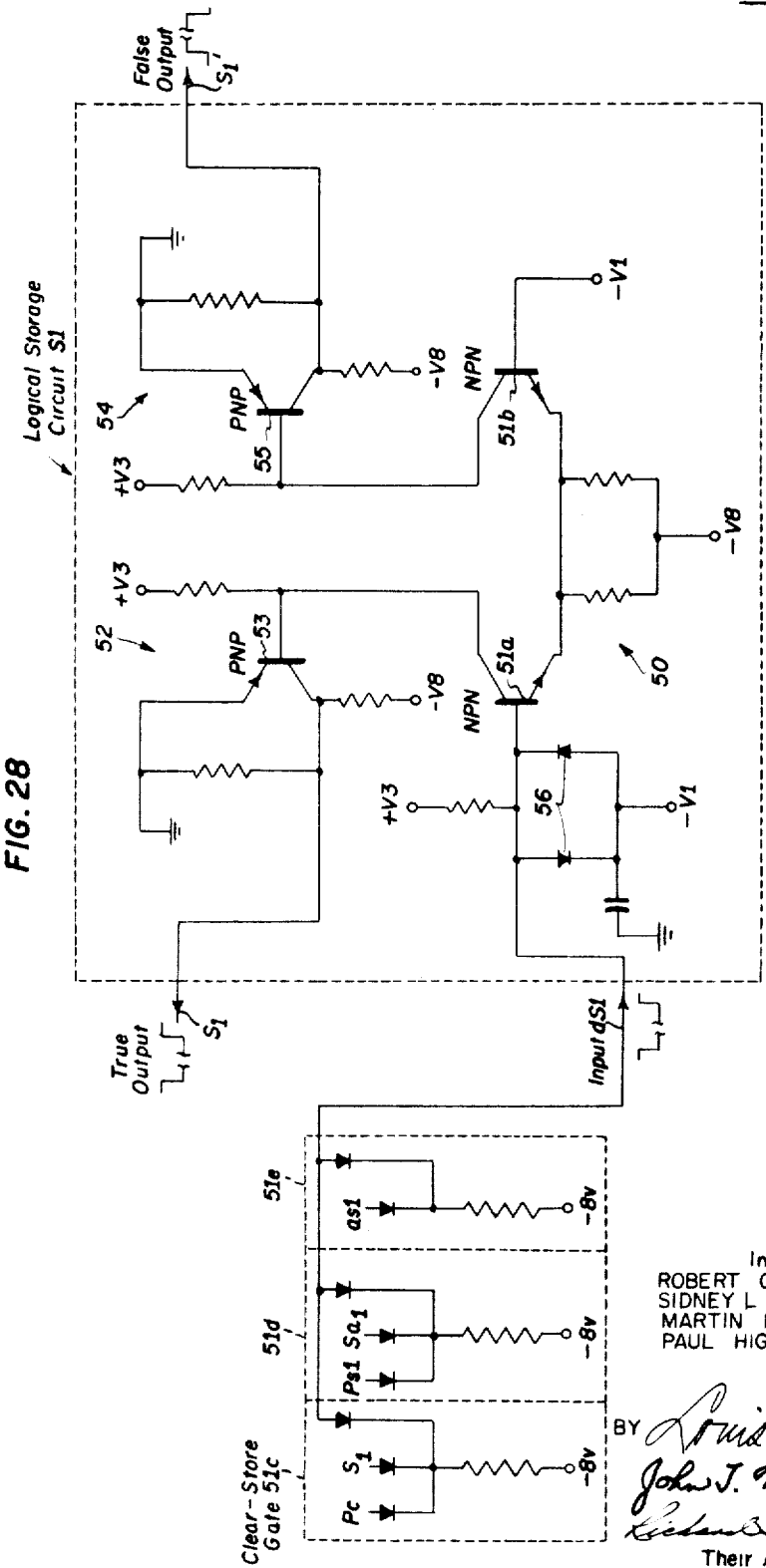

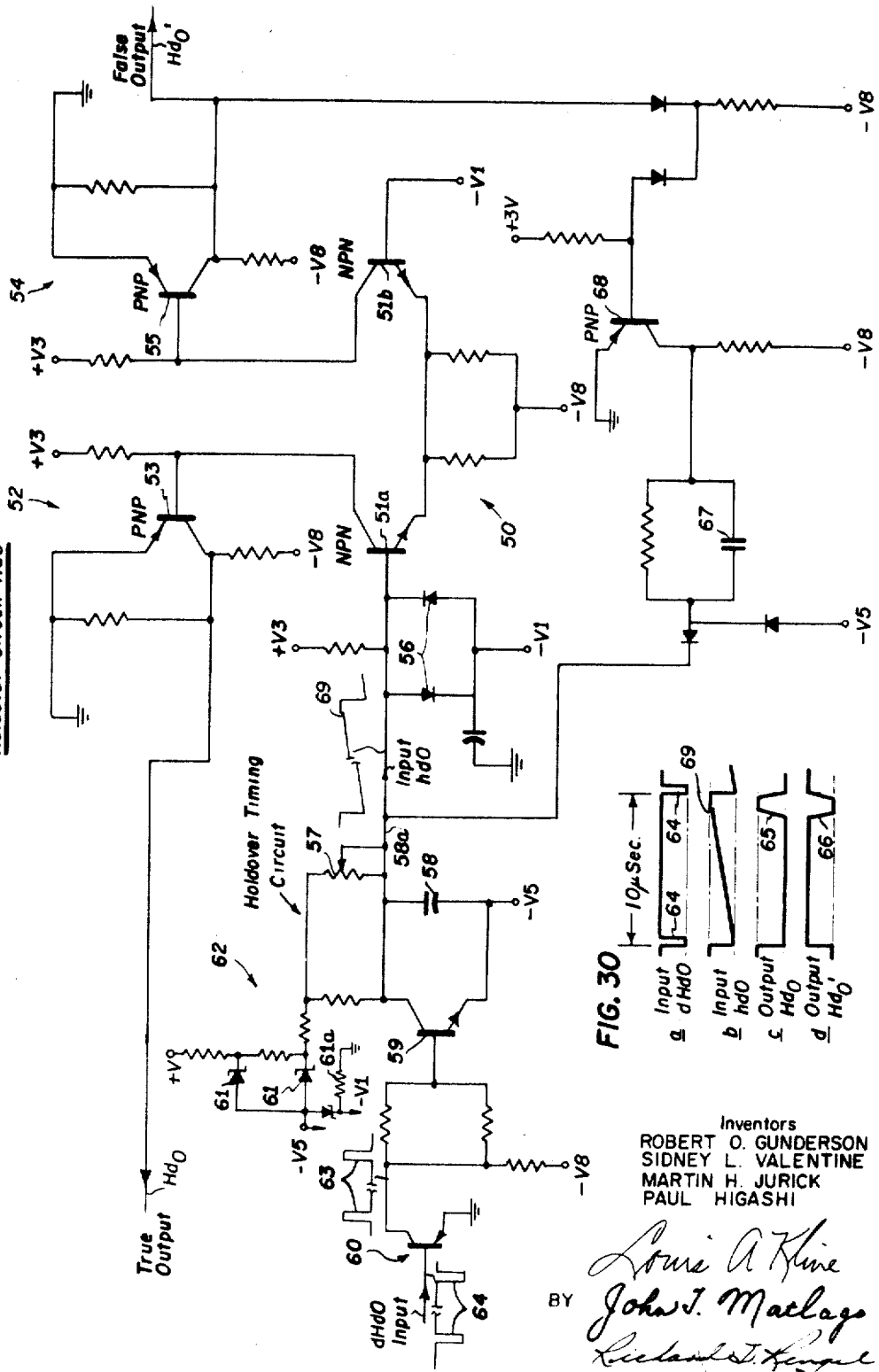

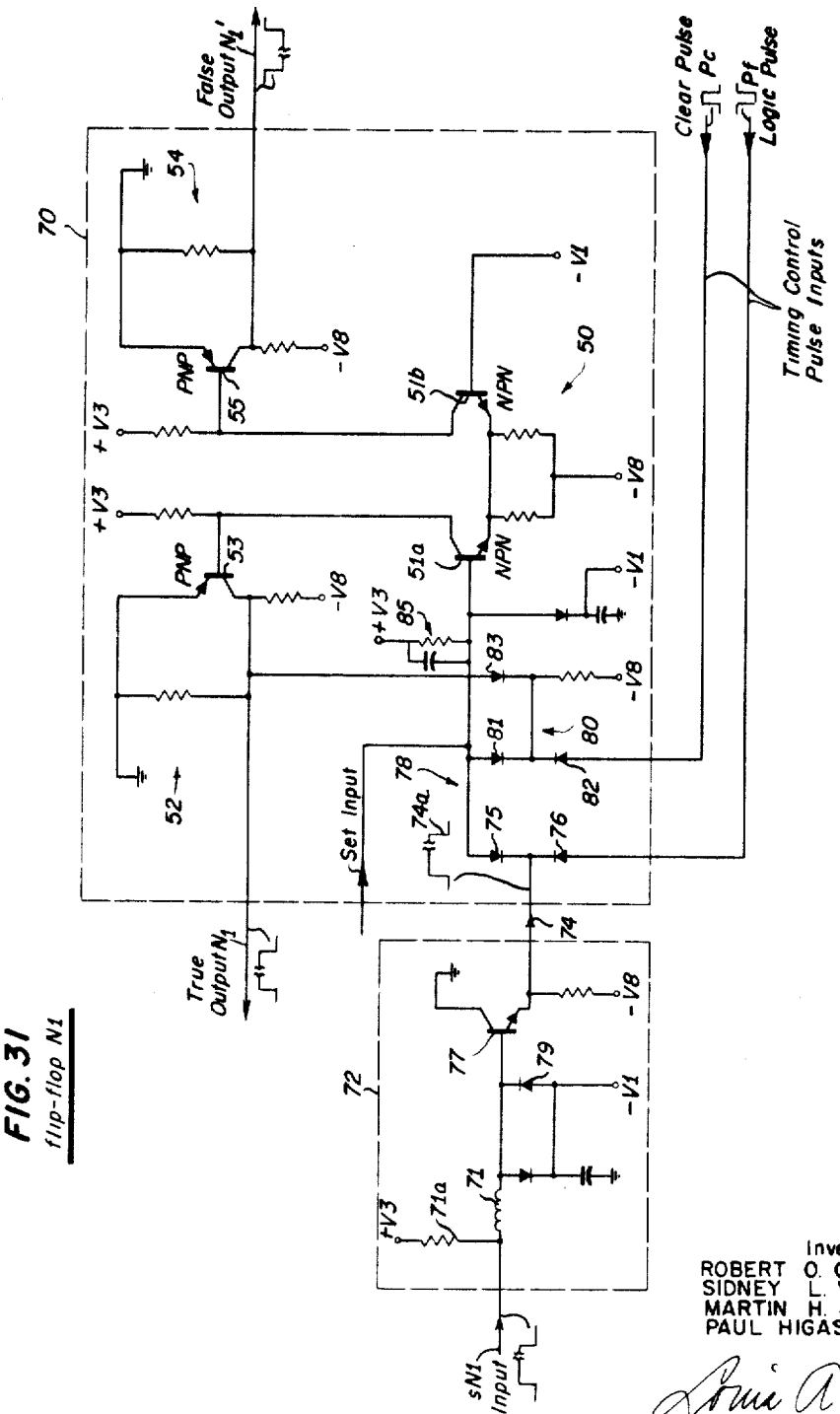

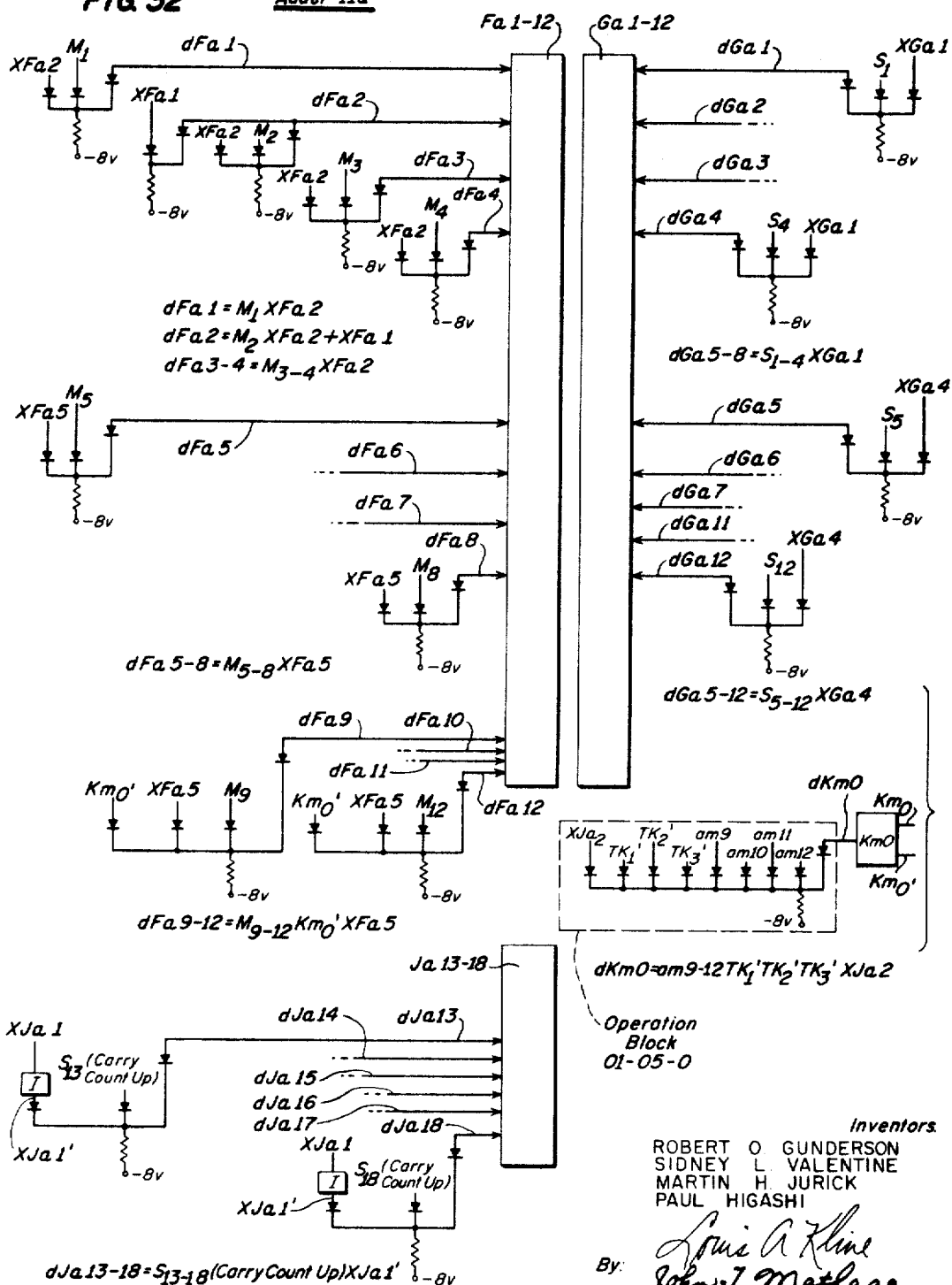

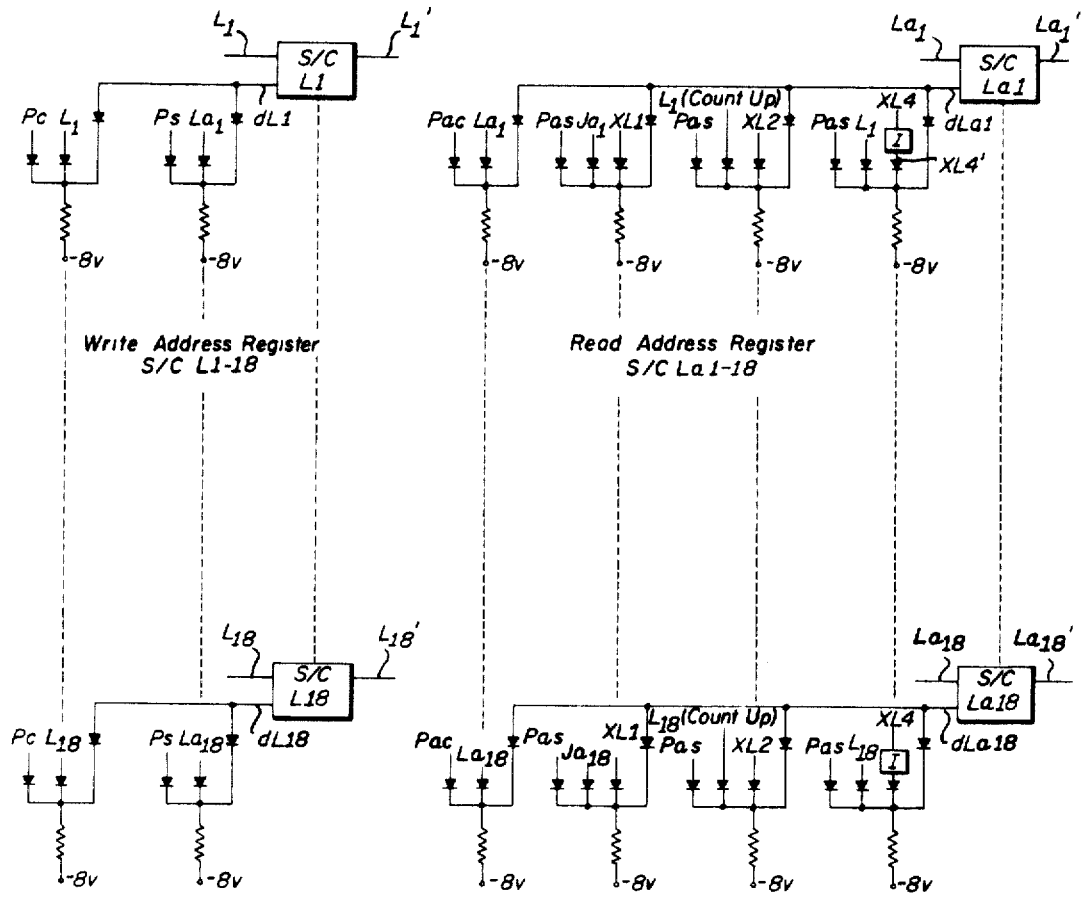
FIG.33  Main Memory Address L Registers

*Main Memory Address Drivers*

Address Drivers Ld1-18

$dLd1\text{-}18 = La_{1\text{-}18} F_1 R1 + L_{1\text{-}18} F_2 W1 + S_{1\text{-}18} F_3 W1$ Inventors
ROBERT O. GUNDERSON
SIDNEY L. VALENTINE
MARTIN H. JURICK
PAUL HIGASHI By *Louis A. Hirn*
*John J. Maclago*
*Richard J. Lempe*
Their Attorneys

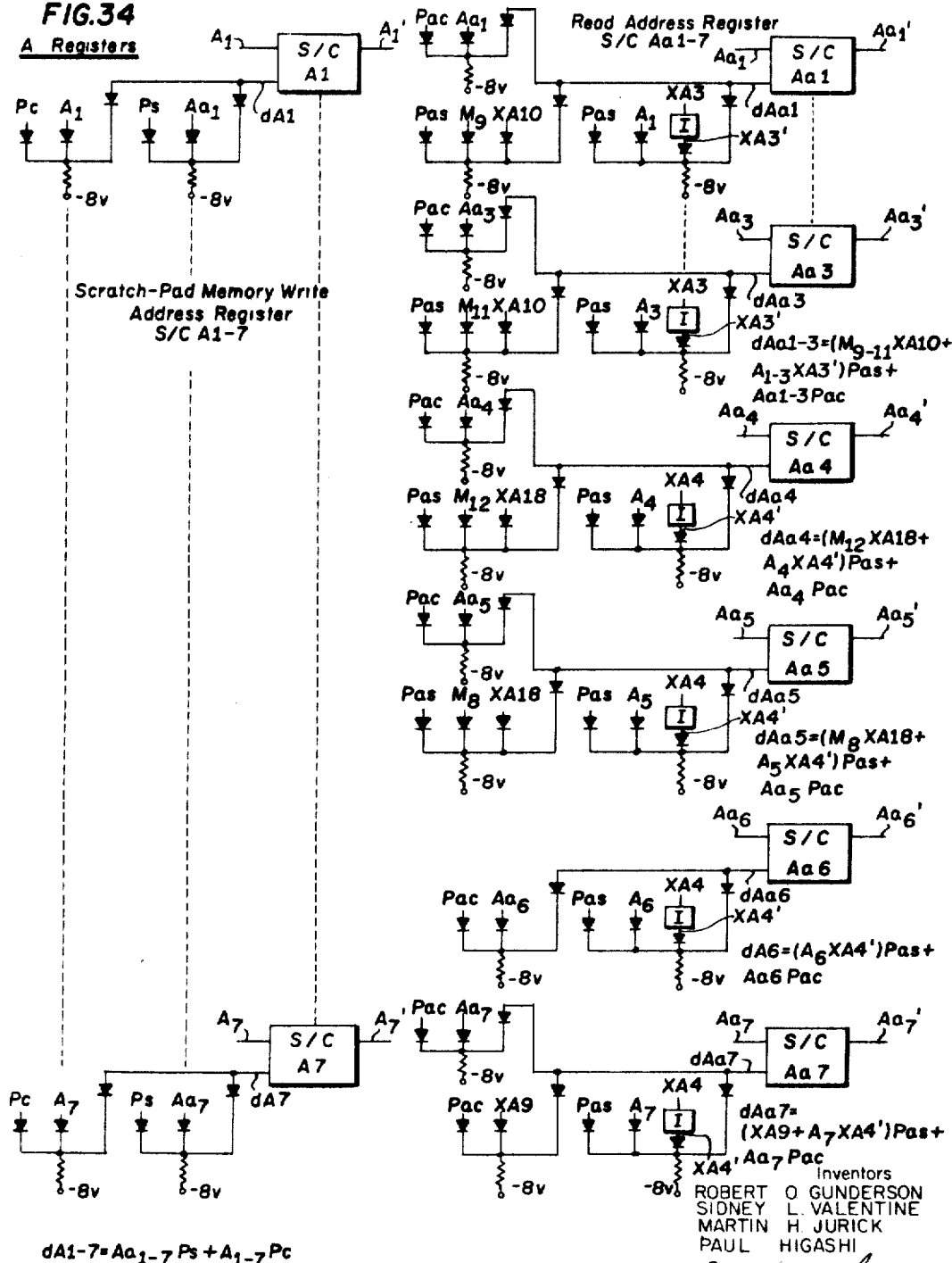

Scratch-Pad Memory Address Drivers $dAd1\text{-}7 = Aa_{1\text{-}7} E_1 R1 + A_{1\text{-}7} E_2 W1$ FIG. 36 Decision Logic Circuits

United States Patent Office 3,426,328
Patented Feb. 4, 1969

3,426,328
ELECTRONIC DATA PROCESSING SYSTEM
Robert O. Gunderson, Sidney L. Valentine, and Martin H. Jurick, Torrance, and Paul Higashi, Gardena, Calif., assignors to The National Cash Register Company, Dayton, Ohio, a corporation of Maryland
Filed Jan. 18, 1965, Ser. No. 426,105
U.S. Cl. 340—172.5    32 Claims
Int. Cl. G11b *13/00*

ABSTRACT OF THE DISCLOSURE

This data processing system provides for execution of commands by performing logical operations upon data in system operating cycles of either short or extended time duration, each of which system cycles provides for one or successive memory accessing cycles respectively, of internal thin-film memories including main and scratch-pad memories operating in parallel. Each system operating cycle provides for performance of any selected group of logical operations and at least one memory cycle whereby a plurality of system operating cycles provides for performance of all logical operations of any desired command in the desired sequence under the selective operation of the program control. The program control further provides for the extending of the time duration of any system operating cycle requiring modification of data in any storage location of the main or scratch-pad memories, and also controls the number of system operating cycles to execute any particular command depending upon the decisions made during the execution of the command.

---

The present invention is directed to electronic data processing systems and more particularly to data processing systems including large capacity, thin-film internal memories and logical systems for processing data at faster rates to provide maximum utilization of the high-speed operation of the thin-film memories, and otherwise improving systems and circuits for general purpose computing.

Many of the prior methods of performing logical and control operations in data processing systems are not adaptable for use with large capacity thin-film main memories because these methods are too slow and otherwise unsuited to the high-speed mode of operation characteristic of such thin-film memories. Further, it has been found that prior circuits and circuit arrangements for performing logical and control operations are inherently too slow to be operated efficiently or satisfactorily at the high-speed data access rate at which thin-film memories are operable. To illustrate the foregoing, it has been found that the flip-flop circuits of many prior systems require a longer operating time period for setting the flip-flop to a new state than the operating cycle time period for the completion of the reading of data and the writing of data back into a thin-film memory. Also, the time period required to reset a ferrite core in a program control arrangement requires more time than a thin-film memory cycle. In addition, the modes of operation of many prior data processing systems are not compatible with the modes of operation obtainable with the use of thin-film internal memories. In certain prior systems, for example, the data read-out of an addressed location in the memory is stored in a data storage register while the logical and control operations are being performed; and then, thereafter, the same data or new data is written-back into the same location of the memory. In the present large capacity thin-film main memory disclosed herein, for example, it has been found to be advantageous to arrange the memory to simultaneously read-out many words of data during each memory cycle time, even though only a single word is to be accessed. To prevent loss of these other words, it has been found desirable to have the signals produced therefor during read-out to be immediately written back into the memory. Thus, it is evident that this mode of operation of a thin-film memory requires that the words of data read-out be written-back immediately and it does not permit delaying the writing-back of data until after the logic is being performed as provided for in certain prior systems. However, in the present data processing system, this mode of operation of thin-film memories is found to provide certain advantages, as will become evident later in the description thereof, because of the extremely short data access times provided at the high-speed rate at which the memory cycles are performed.

In view of the foregoing, the data processing system of the present invention is directed to an improved data processing system arrangement including a magnetic thin-film main memory having a large data storage capacity (e.g., 40,000 words), a thin-film scratch-pad memory having a small data storage capacity (e.g., 80 words) and suitable high-speed logical and control circuit arrangements which provide for processing data at much faster rates in accordance with the high-speed mode of operation of the thin-film memories. Accordingly, the present invention provides a data processing system in which these logical and control operations of the data processor are completed in a basic system operating cycle which is also the time required for completing a cycle of operation of the thin-film memories. These improvements in system operation including the logical and control operations of the data processor and other improvements will be made more apparent in the detailed description which follows later.

In general, the operation of the data processing system of the present invention involves dividing data processing operations into separate groups of logical operations. These groups are referred to herein as logical operation blocks and the logical operations in any one of these logical operation blocks are capable of being performed in a system operating cycle. During each logical operation block, the memories may be accessed for desired data and a particular combination of logical circuits is rendered operable in order to perform predetermined logical operations as specified for that operation block. In the system of the present invention, a variable sequence program control apparatus is provided to selectively render operative the particular combination of logical circuits required for each logical operation block; the sequence of logical operation blocks to be performed being determined in accordance with one or more "commands." A command is composed of a series of related logical operation blocks usually performed in sequential order. Self-sequencing of logical operation blocks during execution of a command is achieved by selecting the next operation block to be performed in accordance with logical decisions made in the previous logical operation block. By use of such an approach to system operation, as summarized above, it becomes necessary to mechanize each predetermined logical circuit required for a data processing operation just once; then, whenever the logical operation represented by that predetermined logical circuit is required during a logical operation block, the predetermined logical circuit is conveniently rendered operative by means of a program control signal applied thereto from program control apparatus.

Accordingly, it is an important object of the present invention to provide an improved data processing system, as described, which overcomes the limitations of operating with relatively slow, ferrite core main memories of prior data processing systems.

Another object of the invention is to provide an improved data processing system employing novel system operating cycles by means of which versatile, high speed, overall data processing operations are achieved.

A further object of the present invention is to provide a data processing system having a large capacity, fast-acting, thin-film internal main memory.

In the processing of data by various commands, a significant number of logical operation blocks of the present system do not require access to the memories or require access to the memories for reading only. A further object of the invention, therefore, is to provide a data processing system which has the capability of performing only the required memory operations for an operation block including program control, logic, and decision operations. Thus, basic operation blocks requiring no memory access or only read-restore memory operations are performed in approximately one-half the time necessary for long operation blocks which besides including the operation provided for in the basic operating blocks also provides for writing modified data into the memory.

In the data processing system of the present invention, operation blocks of commands provide for reading data out of the memory and performing logical operation on this data while writing back the old data at the same address in the memory. It should be noted that this mode of operation provides for always immediately restoring data read from a memory, and is a feature which is highly desirable in data processors. The new data modified by the logical operations, on the other hand, is usually written into the memory during a later system cycle and more often at a different address. Accordingly, it is an object of the present invention to provide for writing-back (restoring) the old data during the performance of logical operations and, when required, to write the new data into the memory at a different address after the logical operations have been performed.

A further object of the invention is to provide system cycles of short time duration for operation blocks in a command which require performance of logical operations but do not require writing modified data back into the memory.

Yet another object of the invention is to provide a data processing system in accordance with the previous objects in which logical decisions (such as the decision to "skip," "stick," or proceed to the next operation block) and other intermediate logical operations (such as adding and transferring), can be provided for in each operation block including basic operation blocks whereby any operation block which does not require writing modified data into either of the memories can be performed in half the time period that is required when such writing into memory must be provided for during an operation block.

Another object of the invention is to provide a data processing system having novel system operating cycles of different time durations which are commensurate with the time required for the mode of memory operation to be performed in the respective operation block.

Another object of the invention is to provide an improved data processing system utilizing a high-speed thin-film memory and capable of concurrently performing program control, logic, and decision operations and only the required memory operations so that the time interval provided for an operation block is limited only by the maximum time needed for the required memory operations.

Another object of the invention is to provide an improved data processing system having a thin-film scratch-pad memory capable of operating concurrently with a large capacity thin-film main memory for performing data processing operations.

Another object of the invention is to provide a data processing system in accordance with the previous object, wherein the storage areas of the thin-film scratch-pad memory are also capable of serving as index registers, jump registers, temporary storage, and an accumulator.

Another object of the invention is to provide a data processing system in accordance with any or all of the aforementioned objects in which delay line circuit means are provided for initiating events at any predetermined time within a system operating cycle and for terminating the system cycle after completion of a single memory cycle or extending the system cycle to include a plurality of memory cycles as may be required for the most expeditious performance of required operations within the system operating cycle.

An additional object of the invention is to provide a data processing system in accordance with any or all of the aforementioned objects having an operating cycle repetition rate which is capable of conveniently being synchronized with the rate of operation of input-output equipment, while maintaining constant the high speed of operations occurring within each of the basic or long system operating cycle.

Another object of the invention is to provide an improved data processing system in accordance with any or all of the aforementioned objects which includes a thin-film main memory and read and write address registers therefor, whereby not only is provision made for automatically restoring or writing into the same address of the memory from which selected data is "read out" or "cleared," respectively; but also, provision is made for reading data from one address of the main memory and writing data into another address of the main memory during any long system operating cycle including both read-restore and clear-write operations.

Another object of the invention is to provide an improved data processing system in accordance with any or all of the aforementioned objects; wherein long or short operation blocks are performed each operating cycle; wherein a different combination of logical circuits are rendered operative by the program control means during each operating cycle; wherein both the thin-film main memory and the thin-film scratch-pad memory may be concurrently accessed during an operating cycle and each at a different address for each operating cycle; and wherein memory addressing, data storage, decision logic and other intermediate logic are dynamically performed by means of driver circuits instead of conventional flip-flop circuits so that the addresses, data and decisions are all made available at the higher rate of speed commensurate wtih the speed of operation of the thin-film memories.

An additional object of the invention is to provide an improved data processing system having an improved dynamic timing control means.

In certain general purpose data processing systems (e.g., commercial data processing systems capable of processing customer accounts) two of the most important and related factors or considerations are: (1) large internal main memory word storage capacity (e.g., 20,000 words or more); and (2) high speed operation of the memory in accessing any desired word storage location in the memory. Large word storage capacity is required to store data for a large number of accounts including account numbers for customers of a large department store or accounts for large insurance companies so that as larger groups of accounts can be processed without relying upon external data storage in tape handlers, for example, which requires interrupting the processing operation to transfer data between the internal main memory to the tape handler. The high speed operation provides for processing more data in less time which means that the system provides a greater data handling capacity, i.e., more efficient. A large capacity, high speed, internal main memory for a data processing system provides the advantage of large word storage capacity and high-speed operation, i.e., approximately six to eight times faster operation than ferrite core memories of prior data processing systems, for example. Thus, the data processing system of the present invention is capable of processing as much data as six to eight prior data processing systems. Accordingly, it is an object of the present invention to provide a data processing system having the data processing capacity many times that of prior data processing systems.

A further object of the present invention is to provide improved timing control means for operation of the thin-film memories in the present data processing system.

The specific nature of the invention as well as other features, advantages, uses, and objects thereof will become apparent from the following detailed description of an exemplary embodiment of a computer system in accordance with the invention and from the accompanying drawing for said embodiment in which:

FIG. 2 is a schematic diagram illustrating the preferred timing control system providing basic and long system operating cycles for the data processing system shown in FIG. 1;

FIG. 3 is a timing diagram for illustrating the timing of typical signals and typical waveforms of the timing signals produced by and for the timing control system shown in FIG. 2 for controlling the timing of the basic and long system operating cycles;

FIG. 4 is a schematic block diagram of the thin-film main memory including units #1 and #2, and address registers and data storage registers therefor which are illustrated more generally in FIG. 1;

FIG. 5 is a schematic block diagram of the thin-film scratch-pad memory, and address registers and data storage registers therefor which are illustrated more generally in FIG. 1;

FIG. 6a is a schematic diagram of timing control circuits for unit #1 of the thin-film main memory shown in FIG. 4;

FIG. 6b is a schematic diagram of the timing control circuits for unit #2 of the thin-film main memory shown in block diagram in FIG. 4;

FIG. 6c is a schematic diagram of the timing control circuits for the thin-film scratch-pad memory shown in FIG. 5;

FIG. 7 is a timing diagram for illustrating the timing of typical signals used in the operation of the thin-film and scratch-pad memories during a typical system cycle for a long logical operation block;

FIG. 8 is a pictorial view, partially broken away, illustrating an exemplary magnetic thin-film rod memory matrix which comprises only one of eight matrices for the main memory shown in FIG. 4, and only a small portion of this matrix, as shown, comprises the entire storage area of the scratch-pad memory shown in FIG. 5;

FIG. 9 is a pictorial view illustrating a typical rod structure and its associated word windings when inserted in the matrix of FIG. 8;

FIG. 10 is a schematic and diagrammatic view of the main memory unit #1 and scratch-pad memory employing eight matrices of the type illustrated in FIG. 8, and showing the word line and associated linear selection connection and driving arrangement employed for the main memory unit #1 only;

FIG. 11 is a circuit and block diagram illustrating details of the row and column driver and selection circuitry of FIG. 10;

FIG. 12 is a circuit and block diagram illustrating the connections and circuit arrangement for a typical sense-digit line and associated circuitry of main memory unit #1 and also the corresponding connections for a typical sense-digit line of the scratch-pad memory;

Figure 1:
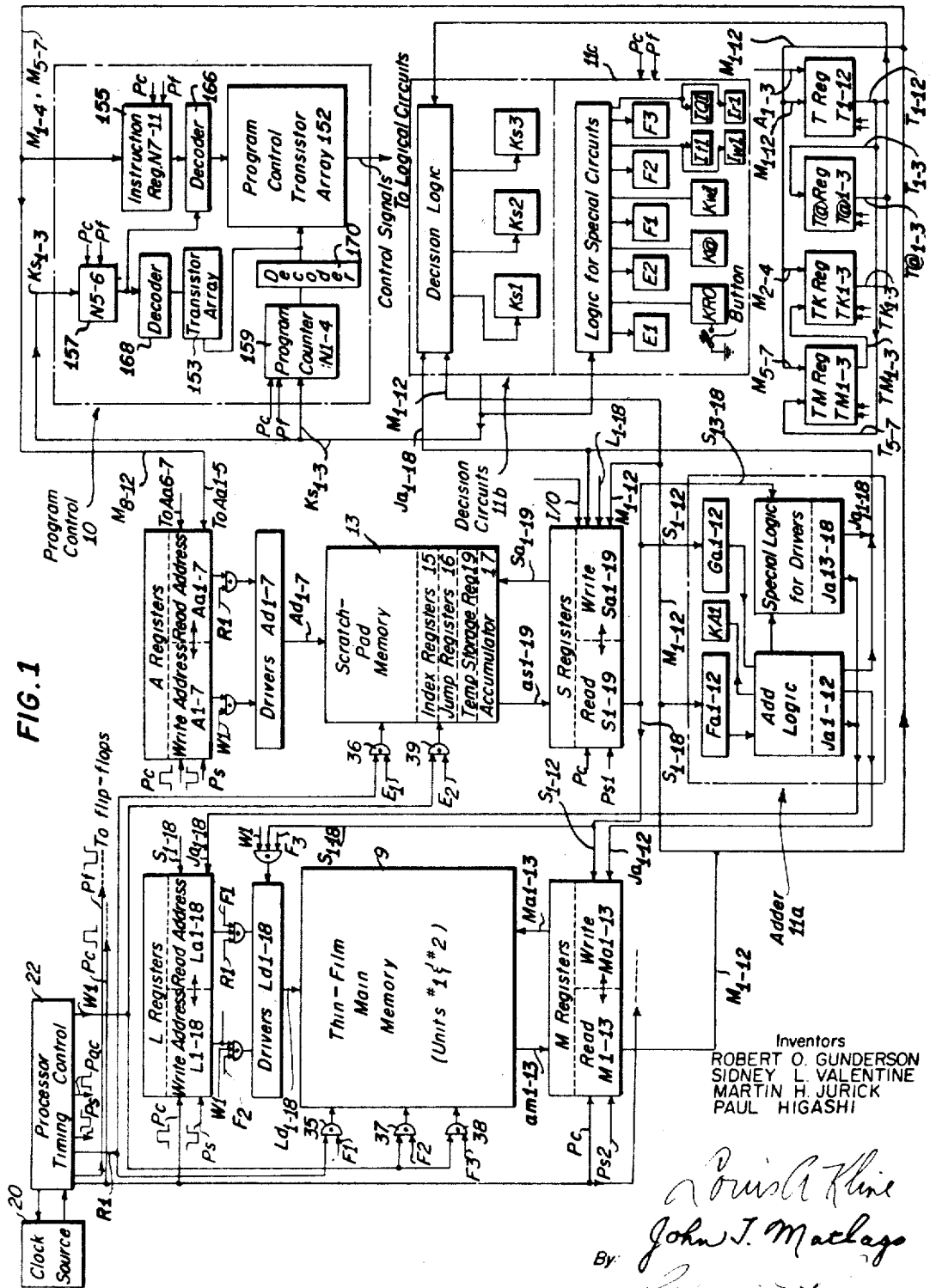
FIG. 1 is a schematic block diagram showing diagrammatically the general arrangement of the present data processing system.
Figure 33A:
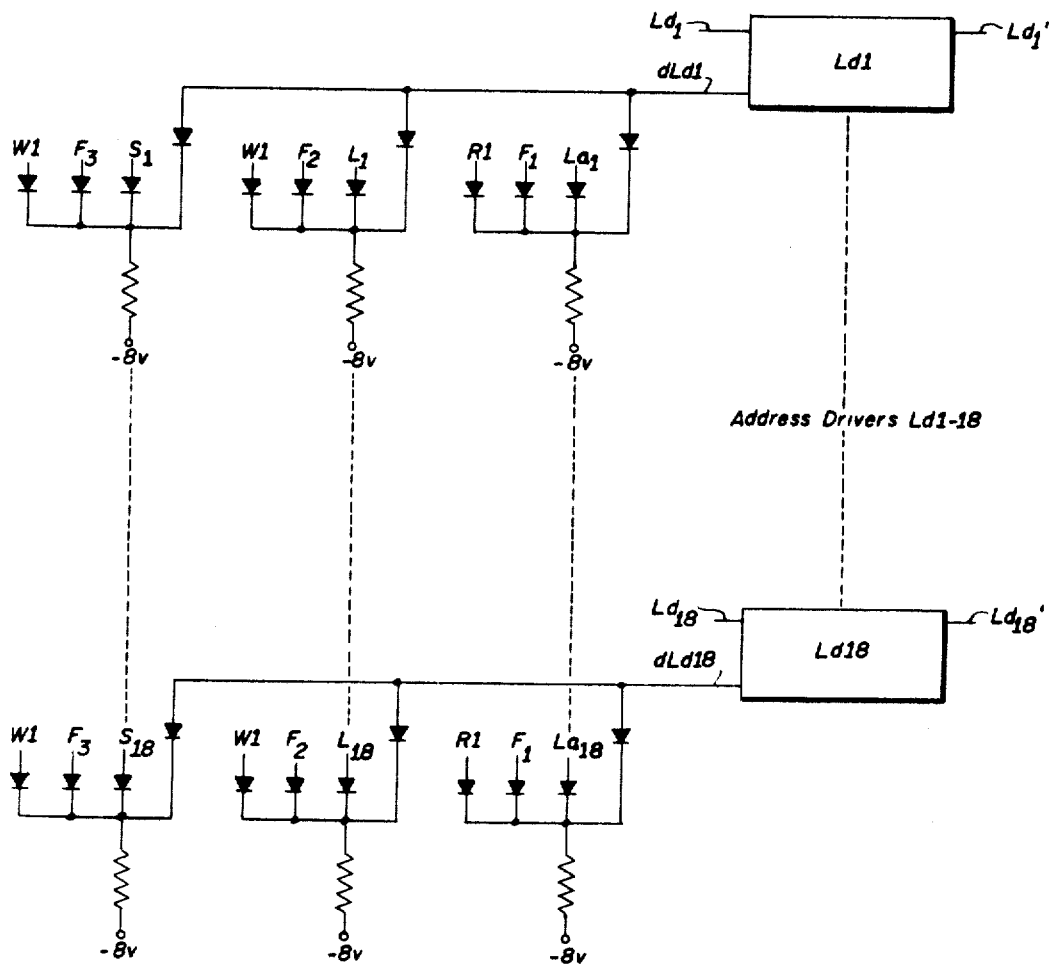
Figure 34A:
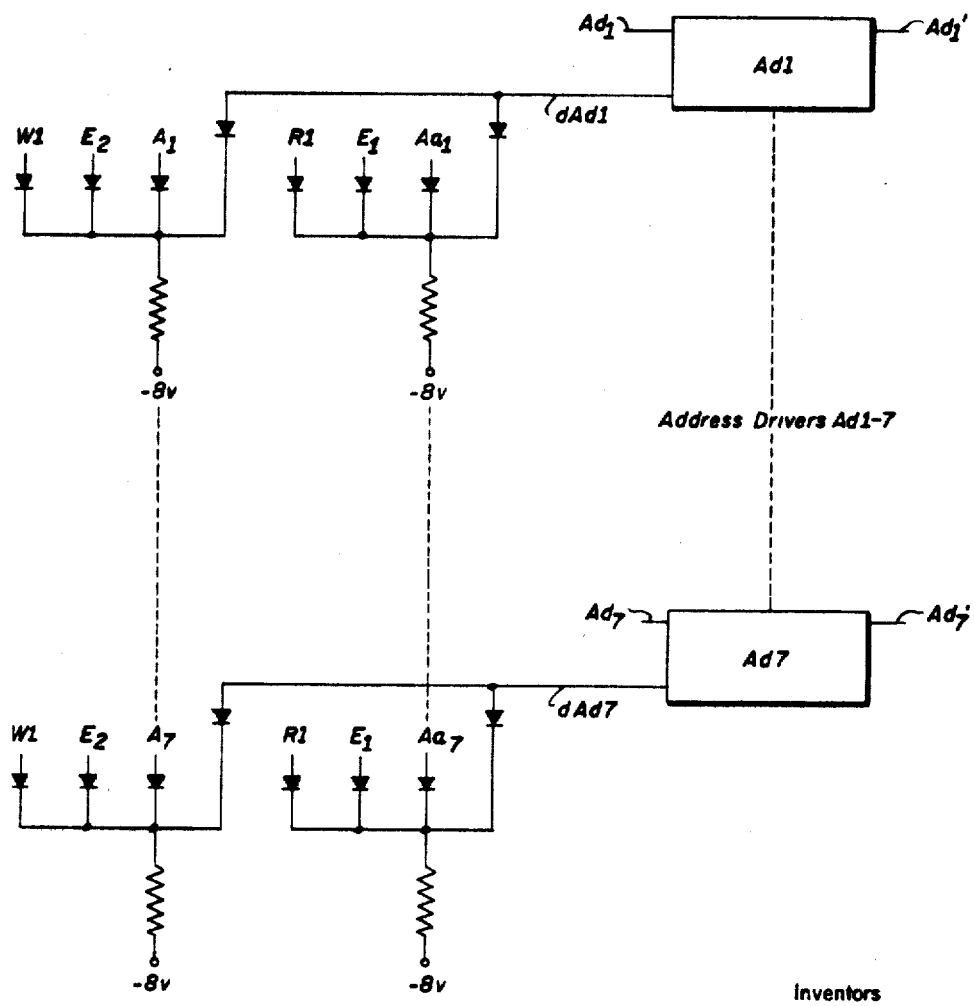
Figure 35:
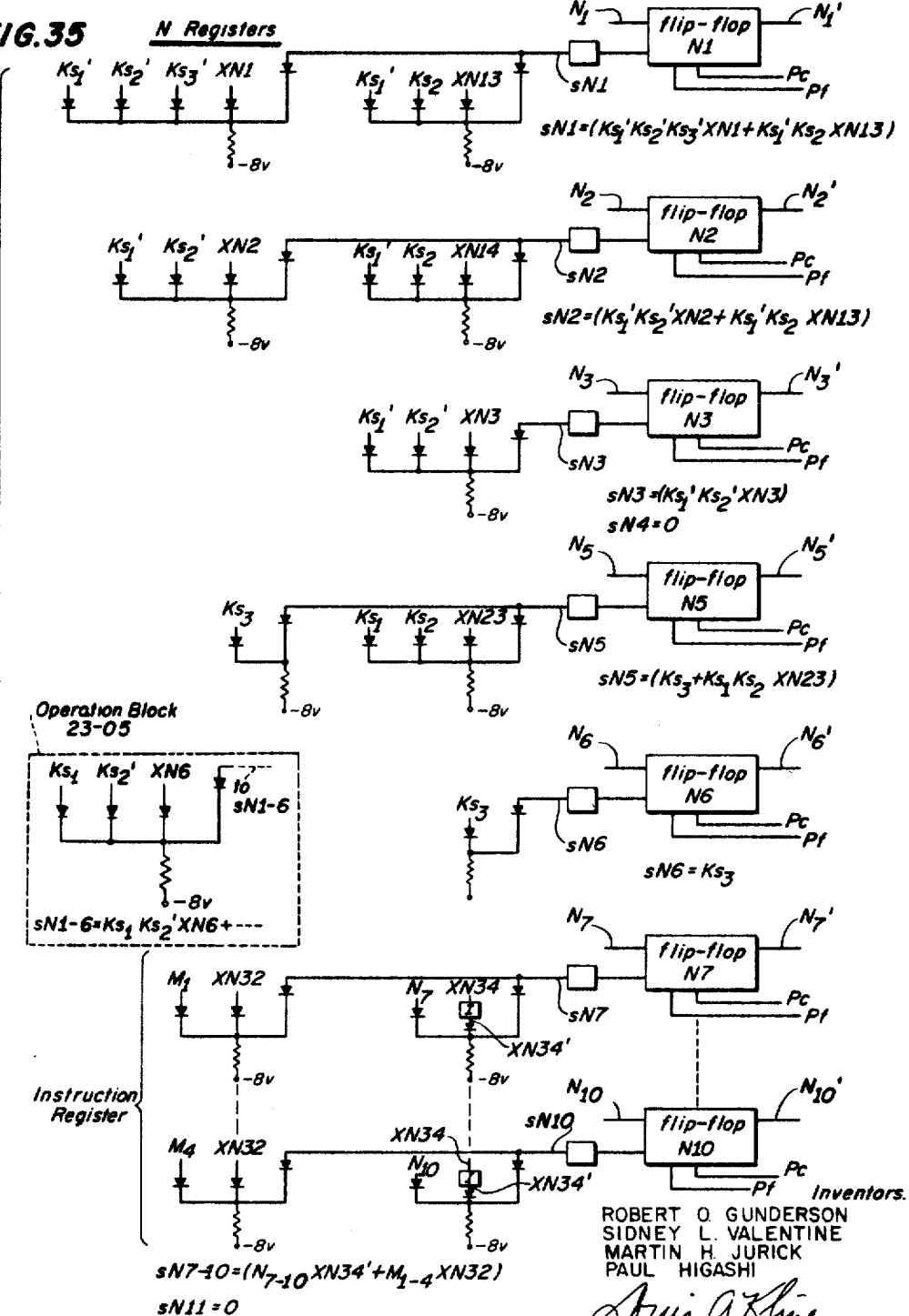
Figure 36:
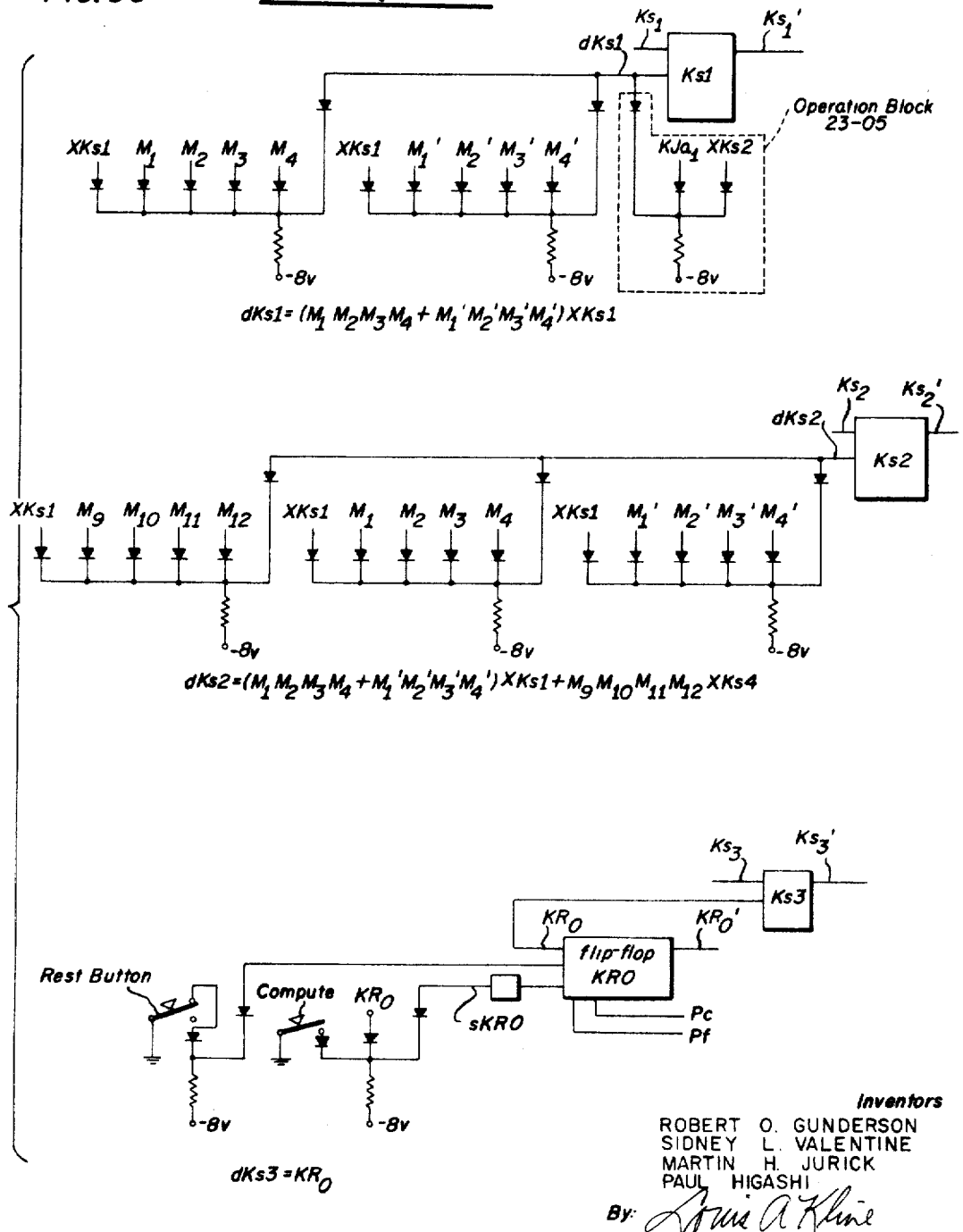
Figure 37:
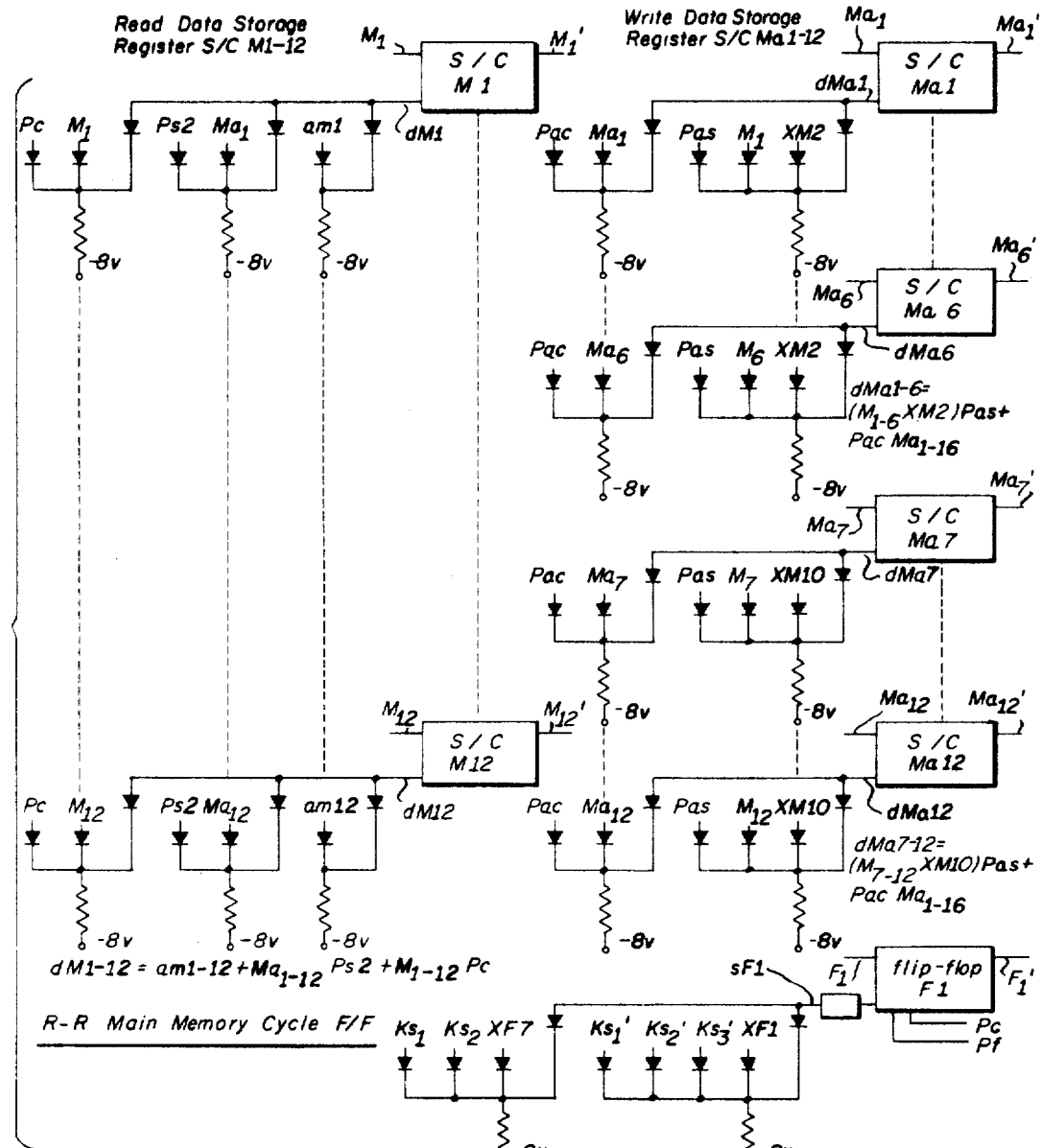
Figure 38A:
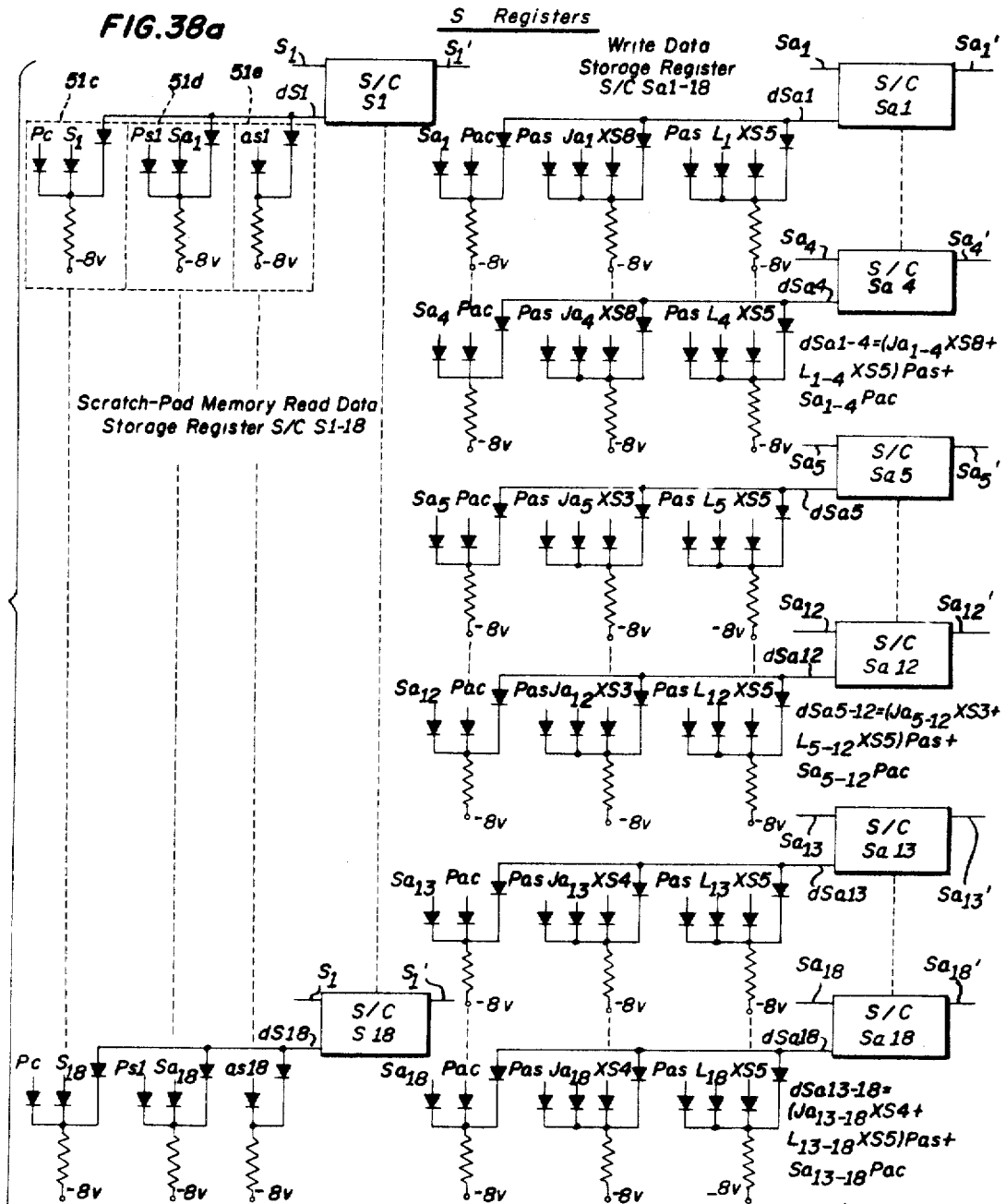
Figure 38B:
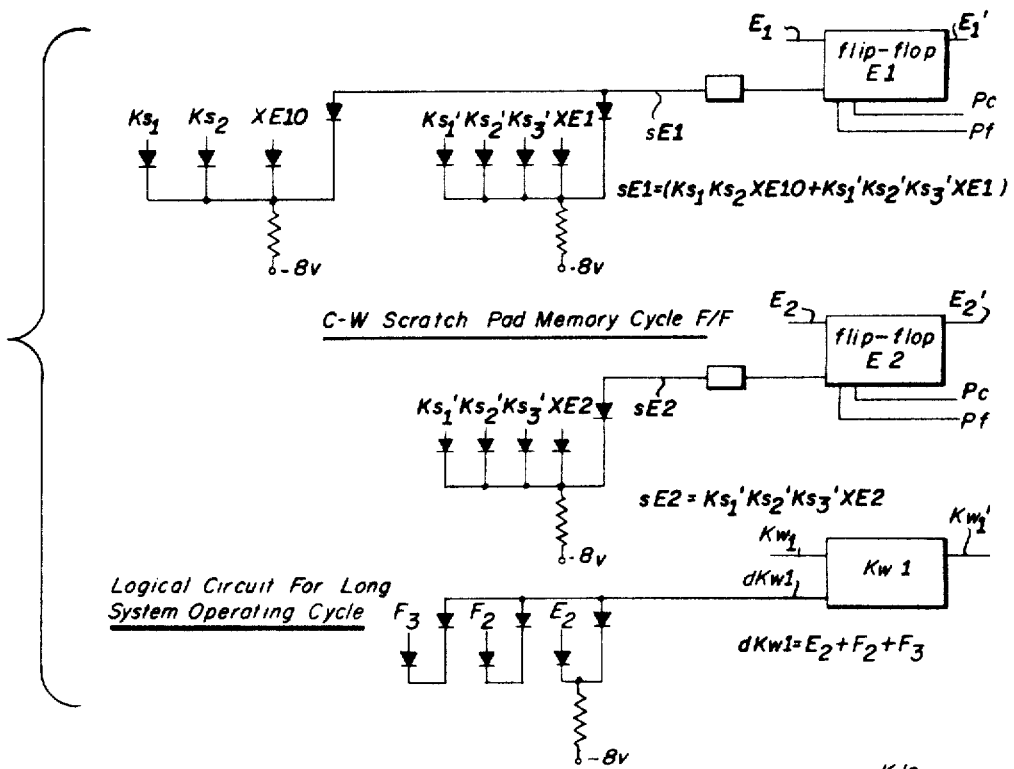
Figure 39A:
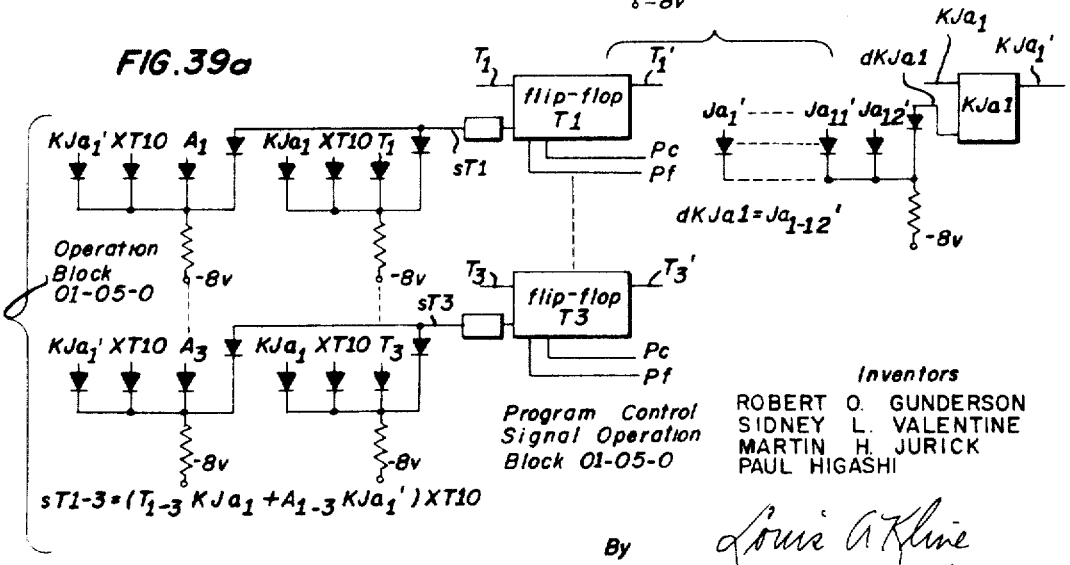
Figure 39:
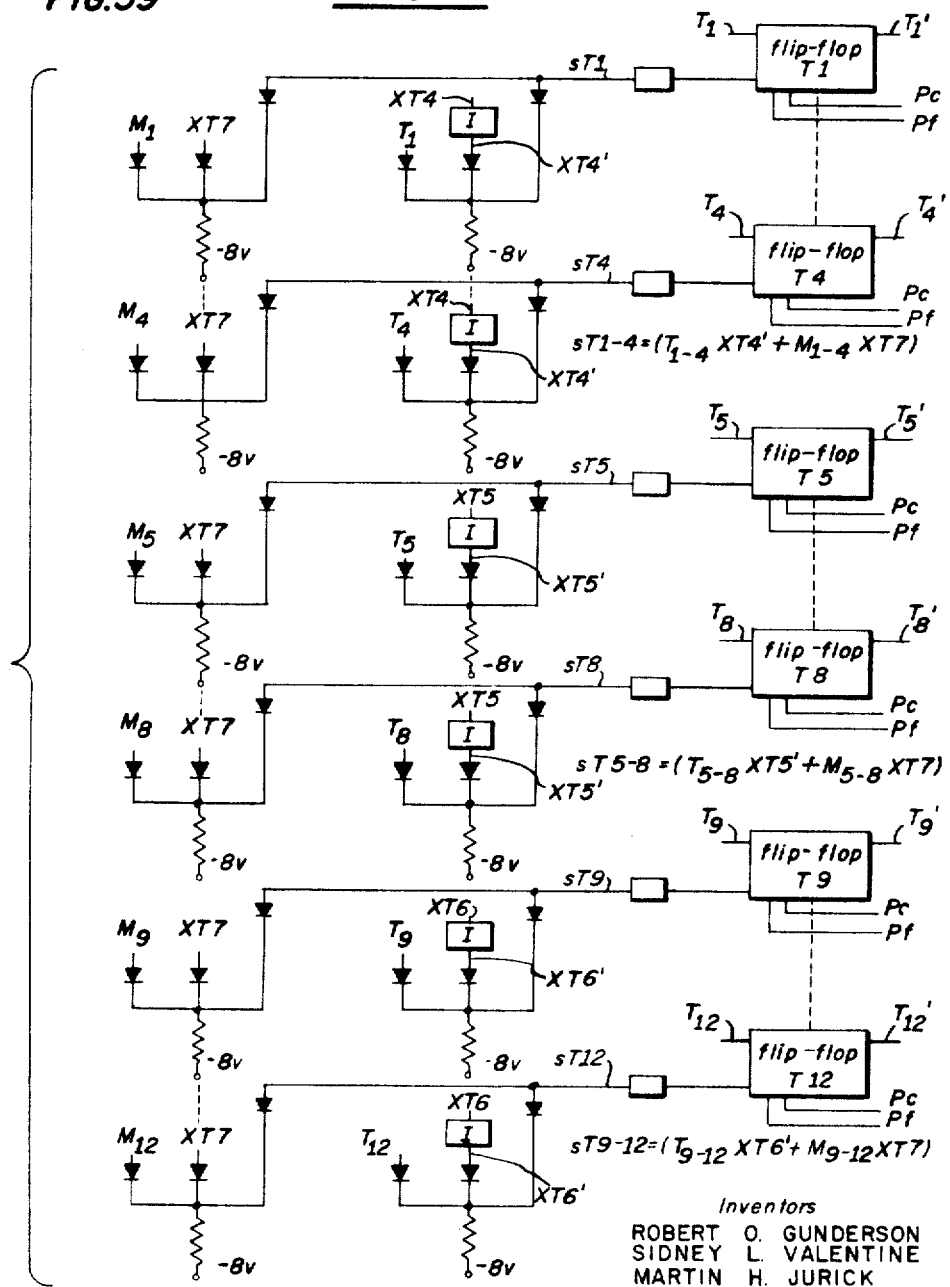
Figure 40:
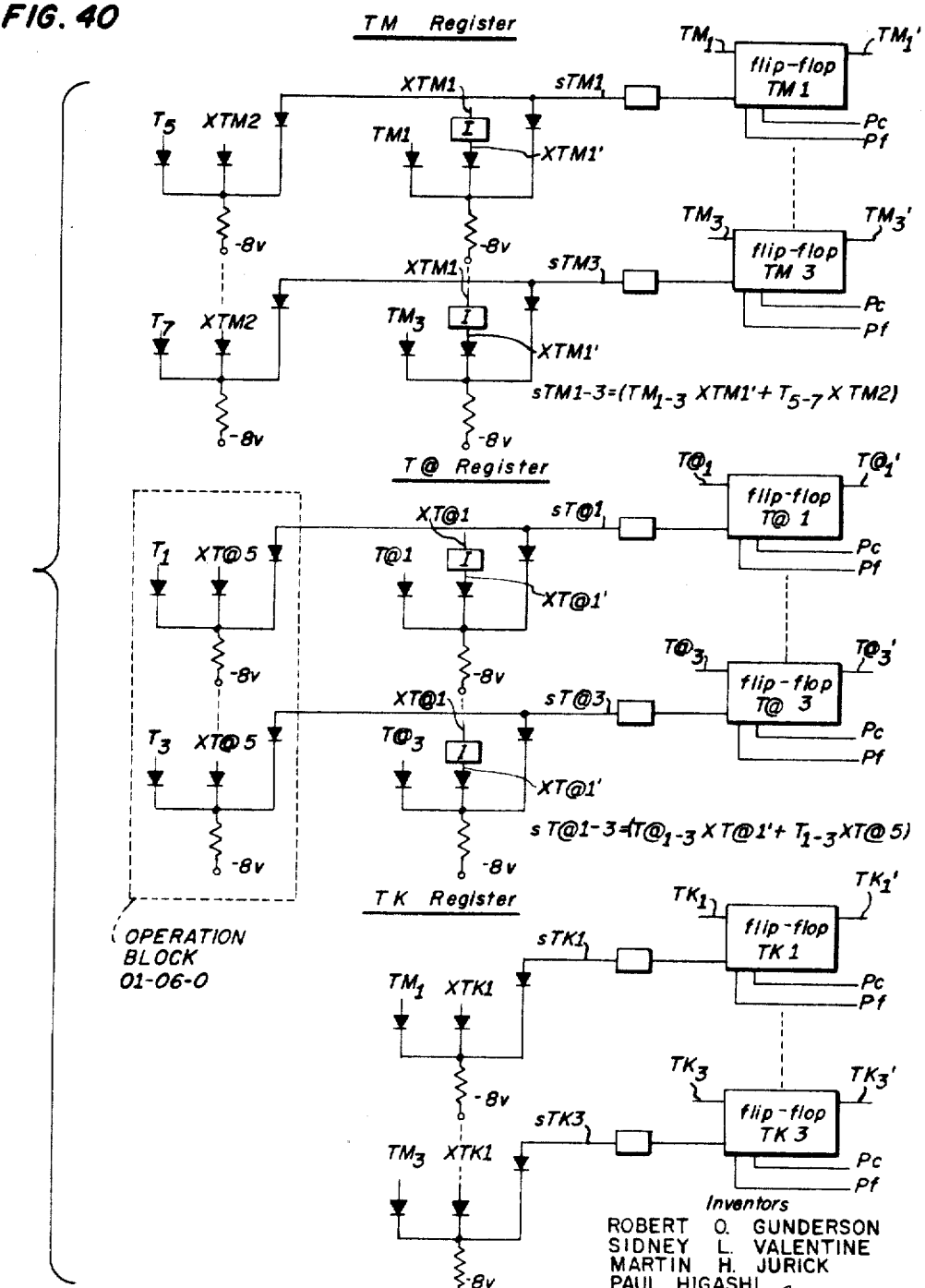

FIGS. 14a and 14b comprise a schematic diagram, partially in block form and broken away in parts, showing the program control system which is illustrated more generally in the block diagram in FIG. 1;

FIG. 15 is a detailed wiring diagram of selected transistors of the program control transistor arrays for performing logical operation blocks prior to certain commands and illustrated schematically in FIG. 14a;

FIG. 16 is a diagram showing portions of a table of the binary states of the flip-flops of the instruction register for the various processor commands;

FIG. 17 is a table showing the binary states of the flip-flops of the program counter;

FIG. 18 is a table showing the binary states of flip-flops of the instruction register and the program counter for a typical command, for illustrating typical operations of the processor;

FIG. 19 is a table showing the binary states of the flip-flops of the instruction register and the program counter for another typical command, for illustrating the operation of the processor;

FIG. 20 is a diagram illustrating the arrangement of data for a single stage command;

FIG. 21 is a diagram illustrating the arrangement of data for a double stage command;

FIG. 22 is a command flow diagram indicating exemplary commands controlled by corresponding groups of program control transistors of the program control transistor array shown in FIGS. 14a and 14b, for illustrating operation blocks common to all processor commands, single stage commands, and operation blocks specific to typical commands;

FIGS. 23 through 26 are amplified details of a portion of the command flow diagram of FIG. 22 and showing exemplary processing operations to be performed during a series of exemplary operation blocks, and the corresponding logical equations for providing the operations indicated;

FIGS. 27a, 27b, 27c, and 27d are flow diagrams illustrating processing operations on exemplary data in the series of operation blocks shown in FIGS. 23 to 26, respectively;

FIG. 28 is a detailed circuit diagram of a typical electronic, logical storage circuit including a clear-store gate and logical networks connected to a single logical input of the storage circuit, and a driver circuit providing complementary true and false outputs of two different logical voltage levels, respectively, in response to logical signals applied to the input;

FIG. 29 is a detailed circuit diagram of the holdover circuit shown in block diagram in FIG. 2;

FIG. 30 is a timing diagram showing typical waveforms produced in the operation of the holdover circuit to illustrate its operation;

FIG. 31 is a detailed circuit diagram of a typical flip-flop circuit including a single logical input circuit having a time delay for logical signals applied thereto, timing control pulse inputs and a driver circuit providing complementary true and false outputs of two different logical voltage levels, respectively, in response to logical signals applied to the single logical input circuit;

FIG. 32 shows a selected portion of the adder inputs, including a schematic circuit diagram of exemplary logical circuits, and corresponding logical equations therefor to illustrate the operations of the exemplary operation blocks illustrated in FIGS. 23 to 26, inclusive;

FIG. 33 shows the main memory address L registers, including a schematic circuit diagram of logical input gating networks, and corresponding logical equations therefor, for exemplary operation blocks as illustrated in FIGS. 23 to 26, inclusive, and as illustrated in block form by the L registers in FIG. 1;

FIG. 33a shows the main memory address drivers schematically including a schematic circuit diagram of logical networks therefor including logical networks for exemplary operation blocks as illustrated in FIGS. 23 to 26, inclusive;

FIG. 34 shows the scratch-pad address A registers schematically, including a schematic circuit diagram of logical networks for exemplary operation blocks as illustrated in FIGS. 23 to 26, inclusive;

FIG. 34a shows the scratch-pad address drivers schematically, including a schematic circuit diagram of logical networks therefor including logical networks for operation blocks as illustrated in FIGS. 23 to 26, inclusive;

FIG. 35 is a schematic diagram of the N registers including the program counter and the instruction register for the program control system, including a schematic circuit diagram of logical networks for exemplary operation blocks illustrated in FIGS. 23 to 26;

FIG. 36 is a schematic diagram of a selected portion of the decision logic circuits, shown in block form in FIG. 1, to illustrate the operations of the exemplary operation blocks illustrated in FIGS. 23 to 26;

FIG. 37 is a schematic diagram of the M registers and special read-restore (R–R) main memory cycle control flip-flop, shown in block form in FIG. 1, including a schematic circuit diagram of logical networks for exemplary operation blocks of FIGS. 23 to 26 and exclusive of parity bit circuits;

FIGS. 38a and 38b are schematic diagrams of the S registers, special read-restore (R–R) and clear-write (C–W) scratch-pad memory cycle control flip-flops, and logical circuit for providing long system operation cycles shown in block form in FIG. 1, including a schematic circuit diagram of logical networks for exemplary operation blocks of FIGS. 23 to 26 and exclusive of parity bit circuits;

FIG. 39 shows the T register schematically illustrated in block form in FIG. 1, including a schematic circuit diagram of logical networks for the exemplary operation blocks of FIGS. 23 to 26;

FIG. 39a shows a portion of the T register to illustrate selected logical operations in an exemplary command;

FIG. 40 shows certain special TM, T@ and TK registers schematically illustrated in block form in FIG. 1, including a schematic circuit diagram of logical networks for the exemplary operation blocks of FIGS. 23 to 26.

The specification has been organized under titles and subtitles as set forth in the following "Table of Contents."

1. General Description
   1.1 Brief Description of the Main Memory
   1.2 Brief Description of the Scratch-Pad Memory
2. Registers and Driver Circuits
   2.1 Address Registers and Data Storage Registers for the Main Memory
   2.2 Address Registers and Data Storage Registers for the Scratch-Pad Memory
   2.3 Other Registers
   2.4 Data Structure and Storage Thereof
3. System Timing Control
   3.1 Clock Source
   3.2 System Timing Control Circuit
4. Nomenclature
5. System Cycles
6. Description of Thin-Flm Memories
   6.1 Memory Timing Control Circuits
   6.2 Detail Description of the Main Memory
7. Program Control System
8. Command Structure
9. Typical Logical Storage Circuit
10. Holdover Circuit
11. Typical Flip-Flop Circuit
12. Operation
    12.1 Block Operation of Exemplary Commands
    12.2 Mechanization and Control of Logical Operations in Exemplary Operation Blocks
    12.3 Operation Blocks for the Load Command
    12.4 Operation of the S Register and Other Registers as Address Registers for the Main Memory

1. GENERAL DESCRIPTION

Referring now to the drawings, wherein like reference characters designate like or corresponding parts throughout the several views, there is illustrated in FIG. 1, a simplified schematic diagram of a preferred embodiment of the data processing system of the present invention. The data processing system comprises: (1) a magnetic thin-film main memory 9 having individual memory units #1 and #2 for storing information (e.g., 40,000 words) including programming data, working data and intermediate results in storage cells thereof, each storage cell having a one-word capacity; (2) a magnetic thin-film scratch-pad memory 13 containing various specially designated storage cells or registers; and (3) a data processor including: (a) processor timing control apparatus including a clock source 20 which feeds clock signals to processor timing control circuit 22; (b) program control 10 for controlling the operations of the system in the execution of commands; and (c) logical circuits including data storage registers, adder 11a, decision circuits 11b and special circuits 11c. Briefly, operation of the memories 9 and 13 is controlled by read and write pulses R1 and W1 which are provided at respective outputs of the processor timing control circuit 22. These pulses R1 and W1 are gated into the main memory 9 and scratch-pad memory 13 having their own individual memory timing control circuits which provide for timing their internal operations synchronously with the operation of the data processor. As will be discussed, infra, in connection with FIG. 2, the processor timing control circuit 22 is employed to define, during each basic operating cycle of the processing system: (1) the timing of the operation of reading and writing data in the main memory 9 and the scratch-pad memory 13 by read and write pulses R1 and W1, and (2) the timing of the operation of the program control 10, decision circuits 11b, address and storage registers and other logical circuits by the application of timing control pulses to the flip-flops and other logical storage circuits in order to advance the logical sequencing of the processing system.

1.1 *Brief description of the main memory*

In the preferred embodiment of the present invention, each of the main memory units #1 and #2 has a storage capacity of 20,000 words providing a total storage capacity of 40,000 words. The basic information unit in the processing system is a word which consists of 12 bits plus a parity check bit, i.e., a total of 13 bits. Each memory unit of thin-film main memory 9 provides an assigned address for each storage cell or stored word location and each word location is individually addressable by common address registers, i.e., the read and write L registers (La1–18, L1–18) or under certain conditions by the S register (S1–18 only). It should be noted that storage circuit S19 of the S register stores the parity bit which is not used as part of the address. The outputs of any selected one of these registers (L1–18, La1–18 or S1–18) are applied to the inputs of address drivers Ld1–18 to provide address output signals $Ld_{1-18}$ for the address logic in the main memory 9. The thin-film main memory 9 stores the program information, i.e., the commands, as well as the working data and intermediate results, and there is no restriction on the assignment of memory cells for the program or data. Information is transferred to, from, and between the various memories in the form of parallel information bits comprising one or more words which are also in parallel, i.e., each of the twelve bits of a single word as well as the words themselves are transferred simultaneously in parallel rather than in sequence, as in a series transfer. Arithmetic operations in the adder 11a also process both complete words and their respective bits in parallel.

1.2 Brief description of the scratch-pad memory

The scratch-pad memory 13, which is included as a part of the processor, contains various special registers, including, for example, index registers 15, jump registers 16, temporary storage registers 19, and an accumulator 17. These registers in the scratch-pad memory 13 are accessible externally via the input-output lines I/O to the S register by means of commands or by a keyboard (not shown). The scratch-pad memory 13 comprises eighty memory cells, sixty-four of which comprise the index and jump registers 15 and 16, in which each memory cell stores eighteen (18) bits plus a parity check bit. The accumulator 17 comprises eight memory cells for storing eight words, in practice each word normally containing twelve bits plus parity although each cell is capable of storing a word of eighteen bits plus a parity bit. The register for temporary storage 19 consists of eight memory cells for temporary internal storage of eighteen bit words (plus parity) which are used by the processor during the execution of certain commands.

In order to provide access to the 40,000 words stored in the thin-film main memory 9, an eighteen-bit address is required. This address consists of four decimal coded-binary-digits of four bits each and an additional two bits. The most significant bit (L$d$18) for individually addressing of particular one of the memory units #1 and #2 and the remaining bits L$d_{1-17}$ are used in combinations as described later in the description of the main memory 9. The scratch-pad memory 13, on the other hand, is accessed by an address consisting of seven bits. Detailed descriptions of the scratch-pad memory 13 and main memory 9 are set forth infra in connection with FIGS. 4 to 13.

2. REGISTERS AND DRIVER CIRCUITS

In the present system, the data processor includes the registers shown in block form in FIG. 1. These registers include not only the electronic logical storage circuits or flip-flop circuits, e.g., as shown in FIGS. 28 and 31, respectively, but also the logical networks associated with the respective flip-flops and other logical storage circuits as illustrated by the exemplary logical input networks for the registers shown in FIGS. 33 to 35, inclusive, and FIGS. 37 to 40, inclusive. In the adder 11$a$, blocks for input circuits F$a$1–12 and G$a$1–12 include their respective logical input networks as indicated by the exemplary logical input circuits shown in FIG. 32. The decision logic for drive circuits K$s$1–3 is illustrated by the typical logical input networks shown in FIG. 36. Similarly the logic for the special circuits 11$c$ in FIG. 1 is indicated by typical logical input networks coupled to respective flip-flops F1 and E1, E2 in FIGS. 37 and 38$b$.

2.1 Address registers and data storage registers for the main memory

A brief discussion of each register shown in FIG. 1 will now be presented in order to disclose the manner in which information is transferred or distributed in the processing system. Associated with the thin-film main memory 9 are the L registers and the M registers. Each of the L registers includes eighteen individual storage circuits L1–18 and L$a$1–18, respectively, each register providing storage for eighteen bits. These L registers are used as the write and read address registers, respectively, for the main memory 9. Logical storage circuits L1–17 or L$a$1–17 are capable of designating an address ranging from 00000 to 19999 to provide access to each of 20,000 storage cells in each of the memory units #1 and #2, and the particular memory unit #1 or #2 is selected by storage circuit L18 or L$a$18 via driver L$d$18. As shown in FIG. 1, the storage circuits L1–18 comprise the write address L register which provides the address of the memory cell for writing; and the storage circuits L$a$1–18 comprise the read address L register which provides the address of the memory cell for reading. Accordingly, the outputs of storage circuits L1–18 are gated to drivers L$d$1–18 during clear-write (C–W) main memory cycles only; and the outputs of storage circuits L$a$1–18 are gated to drivers L$d$1–18 during read-restore (R–R) main memory cycles only. In addition, the storage circuits S1–18 of the S registers are capable of providing the write address during certain commands (e.g., "move" command) instead of the storage circuits L1–18; and the outputs of storage circuits S1–18 are gated to the drivers L$d$1–18 during clear-write (C–W) main memory cycles only in predetermined operation blocks when the flip-flop F3 is true (F$_3$). In each main memory cycle, selection of one group of outputs of the desired storage circuits L1–18, L$a$1–18 or S1–18 to provide the address for the main memory 9 is provided by logical AND gates individually connecting outputs of the respective storage circuits to drivers L$d$1–18. Thus, the write address outputs (L$_{1-18}$) of storage circuits L1–18 are gated to drivers L$d$1–18 by write pulse W1 and the true (low logical level, $-3$ v.) output F$_2$ of C–W memory cycle flip-flop F2; the read address outputs (L$a_{1-18}$) of storage circuit L$a$1–18 are gated to inputs of drivers L$d$1–18 by read pulse R1 and true (low) logical level output F$_1$ of R–R memory cycle flip-flop F1; and the outputs of storage circuits S1–18 are gated by write pulse W1 and true (low) logical level output F$_3$ of C–W memory cycle flip-flop F3. In system cycles including a C–W main memory cycle, in most instances, the write L register (L1–18) supplies the write address to drivers L$d$1–18 and therefore output F$_2$ is true. However, in the remaining of these system cycles including a C–W main memory cycle, the output F$_3$ is true and output F$_2$ is false and the S register (S1–18 only) supplies the write address to drivers L$d$1–18 instead of the write L register (L1–18). In turn, the outputs L$d_{1-18}$ of the drivers L$d$1–18 are coupled to memory decoding and selection circuits for access to the addressed memory location as shown and described in connection with FIGS. 4 to 13.

Data storage for reading and writing in the main memory 9 is provided by the read and write M registers including the storage circuits M1–12 of the read M register and storage circuits M$a$1–12 of the write M register. Storage circuits M13 and M$a$13 store the parity bit. Thus, storage circuits M1–12 of this read R register store the information being read-out of the main memory 9 and storage circuits M$a$1–12 store information being written-into the main memory 9.

2.2 Address registers and data storage registers for the scratch-pad memory (FIG. 1)

The A registers and the S registers are provided for the scratch-pad memory 13. The A registers, however, include only seven storage circuits A1–7 in the write address A register and seven storage circuits A$a$1–7 in the read address A register. The functions of the A registers are similar to the L registers in that they determine which memory cell in the scratch-pad memory 13 will be accessed during scratch-pad memory cycles. Each of the S registers includes nineteen storage circuits, i.e., S1–19 and S$a$1–19, and their respective logical input networks. The primary function of the S registers is similar to the M registers in that any information which is read from or written into the scratch-pad memory 13 passes through the S registers. In addition, information transferred to and from the data processing system passes through the S register, as indicated by the input and output line I/O to the S registers in FIG. 1. This information transfer is to and from peripheral input-output equipment (not shown) to either the scratch-pad memory 13 directly from the write S register (from the keyboard) or via both write and read S registers to the main memory 9 through the write M register (from the keyboard or other peripheral equipment). Storage circuits S1–18 are used for storing information bits while storage circuit S19 stores the parity check bit during read-out of the scratch-pad memory 13. The eighteen-bit storage capacity of the scratch-pad memory 13 and each of the S registers is required in order to handle the higher order addresses of cells in the main memory 9. During scratch-pad memory cycles in which one of the cells for the accumulator 17 is accessed, only twelve bits of information, i.e., a word, is transferred from the addressed accumulator cell. The operation of the scratch-pad memory and the S registers will be discussed in detail later in the detailed descriptions of the timing control apparatus shown in FIG. 2 and the scratch-pad memory 13 shown in FIG. 5. Also, as noted earlier, the S register (S1–18 only) is used in some instances to provide the write address for writing into the main memory instead of the write L register (L1–18).

2.3 Other registers

In the program control 10, flip-flops N1–11 are used for individual selection of transistors in the program control transistor arrays 152 and 153 for controlling the operation of the data processing system. Flip-flops N7–11 comprise the instruction register and are used for storing the command code or instruction while flip-flops N1–4, designated as the program counter flip-flops, complete the coordinate selection for the transistors in the program control transistor array 152. The term "program counter" as used herein, refers to the flip-flops N1–4 and the logical networks associated therewith as shown, for example by typical logical networks in FIG. 35.

The T register including flip-flops T1–12 and the flip-flops of the remaining registers, TM, TK, and T@ provide temporary storage of certain information required and not otherwise immediately available for making decisions in the control of the sequence of operations of the computer system. The T, TM, T@, and TK registers are used internally by commands and some of their many functions will become more apparent in the detailed description, infra.

The adder 11a, in addition to its ordinary function of adding, provides for the transfer, without addition or subtraction, of data between the S and M registers and from the S registers to the L registers. The adder thus provides a convenient logical circuitry connecting the S, L, and M registers and minimizes the logical circuitry necessary for data transfer between these registers. It will be noted, from the description of FIGS. 23–26, that the transfer of data without change is made by adding a zero to the information being transferred.

The jump register 16 is used primarily for the storage of the starting addresses of subroutines which will automatically be entered if, during the execution of certain double stage commands, certain abnormal conditions are encountered. These conditions relate to peripheral equipment which have not been indicated in FIG. 1, but examples of these conditions comprise sensing a signal indicative of the end of the paper on a high speed printer, the end of the tape on a magnetic tape handler, read or write errors detected on the magnetic tape handler, or a parity error detected while reading a punched paper tape. Any one of these conditions may occur during access to peripheral equipment and will cause predetermined subroutines while the starting addresses are stored in the jump register 16 to take appropriate action.

The accumulator 17 is a register having a storage capacity of eight words of twelve bits each. Its primary function is to store intermediate and final results of arithmetic operations. The sign of a number is not stored in the accumulator itself, but is stored by the flip-flop K@ in the group of special circuits 11c. The effective length of the accumulator may vary from one to eight words, depending upon the length of the information, e.g., number of words it contains. The T@ register stores the effective length of the accumulator. If, for example, a four, five, or six-digit number is in a memory field having a length of eight words, and the field is transferred from the main memory 9 to the accumulator 17, the effective length of the accumulator will be two words and the remaining words of the memory field which are zeroes will be ignored. Only information contained in the effective portion of the accumulator will be considered by the processor. In the above example, the six remaining words, i.e., the total length of eight words less the effective length of two words, are automatically ignored when the new sum in the accumulator is used for additional arithmetic operations, if the sum is to be stored in the main memory, or if it is to be used by a command to indicate quantity.

In transferring the number from the main memory 9 to the accumulator 17, the storage circuits A1–7 in the A register, and the flip-flops T1–4 in the T register are set to 7. The words in the main memory 9 are transferred to the accumulator 17 through the adder 11a. As each word is transferred to the accumulator through the adder 11a, storage circuits A1–3 are decremented by one. If the word being transferred contains a significant digit, the flip-flops T1–4 are set by outputs of storage circuits A1–3. After the last word is transferred from the main memory to the accumulator and in the following operating cycle, the flip-flops T@1–3 of the T@ register are set by the outputs T1–4 of the flip-flops T1–4.

Any memory cell in the index registers 15, jump registers 16, or the accumulator 17 may be accessed by certain commands or manually from the input keyboard (not shown) in order to store or change the number in the addressed register. Access to the registers in the scratch-pad memory 13 is provided through the S registers at the address placed in the A registers. The foregoing is provided by lines connected directly from the input keyboard to logical networks of storage circuits A1–7 and Sa1–18 in the respective A and S registers.

2.4 Data structure and storage thereof

Prior to considering the details of the present data processing system, the details of the basic data structure employed in the system will be considered. Hexadecimal and decimal digits and alpha-numeric characters are employed throughout the system and are represented by four-bit and six-bit configurations, respectively. Sixty-four alpha-numeric characters, comprising the upper case letters of the alphabet, some lower case letters of the alphabet, and certain symbols, are represented by a six-bit configuration. The hexadecimal digits, or more simply, digits, lend themselves to binary configurations since four bits can be arranged in sixteen ways wherein 0, 1, 2, 3, 4, 5, 6, 7, 8, 9, @, (,), space, (&), (.), and (-) represent the sixteen different configurations of four binary digits or bits. The term "digit" refers to any of the sixteen possible configurations obtainable with four bits, while the term "character" will refer to any six-bit configuration.

The binary configuration of each word consisting of twelve bits may be considered as either representing characters or digits. The following illustrations are examples of a word of information wherein a six-bit configuration is employed to represent the letters B and R.

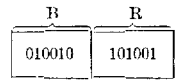

In the next example, the same word is used, but in this instance its binary configuration is considered as representing hexadecimal digits in which a word is capable of storing three digits instead of two characters as illustrated above.

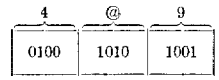

A unit of information commonly exceeds the capacity of one word; therefore, a main memory field consisting of as many as eight adjoining words may be used for storage of a unit of information, e.g., a command or operand. The main memory field is variable in length to accommodate units of information varying in length. The variable length utilizes the memory capacity more efficiently and provides for greater speed in the execution of commands in which shorter units of information or operands are being accessed. Since the maximum field length for a unit of information is eight (8) words (each word having a capacity of three (3) digits), the maximum length of a positive number is twenty-four (24) digits. If the unit of information is a name or description employing characters (each word having a capacity of two (2) characters) the eight words provide a maximum length of sixteen (16) characters. In the storage of digits, the sign of a negative number is stored in the most significant digit position and the maximum length of a negative number, not including the minus sign, is twenty-three (23) digits. The following is an illustration of a positive number 2398645 which is stored in a memory field of five words starting at the memory address 100.

| | Memory Field | | | | |
|---|---|---|---|---|---|
| Cell address | 100 | 101 | 102 | 103 | 104 |
| Positive number | 000 | 000 | 002 | 398 | 645 |

A negative sign would be stored in the most left digit position at the most significant end of the main memory field (e.g., memory address 100 in the illustration), and the absence of a negative sign indicates a positive number. It will be noted that the least significant word is located at the highest order address of the memory field, as illustrated in memory address 104. The address of the most significant word depends on the length of the number wherein the most significant digit is in the highest order address of a word in the field containing a significant digit, as illustrated at address 102. The lower order address of words in the memory field which are not significant digits and are all zeroes are provided, for example, for the storage of a larger number resulting from addition, etc., to the number in the memory field, and is to be stored in the same memory field. In the foregoing example, the field could be limited to three words to store the significant digits of the number 2398645 with the sign stored in the most significant digit position of the word at address 102.

3. SYSTEM TIMING CONTROL

Referring now to FIG. 2 for a description of the timing of the data processing system of the present invention, the system timing control is shown diagrammatically to include a clock source 20 and a system timing control circuit 22 which generate timing control pulses for timing of the operations of the processing system including the main memory 9, scratch-pad memory 13 and processor logical circuits. Timing control of the respective operations is provided during each of two different types of system cycles, e.g., basic system cycle #1 (FIG. 3) for basic logical operation blocks including a read-restore (R–R) memory cycle and logical and control operations of the processor, and a long system cycle #2 (FIG. 3) including a R–R memory cycle, a clear-write (C–W) memory cycle and logical and control operations of the processor. The discussion of FIG. 2 which follows, when considered with the illustrative timing control pulse waveforms produced, as shown in FIG. 3, provides a description of the timing of operations in the different type of system cycles which provide for performance of the respective various logical operation blocks that make up the commands.

The timing control function of the clock source 20 and system timing control circuit 22, shown in FIG. 2, is to properly initiate and control the timing of logical operations of each system cycle (e.g., system cycles #1 and #2) by generating the timing control pulses and outputs shown in the timing diagram of FIGS. 3a to 3j.

Once the system cycle is intiated, by the formation of a clock pulse C by the clock source 20, it will be completed in the immediately succeeding time period (e.g., either 800 nanoseonds for a basic operation block or 1600 nanoseconds for a long operation block) to provide for high speed operation of the data processing system and maximum utilization of the high speed capability of the thin-film memory (approximately 800 nanosecond cycle time for a read operation). Unless the processing system is interrupted for operation with slower operating peripheral equipment (e.g., tape or card handler, etc.), the clock pulses C will be produced, for example, at a 1.25 megacycle (mc.) rate for basic operation blocks or at a 625 kilocycle (kc.) rate for long operation blocks.

Referring more particularly to the timing control circuit 22 shown in FIG. 2, it was seen above that it provides for a read-restore (R–R) memory cycle and logical operations of the processor in any single one of the basic system cycles (for basic logical operation blocks); or both read-restore (R–R) and clear-write (C–W) memory cycles and logical operations in any single one of the long system cycles (for long logical operation blocks). While the shorter basic system cycle provides sufficient time for a R–R memory cycle, it should be evident that, in certain instances, basic system cycles do not include operation of either one of the memories through a memory cycle, as determined by the states of memory cycle control flip-flops $EI$–2 and $FI$–3 (FIG. 1).

In order for the same delay line control circuit to provide both types of system cycles (with and without C–W memory cycles), a timing driver $Kw1$ (FIGS. 1 and 38$b$) supplies a high logical level signal at output $Kw_1'$ to OR gate 23 to pass the high logical level clock C therethrough, or driver $Kw1$ supplies a low logical level signal at output $Kw_1'$ to OR gate 23 to block passage of clock pulse C. The driver $Kw1$ provides a high logical level signal at output $Kw_1'$ at the beginning of and throughout long system cycles, i.e., system cycles which include a C–W memory cycle as required by the long operation block being performed. Provision is made therefor by connecting the logical input of driver $Kw1$, as shown in FIG. 38$b$, to the true outputs of $E_2$, $F_2$ and $F_3$ of flip-flops E2, F2 and F3. Thus, whenever any one of these flip-flops E2, F2 or F3 is in a true state, the driver $Kw1$ will provide a high logical level signal at its false output $Kw_1'$. The high level output $Kw_1'$, as shown, will permit the output of OR gate 23 to go to the high logical level for the time period of the clock pulse C. Thus, the clock pulse C is passed from the first half of delay line 40 (sections 44, 45 and 46) to the last half of the delay line 40 (sections 47, 48 and 49) to produce write pulse W1 at timing output W1 as the clock pulse C passes through the latter. This pulse W1 provides for initiating the C–W memory cycle in the current system operating cycle. The next system cycle is not initiated until after the clock pulse C completely passes through the last half of the delay line 40 at which time sum output line 31 returns to the low logical level to enable AND gate 21 for the next system cycle.

During basic system cycles, none of the flip-flops E2, F2 and F3 are in a true state. Accordingly, the driver $Kw1$ supplies a low logical level false output $Kw_1'$ (e.g., system cycle #1, FIG. 3$m$) during basic system cycles and the output of OR gate 23 is maintained at the low logical level (OR gate 23 blocks passage of the clock pulse C) thereby terminating the system cycle after the time period for the R–R memory cycle and logical and control operations of the processor. Blocking of passage of the clock C in this manner prevents the initiation of a C–W memory cycle for the reason that the clock C is not passed to the last half of the delay line 40, and consequently, no write pulse W1 is produced for initiation of a C–W memory cycle in this system operating cycle. At the same time, when the clock C is blocked, the sum output line 31 is immediately returned to the low logical level at the input of AND gate 21 to enable this gate and clock source 20 to produce another clock pulse C for initiating the next system operating cycle. Accordingly, the system operating cycle is completed in the shorter time period (e.g., 800 nanoseconds) to allow for higher speed operation when no C–W memory cycle is required by the operation block of the command being executed.

Referring now to FIGS. 2 and 3 for a more detailed description of both the clock source 20 and system timing control 22; the clock source 20 is shown to include logical circuits for initiating system cycles by controlling the generation of clock pulses C that are supplied to the input of delay line 40 of the system timing control circuit 22. In response to each of the block pulses C, the system timing control circuit 22 produces timing pulses R1, P$s$, P$ac$ and P$as$ for each system cycle including basic system cycles (e.g., system cycles #1 illustrated in FIG. 3); or in addition, a timing pulse W1 for each long system cycle including both R–R and C–W memory cycles (e.g., system cycle #2).

3.1 Clock source

The logical circuit arrangement of clock source 20 is such that it provides for successive clock pulses C at different rates depending upon whether basic operation blocks are being performed, long operation blocks are being performed or the processing system is operating with peripheral equipment. It should be noted that the time duration of the basic system cycle and the longer time duration of the long system cycle remain constant even when operating with peripheral equipment. In order to provide for these different repetition rates and proper shaped clock pulses C, clock source 20 is shown in FIG. 2 to include double inverter circuits D/I G0 and D/I G1 which are interconnected by a portion of delay line section 43 and AND gate 25. The portion of the delay line section 43 that is coupled to AND gate 25 determines the minimum width signal necessary to produce a signal at input $g1$ and a clock pulse C at the false output $G_1'$. Thus, only signals of longer duration than the time period of delay between the taps of this first portion of the delay line section 43, are capable of producing a clock pulse C, and any noise or other spurious signals of a lesser time duration are not passed by AND gate 25 which requires coincidence of low logical level signals at its inputs. The true output $G_1$ of D/I G1 supplies the low level timing control pulse P$f$ directly, while the false output $G_1'$ supplies the high logical level clock pulse C to the delay line 40 and the normally low logical level timing control output which includes a high logical level clear pulse P$c$, as shown.

Operation of the processor at its normal operating rates for basic and long system operating cycles (approximately 1.25 mc. or 625 kc.) is provided by a low level output from OR gate 28 which provides an enabling signal at the input to AND gate 21 having another input connected to the sum output line 31. The pulse C$g$ is produced in response to low level output of AND gate 21 and this pulse C$g$ is coupled to the input $g0$ of the double inverter G0 through voltage level adjusting diodes as shown. The true output $G_0$ of double inverter D/I G0 is coupled back to input $g0$ via OR gate 28 and AND gate 21 for "latching," i.e., maintaining the state of D/I G0 until the clock pulse C is applied to delay line 40. Output $G_0$ is coupled to the input of delay line section 43 to "turn on" double inverter D/I G1 for producing clock pulses C and timing control pulses as described previously. The reason for "latching" D/I G0 is because the duration of the signals applied to OR gate 28 is not necessarily of sufficient time duration to produce a pulse C$g$ of the time duration as shown. The "latching" of D/I G0 assures formation of the pulse C$g$ by holding D/I turned on until the clock pulse C is coupled to delay line input 44$a$ and back to AND gate 21 via sum line 31 to block this gate 21 and thereby turn-off D/I G0 at this later time.

In the clock source 20, the logical circuits for generating clock pulses C (for operation of the processing system with slower peripherals) include, in addition to the double inverters D/I G0 and D/I G1, holdover circuit H$d$0 for producing system cycles synchronized to slower operation (for example, 100 kc. rate); and AND gates 27$a$ and 27$b$ for producing system cycles at a rate determined by the frequency of signals supplied by output I$w_1'$ or output I$r_1$ of flip-flops I$w$1 or I$r$1, respectively. The arrangement of FIG. 2 for generating the clock pulses C has the advantage of more simply providing for synchronization of the processor with slower operating peripheral equipment.

The operation of the processing system with peripheral units ordinarily involves the transfer of data from the main memory 9 to the periphery unit or vice versa. Using the timing control system of FIG. 2; operation is such that the processing system operating rate is slowed up to the slower operating rate of the particular peripheral unit and data is transferred therebetween at this rate.

In general, whenever synchronized operation of peripheral equipment is desired, all inputs to OR gate 28 are at the false logical level to thereby disable AND gate 21 which inhibits generation of a clock pulse C. In FIG. 2, such synchronized operation between the processing system and a slower operating 100 kc. peripheral unit is provided, for example, by employing the holdover circuit H$d$0. Thus, in operation, whenever a program control signal XHLC is true (indicating operation with a particular type of peripheral equipment operative at 100 kc., for example), the holdover circuit H$d$0 will be triggered during a system cycle by the true, low level signal at output $G_4'$ of double inverter circuit D/I G4 and AND gate 24$a$ (when the clock pulse C reaches the tap connected to input $g4$). Triggering of the holdover H$d$0 produces a false, high logical level output H$d_0'$ ("on-time" delay period) which disables AND gate 24$b$ having another input connected to false output IQ$_1'$ of flip-flop IQI (FIG. 1). During the "on-time" delay period (approximately 10 microseconds) of holdover H$d$0, the output of OR gate 28 will remain in the high logical level to inhibit the generation of a new clock pulse C by the double inverters D/I G0 and D/I G1. Thus, for approximately 10 microseconds time delay period, the holdover H$d$0 will inhibit initiation of the next system operating cycle so as to thereby provide the desired slower processor operating rate of approximately 100 kc., for example, for synchronous operation with the particular 100 kc. peripheral unit. Upon synchronism with this peripheral unit, the "on time" of the holdover circuit H$d$0, therefore, will be adjusted so that the double inverters D/I G0 and D/I G1 generate a new clock pulse C every 10 microseconds. For each different peripheral operating rate, another holdover circuit may be provided and adjusted for an appropriate "on time," as just described for holdover H$d$0. A detailed description of holdover circuit H$d$0 is set forth later in connection with FIGS. 29 and 30.

In the timing control provided by clock source 20 for particular peripheral equipment as described supra, a single holdover circuit H$d$0 provides for one operating rate. While this operating rate is adjustable, it is adjusted and set to only one particular operating rate (e.g., 100 kc.). In constrast, other timing controls for peripherals of different operating rates are provided by the AND gates 27$a$ and 27$b$ of clock source 20. These AND gates 27$a$ and 27$b$ provide operations of the processing system at desired operating rates for writing and reading in different peripheral equipment including tape handlers, for example. For reading or writing in tape handlers during a system cycle, a true, low level signal is provided by the true output IQ$_1$ of flip-flop IQI (FIG. 1) whereupon a true, low level signal at output I$r_1$, or I$r_1'$ (FIG. 2) of flip-flop I$t$1 (FIG. 1) will enable gates 27$a$ or 27$b$, respectively, and also disable gate 24$b$. In order to write, flip-flop I$t$1 is set to provide a low level output I$t_1$, and flip-flop I$w$1 (FIG. 1) provides low level signals at its output I$w_1'$ having the desired repetition rate for transferring and writing data into the tape handlers. Control of the flip-flop I$w$1 is provided, for example, by any selected one of a plurality of signal sources having the desired frequency, e.g., 25 to 100 kc. and signal time duration, e.g., 10–40 microseconds. The repetition rate of clock pulses C produced in response thereto, is limtied to the rate of the low level signals provided by output I$w_1'$. For reading, flip-flop I$r$1 is operative to provide low level output signals (e.g., signals each having a minimum time duration of 50 nanoseconds) which signals are generated in response to clocking signals provided by the tape handlers. The repetition rate of clock pulses C is limited to the rate of low level signals provided by output I$r_1$.

The timing (logic) pulses P$f$ (FIG. 3$e$) are supplied to all of the flip-flops of the present system to set the flip-flops according to the logical signals applied to their respective logical inputs. The timing (clear) pulses P$c$ (FIG. 3$d$) are supplied to all the flip-flops of the present system to clear these flip-flops. The low level signal at output P$c$ (between clear pulses P$c$) is also applied to all of the flip-flops (the same output providing clear pulses P$c$) and to the same inputs of the flip-flops as pulses P$c$. This low level signal "latches" (holds) the flip-flops in their respective states between clear pulses P$c$ of successive system cycles. A clear understanding of these operations is set forth later on in the description of a typical flip-flop shown in FIG. 31.

The timing control signals at output P$c$ are also applied to storage circuits L1–18, M1–12, A1–7 and S1–18 via special logical (latching) networks connected to the respective logical inputs and summed with the outputs of the other logical networks connected to the respective logical inputs. A typical one of these storage circuits S1 is shown in FIG. 28 and the other storage circuits are shown in FIGS. 33, 34, 37 and 38$a$. A complete description of the operation is presented later in the discussion of FIG. 28.

3.2 System timing control circuit

Referring now more particularly to the system timing control circuit 22 shown schematically in FIG. 2 for a detailed description of the circuit arrangement thereof, as noted earlier, the delay line 40 is shown to comprise delay line sections 44 to 46 and 47 to 49 interconnected by pulse amplifiers and shapers 41 as shown; and circuits coupled to taps thereon to provide timing control pulses for system cycles including pulses R1, P$s$ (P$s$1, P$s$2), P$ac$ and P$as$ (FIGS. 3$f$ to 3$i$) for timing control of R–R memory cycles and processor operations. It should be noted that the timing pulses have the same reference characters as the corresponding timing control circuit outputs. The last half of the delay line 40 including sections 47 to 49 provides a timing pulse W1 (FIG. 3$j$) for long system cycles including a C–W memory cycle for clearing data from any one of the individually addressable word locations and writing of new data therein (either or both the main memory 9 and scratch-pad memory 13). Except for the timing control pulses P$c$ and P$f$ (FIGS. 3$d$ and 3$e$), which are supplied by true and false outputs G$_1$ and G$_1'$, respectively, of double inverter D/I G1; the remaining timing control pulses are supplied from outputs of double inverters D/I G2 and D/I G5 which have inputs coupled to the taps (e.g., taps 44$b$) of delay line 40 as shown in FIG. 2. Double inverters D/I G3 and D/I G4 have inputs coupled directly to different taps on the delay line sections 45 and 46, as shown in FIG. 2, to supply the timing control pulses P$s$ (P$s$1, P$s$2), P$ac$ and P$as$, each of which are of the same time duration as the clock pulse C. Double inverter D/I G3 is connected to the first tap of delay line section 45 to provide the low logical level timing (control) pulse P$s$ which is coupled to the logical input circuits of storage circuits L1–18 and A1–7 of the L and A address registers, respectively, for transferring the address in the address storage circuits L$a$1–18 to L1–18 and the address in the storage circuits A$a$1–7 to A1–7 each system cycle, as shown by detailed circuit diagrams of typical circuits therefor (FIGS. 33 and 34). Additional logical pulses P$s$1 and P$s$2 have similar functions as timing pulse P$s$. Pulses P$s$1 and P$s$2 are provided by outputs of AND gates both coupled to the false output G$_3'$ and coupled to outputs E$_1'$ and F$_1'$ of memory cycle control flip-flops E1 and F1, respectively (FIGS. 38$b$ and 37). Pulse P$s$1, applied to the logical inputs of the read S register (FIG. 38$a$) provides for recirculating the data in the S register in any system operating cycle which does not include a R–R scratch-pad memory cycle (i.e., E$_1'$) while pulse P$s$2 applied to the logical inputs of the read M register provides for recirculating the data in the M registers in any system operating cycle which does not include a R–R main memory cycle (i.e., F$_1'$).

The double inverter circuit D/I G4 has an input $g$4 connected to the next-to-the-last tap on the delay line section 46, as shown in FIG. 2, to provide high level timing control (clear) pulse P$ac$ (FIG. 3$h$) at output G$_4$ each cycle, for clearing (reset) storage circuits M$a$1–13, S$a$1–19, L$a$1–18 and A$a$1–7 of M, S, L and A registers, respectively; and timing (logic) pulse P$as$ is provided at output G$_4'$ for concurrently providing for setting storage circuits M$a$1–13, S$a$1–19, L$a$1–18 and A$a$1–7 of the M, S, L and A registers, respectively, to store the results of logical operations performed in the current system cycle. The low level timing control signal at output P$ac$ supplied by D/I G4 at the true output G$_4$, as shown in FIG. 3$h$, provides for "latching" (holding) the storage circuits L$a$1–18, M$a$1–13, A$a$1–7 and S$a$1–19 between high level clear pulses P$ac$. The holding and clearing functions of these storage circuits in response to the low level signal at output P$ac$ and clear pulse P$ac$ will be described later in the description of a typical one of the storage circuits shown in FIG. 28. Special logical networks connected to the respective storage circuits are also shown in FIGS. 33, 34, 37 and 38$a$.

Timing pulses R1 and W1, which are provided for timing control of read and write cycles, respectively, have a longer duration than the clock pulses C or other timing pulses P$c$, P$f$, P$s$ (P$s$1, P$s$2), P$ac$ and P$as$. During each system cycle, the clock pulse C is coupled by a summing network, including a plurality of parallel sum diodes 34, to the input $g$2 of the double inverter D/I G2 to produce the low logical level read timing pulse R1 at its false output G$_2'$. During each system cycle providing for a C–W memory cycle, the clock pulse C is coupled by summing network, including sum diodes 35, to the input $g$5 of double inverter D/I G5 to produce the low logical level write timing pulse W1. The summing networks including the separate groups of summing diodes 34 and 35, respectively, are constructed the same to provide pulses R1 and W1 of substantially the same time duration for R–R and C–W memory cycles of substantially the same time duration. The circuit arrangement of the group of summing diodes 34 provides a resultant logical sum which remains at a high logical level when the clock pulse C is traveling along delay line sections 44 to 46 between the first and last taps connected to sum diodes 34 only. For example, when the clock pulse C is produced at the output G$_1$ and passes through delay line sections 44, 45 and 46 which are connected by respective taps to diodes 34, the input $g$2 to double inverter D/I G2 remains at a high logical level to provide a low logical level read pulse R1 at false output G$_2'$. A typical read pulse R1 and a typical write pulse W1 would each have a time duration of 600 nanoseconds, for example, when provided by delay line sections 44 to 49 where sections 45, 46, 48 and 49, each provide a time delay of approximately 200 nanoseconds and each pulse amplifier and shaper 41 produces a delay of approximately 25 nanoseconds. Delay line section 44 and 47 provide additional time delay over 200 nanoseconds as indicated by the additional portions 44a and 47a respectively. Also, it should be noted that the spaced taps along the delay line sections 44 to 46, connected to summing diodes 34; and the spaced taps along delay line sections 47 to 49, connected to summing diodes 35, are located at intervals which are less than the width of the clock pulse C whereby continuous high logical level signals are provided at respective inputs of double inverters D/I G2 or D/I G5 when the clock pulse C is passing through one or the other of the delay line sections or portions thereof connected to diodes 34 or 35.

In the previous discussion of the clock source 20, it was noted that one of the inputs required for generation of the clock pulse C was the low logical level signal provided by the sum output line 31. As shown, the sum output line is connected to spaced taps along the first half of the delay line 40, including sections 44 to 46, by summing diodes 32; also spaced taps along the last half of the delay line including sections 47 to 49 by summing diodes 33. The spaced taps along the delay line 40 are located such that a high logical level signal will be provided along the sum output line 31 and at the input to AND gate 21 during the time that the clock pulse C is actually traveling along the delay line 40. The typical delay line sections shown provide taps spaced at 40 nanosecond intervals except tap 44b which is made adjustable. The connection of the first summing diode 32a to the first tap 44b on delay line section 44 is made adjustable to control the pulse width of clock pulse C. Thus, the first summing diode 32a would be connected to the first tap 44b to provide a clock pulse C having a time duration of more than 40 nanoseconds; for example, a clock pulse C having a time duration of 50 nanoseconds.

In accordance with the foregoing, a high logical level signal at the false output $G_1'$ of double inverter D/I G1 will produce a clock pulse C having a pulse width such that as it travels along the first half of the delay line 40, including sections 44, 45, and 46; a high logical level signal will be produced on the sum output line 31 and at the input gate 21 to block gate 21 until such time as the entire clock pulse C passes by the last tap 46b on delay line section 46. Further, a high logical level signal will remain on the sum output line 31 if the clock pulse C is passed through OR gate 23 for a system cycle including a C–W memory cycle since at least one of the summing diodes 33 will couple the high logical level of the clock pulse C to the sum output line 31 during the time the clock pulse is passing through delay line sections 47, 48 and 49. When the clock pulse C passes the last tap 49b on the delay line section 49, the sum output line is returned to the low logical level to enable AND gate 21 for initiating the next system cycle. The other input to AND gate 21 is at a low logical level for successive, uninterrupted system cycles except when the circuits in the clock source 20 require operation at rates determined by the peripheral equipment as disclosed supra.

4. NOMENCLATURE

The nomenclature used for the present invention employs combinations of upper case letters and numbers or upper case letter followed by lower case letter and numbers for designating logical circuits having both true and false outputs, i.e., storage circuits (S/C) M1–12, M$a$1–12, S1–18, S$a$1–18, L1–18, L$a$1–18, A1–7, A$a$1–7; flip-flops (F/F) N1–11, E1–2, F1–3, KR0, KA1, K@; double inverters (D/I) G0–5; drivers, K$s$1–3, D$d$1–3; and holdover circuit H$d$O. The outputs of the aforementioned logical circuits are characterized by corresponding upper case (and lower case) letters with the associated numbers shown as a subscript (e.g., $S_1$, $Sa_1$). In order to characterize the true state output of a logical circuit from the false, the latter is distinguished from the former by an affixed prime (e.g., $S_1'$, $Sa_1'$). In general, grouped outputs including both true and false outputs of storage circuits, flip-flops, and drivers are indicated by associated numbers in subscript only (e.g., $S_{1-18}$, $Sa_{1-18}$). A single logical input to a flip-flop is designated by corresponding upper case letters and numbers preceded by the lower case letter s (e.g., $sN1$). A single logical input to storage circuits (S/C) and drivers are designated by corresponding upper case letters and numbers preceded by the lower case letter $d$. The single input to double inverters D/I G0–5 is designated by the lower case letters $g$1–5, respectively, and the true and false outputs are designated $G_{0-5}$ and $G_{0-5}'$, respectively.

In designating the timing control pulses for the processor, the combination of upper case letter P and a lower case letter has been reserved therefor; for example, the upper case letter P is followed by corresponding lower case letters as follows: P$c$, P$f$, P$s$, P$ac$, P$as$. The upper case letter C is reserved for designation of clock pulses. The processor clock pulses are designated by the upper case letter C alone, the main memory clock pulses by C$m$#1 and C$m$#2, and the scratch-pad memory by clock pupIse C$s$. A single upper case letter X immediately preceding other upper case letters, designates program control signals (e.g., XL1). Successive upper case letters XX designate certain operation blocks. The use of a single upper case letter X and lower case letter X in the description of the memory (FIGS. 4–13) should not be confused with the program control signals. In the description of the memory the upper case letter X is followed by a number except for signals XR#1, XR#2, XW#1 and XW#2 which are readily distinguishable. Throughout the specification, the upper case letter I has retained its conventional connotation referring to currents except when referring to inverter circuits for input logical networks which have been illustrated in block diagram having the upper case letter I notation or upper case letters D/I. The combination of upper case letters MC and KC retain their conventional connotation designating megacycles and kilocycles, respectively. In the description of the memory in FIGS. 4–13, inclusive, the signals are also indicated by upper case letters followed by subscripts consisting of upper case letters as indicated in FIGS. 7h to 7o. These reference characters and others are clearly designated in the section of this specification directed to the main and scratch-pad memories (FIGS. 4–13).

5. SYSTEM CYCLES

The different basic and long system cycles were described briefly supra in connection with the system timing control (FIG. 2). As noted therein, a basic system cycle of minimum time duration for any basic logical operation block provides a read timing control pulse R1 for initiating and timing of a R–R memory cycle in either the main memory 9 or scratch-pad memory 13, or both; and also a basic system cycle provides timing control pulses P$c$, P$f$, P$s$, P$ac$ and P$as$ for logical operations necessary to perform the logical operations for processing data. For example, a basic logical operation block XX–00–0, illustrated in FIG. 23 provides for logical operations in the processor and a R–R memory cycle in the scratch-pad memory 13 only; and long logical operation block XX–01–0 (FIG. 24) provides for logical operations in the processor and both R–R and C–W memory cycles in the scratch-pad memory 13 and also a R–R memory cycle in the main memory 9. Also, as noted in the discussion of the system timing control, long logical operation blocks are required to provide C–W memory cycle for writing new data in any addressed location. The long system cycle provides all of the timing control pulses required in a basic system cycle for a R–R memory cycle, and control and logical operations for the processor and, in addition, a write timing pulse W1 for timing control of C–W memory cycles in either the main memory 9 or scratch-pad memory 13, or both. Briefly, therefore, the long system cycle includes time for operations of a basic system cycle and in addition provides for a C–W memory cycle.

As shown by the block diagram in FIG. 1, the read pulses R1 are gated into main and scratch-pad memories 9 and 13 by true outputs $F_1$ and $E_1$ of flip-flops F1 and E1 at inputs to AND gates 35 and 36, respectively, to provide for a R-R memory cycle in either or both memories during any system cycle. Similarly, the write pulses W1 are gated into main and scratch-pad memories 9 and 13 by outputs $F_2$ or $F_3$ and $E_2$ at inputs to AND gates 37 or 38 and 39, respectively, to provide C-W memory cycles therein during the long system cycle. A detailed discussion of the internal operation of the memory during memory cycles will be set forth later in the detailed description of the memories.

The logical operations requiring timing control pulses are coupled to timing pulse output lines as indicated by the logical circuits illustrated in FIG. 1 and in greater detail in other circuits of the drawings. The first timing control function of the system cycle is the logical operation of setting flip-flops N1–11, E1–2, F1–3 and other flips-flops by supplying the logic pulse Pf and clear pulse Pc to respective timing pulse inputs provided therefor. A detailed discussion of the circuit of a typical flip-flop N1 and its operation are set forth later in connection with FIG. 3. The setting of flip-flops N1–11 at the beginning of the system cycle enables the system to provide program control signals (FIG. 3k) throughout most of the time period, i.e., after decoding and for the remainder of the respective system cycle. As described later on in connection with FIGS. 14a, 14b and 15, the outputs of flip-flops N1–11 are decoded to provide program control signals for controlling the logical operations during the respective system cycle, for example, the system cycle #1 as shown in the timing diagram of FIG. 3. The flip-flops E1–2 and F1–3 are set to provide memory cycles in the scratch-pad memory 13 and main memory, respectively.

Concurrently with the setting of the aforementioned flip-flops, the storage circuits M1–12, S1–19, L1–18 and A1–17 are always cleared (reset) by high logical level clear pulse Pc and remain cleared for a short time interval. The storage circuits M1–12 and S1–18 are cleared in preparation for storage of the data about to be read out of the main memory 9 and scratch-pad memory 13; or if no R–R memory cycle is provided for the respective memory, cleared storage circuits M1–12 and S1–18 are set at the later time of pulse Ps by outputs of Ma1–12 and Sa1–18, respectively, to provide for performing logical operations on the data transferred from Ma1–12 and Sa1–18. The other storage circuits L1–18 and A1–17 are cleared to receive an address at the later time of logic pulse Ps.

The next operation of the system cycle occurs after the storage circuits M1–12 and S1–18 have been set by the data read out of the memory or, if no memory cycle, the data in storage circuits Ma1–12 and Sa1–18 is transferred to storage circuits M1–12 and S1–18. As indicated by the timing diagram of FIG. 3, the logical operations are performed on the data in the time interval immediately after the data is "read-out" of the memories or otherwise transferred into the storage circuits M1–12 and/or S1–18. Sufficient time is then allowed in the system cycle for operation of the adder, 11a, e.g., providing the sum of the digits stored in the storage circuits M1–12 and S1–18.

After operation of the adder 11a, the next system operation is timed by the logical pulse Pas which is applied to the storage circuits Ma1–12, Sa1–18, La1–18 and Aa1–7 to store the outputs of the adder 11a and the results of other logical operations including transfers of data between registers. For example, the sum of the digits stored in M1–12 and S1–18, which was performed by the adder 11a, is stored in the storage circuits Sa1–18. At the same time the storage circuits Ma1–12, Sa1–18, La1–18 and Aa1–7 are set as a result of the logical operations provided in the current system cycle, the decision logic is being performed (see FIG. 3) in the decision circuits 11b to provide outputs $Ks_{1-3}$ to flip-flops N1–6 of the program control 10 in order to make a selection in the program control to provide program control signals X—— for the next system cycle #2, for example. The foregoing operations complete a system cycle (e.g., cycle #1) for a basic logical operation block. The next system cycle #2 for a long operation block includes the foregoing described operations for the basic system cycle #1, and, in addition, includes a C–W memory cycle wherein the write pulse W1 (FIG. 3j) is generated to provide timing control for write cycles in main memory 9 and/or scratch-pad memory 13. It should be clear that a long system cycle is not provided unless required by a long logical operations block which requires a C–W memory cycle in main memory 9 and/or scratch-pad memory 13. For the system cycle #2, the flip-flop output $Kw_1'$ (FIG. 3m) is shown to provide a high logic level output to gate the clock pulse C into the last half of the delay line 40 (FIG. 2) whereby a write pulse W1 is generated and the duration of system cycle #2 is extended to the full time period therefor (e.g., 1600 nanoseconds) required to include the C–W memory cycle. In the foregoing manner, the operations in a basic system cycle and a long system cycle (e.g., cycles #1 and #2 are provided for processing data in the system of the present invention.

6. DESCRIPTION OF THIN-FILM MEMORIES

Referring now to FIGS. 4 and 5, the following description is directed to the operations of the thin-film main memory 9 and the thin-film scratch-pad memory 13 which provide individually addressable storage cells in magnetic thin-film rods for storage and retrieval of words of data in the processing of data by the data processing system. Both the main memory 9, shown in FIG. 4, and the scratch-pad memory 13, shown in FIG. 5, are operated concurrently in many system operating cycles of the processor. However, as noted earlier in the general description of the data processing system, independent control of the operation of main and scratch-pad memories is provided, i.e., initiation of any memory cycle is controlled by the system timing control circuit 22 (FIG. 2) which produces the read pulses R1 for read-restore (R–R) memory cycles and write pulses W1 for clear-write (C–W) memory cycles, and also signal outputs of the memory cycle control flip-flops E1, E2, F1, F2 and F3. In addition, signal outputs $Ld_{18}'$ or $Ld_{18}$ of driver Ld18 are required for initiation of memory cycles in main memory units #1 or #2, respectively. For additional storage capacity of the main memory (e.g., 80,000 words), additional units (e.g., units #2 and #3) are provided and an additional bit of address is provided for addressing the units of the main memory 9. The required signals for initiating memory cycles are indicated at the inputs to the memory timing control circuits which are shown in FIGS. 4 and 5 and also FIGS. 6a, 6b and 6c. As shown therein, read pulses R1 and write pulses W1 are gated by the outputs of the aforementioned control flip-flops (and driver Ld18 for the main memory only) to the proper memory timing control circuits to provide control of internal operations in the main memory 9 and scratch-pad memory 13. Accordingly, the independent timing control of memory operations of the main memory 9 and scratch-pad memory 13 provides for any one or combination of memory cycles of these memories as required in the performance of the various operation blocks in the execution of commands for the processing of data in the present data processing system. Further, as will be more clearly evident from the description of the timing control circuits which follows later on, individual timing control of the operations in the separate units #1 and #2 of the main memory 9 is provided by main memory timing control circuits shown in greater detail in FIGS. 6a and 6b; and individual timing control of the operations in the scratch-pad memory 13 is provided by the timing control circuits shown in greater detail in FIG. 6c.

Referring now more particularly to FIG. 4, in addition to showing the main memory 9 including memory units #1 and #2, this figure shows the associated registers including address L registers L1–18, L$a$1–18, address drivers L$d$1–18, data storage M registers M1–13, M$a$1–13, and logical gates provided for designating which one of the address registers contains the address of the word storage location in either main memory unit #1 or #2. Further, as discussed in greater detail previously in the general description of the registers in FIG. 1, the logical gate having inputs W1, $S_{1-18}$, and $F_3$ enables the S register instead of the write L register (L1–18), to supply the write address for a clear-write (C–W) main memory cycle. Also, as shown in FIG. 4, logical gates connected to the outputs of the write address L register (L1–18) and read address L register (L$a$1–18) to gate the outputs $L_{1-18}$ during a clear-write (C–W) main memory cycle when true output $F_2$ is present, and to gate the outputs L$a_{1-18}$ during a read-restore (R–R) cycle when the true output $F_1$ is present. In most instances, the write address is stored in the write address L register (L1–18) and output $F_2$ is true during most C–W main memory cycles. In some of the long operation blocks of certain commands (e.g., Move) the S register (S1–18) also performs an alternate function as a write address register for the main memory 9. In these long operation blocks (which include a C–W memory cycle) output $F_3$ is true and output $F_2$ is false. Accordingly, the address of the location in the main memory 9 for any single C–W memory cycle is supplied by either the write address L register (L1–18) or the S register (S1–18) operating in its alternate mode as a write address register for the main memory 9. It should be noted that the gates having outputs connected to the address drivers are diagrammatic representations and the actual logical input circuitry is shown in FIGS. 33$a$ and 34$a$.

Referring now more particularly to the circuits and arrangement of unit #1 of the main memory 9 which has been shown in block diagram in FIG. 4, the unit #1 provides storage of 20,000 words of data in main memory matrices M$x$1–8. Each of the 20,000-word locations in unit #1 is individually addressable for read-restore or clear-write memory operations. The address supplied by the address drivers L$d$1–18 consists of eighteen decimal coded-binary-digits or bits. Of these eighteen bits provided by driver outputs L$d_{1-18}$, outputs L$d_{1-13, 17}$ are applied to word line selectors shown in FIG. 4 which comprise a row selector 23$s$ and a column selector 24$s$. These bits are arranged in groups including outputs L$d_{6-8}$, L$d_{10-13}$ and L$d_{1-5}$, L$d_{9,17}$ which are decoded each main memory cycle by the row and column selectors, respectively, to provide read and write currents to any selected one word line in arespective pair of the matrices M$x$1–8. Each word line is connected to a row of sixty-five solenoidal windings (FIG. 8) for storage of sixty-five bits which comprise five 13-bit words stored in the respective pair of the matrices M$x$1–8, e.g., matrices M$x$1,3 (FIG. 10). The remaining bits of the address (provided by outputs L$d_{14-16}$ of drivers L$d$14–16) are applied to the digit decoders as shown in FIG. 4 to provide outputs X1–5 for selection of one of the five 13-bit words on the selected one of the word lines. During any one main memory cycle, only one of the X1–5 is true, and when the main memory cycle is a read-restore (R–R) memory cycle, the selection of one of five words for read-out into the read M register (M1–13) is provided by the one output which is true. For example, in FIG. 4, it is assumed (as indicated by the solid flow lines) that digit decoder output X1 is true and outputs X2–5 are all false and only the 13 bits of the first one of the five words is actually gated into the read M register storage circuits M1–13 via outputs $am$1–13. It should be noted that all five words are restored into the same word locations in unit #1 by coupling the output of all sixty-five sense amplifiers of the first group back to the respective group of sixty-five digit drivers via the associated logic circuits as shown in FIG. 4. When the main memory cycle comprises a clear-write (C–W) cycle, the digit decoder output which is true, e.g., output X1, gates the outputs M$a_{1-13}$ of the write M register to the 13 digit drivers for the first word to write this new word into the first word location of the five word locations read-out. The word formerly in the first word location has been cleared by not restoring it to the first word location (block the outputs of first group of 13 sense amplifiers). The remaining four words, however, are restored in the same manner as provided in the R–R memory cycle. In view of the foregoing discussion, it should be evident that any selected one word location of the 20,000-word locations can be accessed for read-restore or clear-write operations. It should be noted, however, that additional selection of one of the four groups of 65 digit drivers and 65 sense amplifiers for a respective one of the pairs of matrices M$x$1, 3; M$x$2, 4; M$x$5, 7 and M$x$6, 8 (each pair provides 5,000 word locations) is provided by the J decoder and the logical AND gates which enable any selected one of the four groups of 65 digit drivers and corresponding group of 65 sense amplifiers. The J decoder is responsive to driver outputs L$d_{13}$ and L$d_{17}$ to provide four outputs J1, 3; J2, 4; J5, 7 and J6, 8 wherein only one of these outputs is true, for example J1, 3, for employing the first of the four groups of 65 digit drivers and 65 sense amplifiers for the respective first pair of matrices M$x$1, 3. Thus, according to this exemplary operation the first group of 65 digit drivers and the corresponding first group of 65 sense amplifiers for matrices M$x$1, 3 are enabled for main memory cycles addressing a word location in matrices M$x$1, 3. A more detailed description of unit #1 of the main memory 9 is set forth in a later section of this specification that provides a more complete understanding of the circuits and operations thereof.

Referring now to FIG. 5, the scratch-pad memory 13 is shown, and in addition, the associated registers are shown including address A registers and data storage S registers. Also, as shown in FIG. 5 are the logical AND gates for gating the read and write pulses R1 and W1 for timing control; and AND gates for gating the outputs of the address A registers for clear-write and read-restore memory cycles in the scratch-pad memory 13. A matrix M$x$1$s$ is shown in block diagram which provides storage locations for 80 words and this matrix M$x$1$s$ comprises a section of matrix M$x$1, as shown in FIG. 10.

In the scratch-pad memory 13, the operation is similar to the operation of the main memory 9 except that the word storage capacity is only 80 words in only two rows of thin-film magnetic rods and windings, and therefore, the address decoding is much simpler than required for the main memory 9. Accordingly, seven address drivers A$d$1–7 are required and driver outputs A$d_{4-7}$ only are applied to row selector 23$5s$ and the remaining driver outputs $A_{1-3}$ are applied to column selector 24$5s$ to select any single word line including a row of 19 individual solenoidal windings for the corresponding 19 bit positions on 19 different thin-film magnetic rods providing one word storage location in the 80-word storage locations of this memory. As noted earlier, the word storage locations in the accumulator portion of this memory have only 13 bits which means that only zeros are stored in bit positions 13 to 18 in the accumulator portion and bit portions 1 to 12, 19 are used for storage of the 13 bits. This comprises the complete addressing of any single word location in the scratch-pad memory 13, and read and write currents are applied to the selected word line of a single word in a similar manner as described later on in the detailed description of the main memory. Since the selection of a word location is completed by selection of a word line, the only operation remaining to be considered is the 19 digit drivers and the 19 sense amplifiers which are provided for the 19 bit words. These are operated in a similar manner to the digit drivers and sense amplifiers of any selected group in unit #1 of the main memory 9. During each scratch-pad memory cycle the 19 sense amplifiers are strobed by supplying a strobe pulse $E_S$ for read-out of the 19 bits (or 13 bits) of the selected word, and the 19 digit drivers are enabled to restore or write the 19 bits of the word into the addressed word location. During R–R cycles in the scratch-pad memory, the data stored in any single addressed word location is read-out and restored therein. Accordingly, during these cycles, the outputs of the 19 sense amplifiers are gated by signal XR#1s to respective inputs of the 19 digit drivers for restoring the data in the addressed word location, and also, sense amplifier output lines $as1$–$19$ are gated to respective read S register storage circuits S1–19 for temporary storage therein. During C–W memory cycles, the data is cleared from any single addressed word location and the 19 bits of a new word stored in the write S register are gated by signal XW#1s to the digit drivers for writing the 19 bits into the addressed word location. In FIG. 12, the details of the circuit connections to the conductor substrates and solenoidal windings of a typical pair of magnetic thin-film rods 215, of the matrix sections M$x1s$ for the scratch-pad memory, are shown where only a pair of rods 215 (total of 19 pairs in the two rows) is provided for each bit position of the 19 bit positions for each of the words. In FIG. 5 and FIG. 12, in many instances, corresponding reference numbers followed by the lower case letters "s" have been used to indicate parts and circuits of the scratch-pad memory 13 having corresponding parts in the main memory 9. In view of the foregoing description of the scratch-pad memory 13 and the later detailed description of the main memory 9, a further description of the details of operation of the circuits of the scratch-pad memory is not necessary since a clear understanding of the details of the circuit operation will be provided by this later description of the corresponding circuits of the main memory 9.

6.1 *Memory timing control circuits*
(FIGS. 6a, 6b and 6c)

Referring now to FIG. 4 and FIG. 6a for a discussion of the operation of the timing control of unit #1 of the main memory 9, the main memory timing control circuits illustrated by the block in FIG. 4 are shown in detail in FIG. 6a to comprise logical gating circuits which supply a memory clock pulse $Cm\#1$ to a delay line 320 having two 300 nanosecond delay line sections 321 and 322, each having taps (not shown) at 10 nanosecond intervals, for example. The delay line timing circuit (FIG. 6a) are responsive to the memory clock pulse $Cm\#1$ to produce the timing signals $E_D$, $E_{RD}$, $E_S$, $E_W$ and $E_{WD}$ for operation of the memory unit #1. FIG. 7 is the timing diagram for memory signals. In FIGS. 6b and 6c corresponding delay line timing circuits are provided for unit #2 of the main memory 9 and the scratch-pad memory 13 to produce these same timing signals for operation of the unit #2 and scratch-pad memory 13. Operation of these delay line timing circuits is necessary to produce a memory cycle in the respective memory unit #1 or unit #2 and the scratch-pad memory 13. Accordingly, selective operation of main memory units #1 or #2 and also scratch-pad memory 13 through a memory cycle is provided by selective gating at the respective inputs thereto by the logical input circuits provided as shown in FIGS. 6a, 6b and 6c. Thus, when the address driver output $Ld_{18}'$ (FIG. 7d) is produced whenever the most significant (eighteenth) bit of the address is "0," the main memory timing control circuits for unit #1 produce a memory clock pulse $Cm\#1$ (FIG. 7g) in response to a read pulse R1 or a write pulse W1 (assuming one of the flip-flops F1, F2 or F3 is in a true state, see FIGS. 7b and 7c); and the clock $Cm\#1$ then passes through the delay line 320 to produce timing signals $E_D$, $E_{RD}$, $E_S$, $E_W$ and $E_{WD}$ (FIGS. 7h to 7m). The operation of memory unit #1 in response to these timing signals is set forth later in the detiled description of memory unit #1. A detailed description of the main memory timing control circuits for unit #1, as shown in FIG. 6c will now be set forth.

Referring briefly to FIG. 4, it will be assumed for the present discussion that the processor is in system cycle #2 (illustrated by the processor timing diagram of FIG. 3) and a read pulse R1 is produced during the first half of a typical long operation block. This read pulse R1 is passed by gate 35 because the other input $F_1$ to this gate is assumed to be true (low level signal, −3 v.) to provide a R–R memory cycle in the main memory 9. Referring again to FIG. 6a, it is seen that the read pulse R1 which is passed by gate 35 is applied to the input (R1, $F_1$) of an AND gate 324 and since the other input $Ld_{18}'$ is assumed to be true (low level, −3 v.), the read pulse is passed through gate 324 and applied to an input of gate 325 as shown. This gate 325 passes only the first portion of the read pulse R1 to produce the shorter duration clock pulse $Cm\#1$ (FIG. 7g) at the output of gate 325 and OR gate 326.

The primary function of gate 325 is to produce the clock pulse $Cm\#1$ to initiate a main memory cycle in unit #1 and also to prevent any other signals from passing through this gate and to the delay line 320 until the memory cycle is completed. Accordingly, when the clock pulse $Cm\#1$ reaches the tap on the delay line section 321, which is connected to diode 327, a false signal is applied to AND gate 325 to block this gate. Additional diodes 328 are shown connected to later taps to continue to block gate 325 for the duration of the present memory cycle. This false signal is produced to block gate 325 by coupling the clock pulse $Cm\#1$, passing through the delay line 320, to the return line 330 which is coupled to the gate 325 by an inverter 331. These diodes 327 and 328 are connected to taps at intervals less than the width of the clock pulse $Cm\#1$ whereby the false signal is maintained at gate 325 for the duration of this memory cycle in unit #1 of the main memory.

Considering now the manner in which the timing pulses $E_D$, $E_{RD}$, $E_S$, $E_W$ and $E_{WD}$ are produced by the delay line timing circuits shown in FIG. 6a, these timing signals are provided at timing signal outputs, having corresponding designations, in response to the clock pulse $Cm\#1$ passing through delay line 320. Considering each of these timing signal outputs separately, FIG. 6a shows output $E_D$ coupled to tap 332 via diode 333 to produce the timing (read) signal $E_D$ at this output. This signal $E_D$ is of the same time duration as the clock pulse $Cm\#1$ (approximately 200 nanoseconds) and the leading edge of this signal $E_D$ is timed to occur approximately 100 nanoseconds after the leading edge of clock pulse $Cm\#1$ as shown in the timing diagram, FIGS. 7g and 7h. The next memory timing signals are signals (read-dummy) $E_{RD}$ and (strobe) $E_S$, for completing the read operation in the read-restore memory cycle. These signals occur concurrently with the first timing signal $E_D$ as shown in FIGS. 7h, 7i and 7j. The leading edge of timing signal $E_{RD}$ is timed to occur approximately 50 nanoseconds after the leading edge of signal $E_D$ and terminate at the same time as signal $E_D$; and the leading edge of timing signal $E_S$ is timed to occur 100 nanoseconds after the leading edge of signal $E_D$ and also terminate at the same time as signal $E_D$. The connections to the next taps after tap 332 of delay line section 321 provide for the timing of the leading edges of signals $E_{RD}$ and $E_S$ to occur at 50 and 100 nanoseconds, respectively, after signal $E_D$ as a result of summing with the output $E_D$ in AND gates 334 and 335, respectively. Thus, signals $E_{RD}$ and $E_S$ do not appear until the clock pulse $Cm\#1$ reaches the respective taps on delay line section 321 as shown and both signals $E_{RD}$ and $E_S$ terminate at the same time as signal $E_D$ when the trailing edge of clock pulse $Cm\#1$ passes tap 332.

The later remaining timing signals $E_W$ (write), $E_{WD}$ (write-dummy) are provided each read-restore (R–R) memory cycle to restore the data read-out back into the same storage locations in the main memory unit #1. The timing of the signals $E_W$ and $E_{WD}$ is shown in FIGS. 7k and 7m. Output $E_W$, which provides write signals $E_W$ for restoring the data read-out of the addressed storage locations, is diode coupled to the first tap 336 on delay line section 322 to provide signals $E_W$ of the same time duration as clock pulse $Cm\#1$ while the latter passes tap 336. The last timing signal in the present R–R main memory cycle, timing signal $E_{WD}$, is timed to occur concurrently with the write signal $E_W$ but of only 150 nanosecond time duration. The leading edge of this signal $E_{WD}$ is timed to occur 50 nanoseconds later than leading edge of signal $E_W$, and terminate at the same time as signal $E_W$. As shown, this signal $E_{WD}$ is produced at output $E_{WD}$ which is connected to AND gate 337 for summing the output $E_W$ and the signal at the second tap on delay line section 322. This second tap is located in time 50 nanoseconds after the first tap 336 to produce signal $E_{WD}$ at output $E_{WD}$ as shown.

The delay line timing signal circuits further include pulse amplifier and shapers 338 as shown schematically in FIG. 6a to shape and amplify the clock pulse $Cm\#1$ during its passage through the delay line 320. Also, after each delay line section a delay line section terminating resistor is provided which is shown for the section 322 and is included in the schematic representation of the pulse amplifier and shaper 338 following the respective delay line section.

Figure 13:
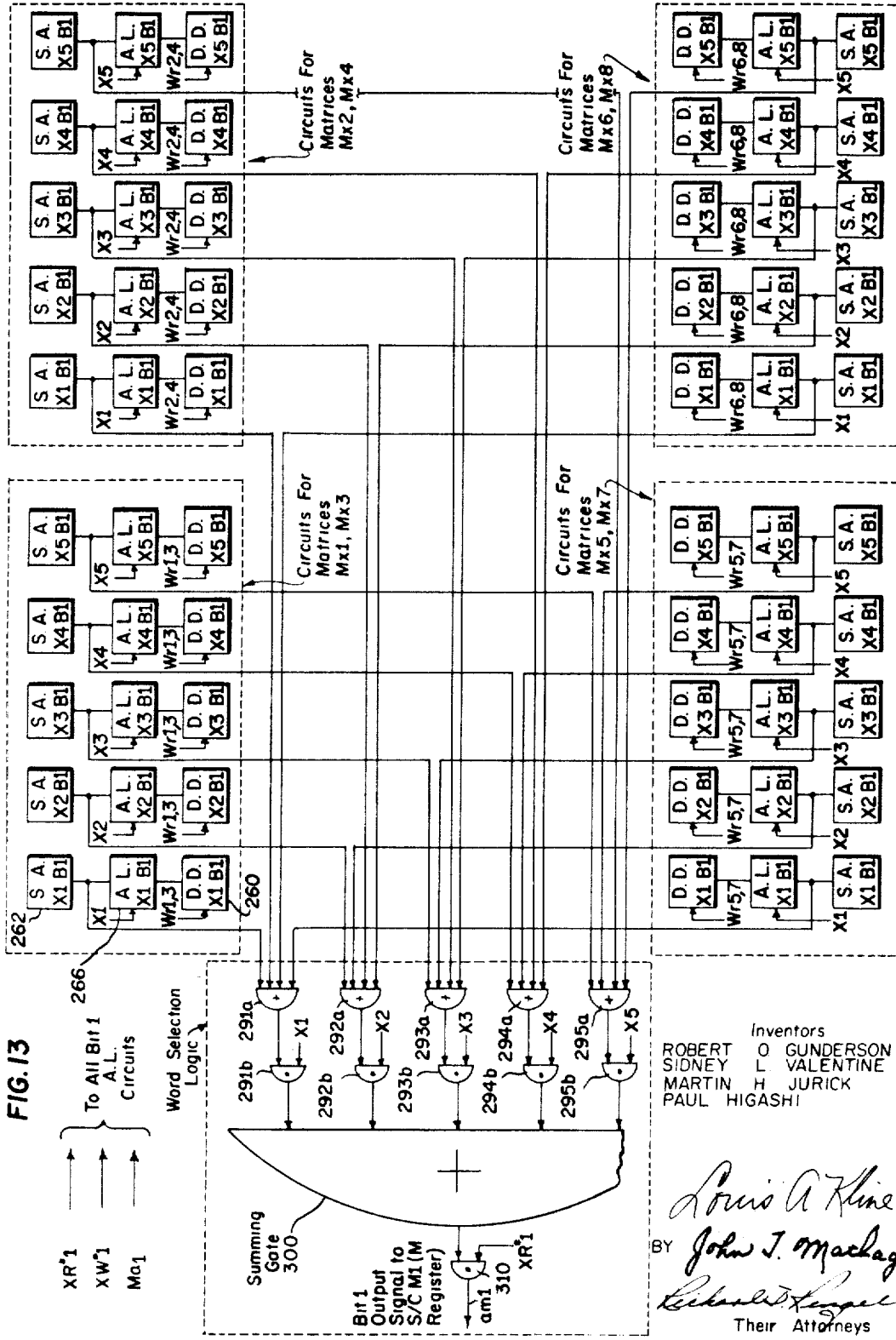
FIG. 13 is a circuit and block diagram illustrating the connections and overall logical arrangement for the twenty bit 1 sense-digit circuits of a typical matrix pair.

Also as shown in FIG. 6a, the main memory timing control circuits (unit #1) provide signals $XR\#1$ and $XW\#1$ which are required for gating signals in the associated logic (for digit drivers) and word selection logic circuits (for sense amplifier outputs) as indicated in FIG. 4 and FIGS. 12 and 13. In the exemplary R–R memory cycle being discussed, the read pulse R1 is gated by gate 35 (FIG. 4) and gates 324 to produce the read-restore signal $XR\#1$ at the corresponding output $XR\#1$. As shown in FIG. 13, the signal $XR\#1$ is applied to AND gate 310 in the word selection logic during R–R cycles in unit #1 to pass the sense amplifier output for the bit 1 signal to output $am1$ and the logical input of storage circuit M1 in the read M register. The signal $XR\#1$ is also used to gate bits 2 to 13 in the other word selection logic circuits, not shown, during R–R memory cycles in unit #1. As shown in FIGS. 4 and 12, the signal $XR\#1$ is also used to gate the output of the sense amplifier X1B1 to the digit driver X1B1 in order to restore bit 1 in its bit location in unit #1 of the main memory 9. The other associated logic circuits shown in FIG. 13 are enabled by signal $XR\#1$ to pass outputs of the sense amplifiers to the respective digit drivers not only for the selected word but also for the four other unselected words which have been read out of main memory unit #1 in a read restore R–R memory cycle.

Considering now the main memory timing control circuits (unit #1) for clear-write memory cycles on this memory unit #1 (e.g., system cycle #2, FIG. 3) the timing signals produced by the delay line timing signal circuits are identical to those previously described in connection with the R–R memory cycle in main memory unit #1 as shown by the timing diagram of FIG. 7 which shows typical timing signals for both R–R and C–W memory cycles. In the clear-write C–W memory cycle in main memory unit #1, however, a clear-write cycle pulse $XW\#1$ is produced instead of a read-restore cycle pulse $XR\#1$. As shown in FIGS. 4, 12 and 13, the clear-write cycle pulse $XW\#1$ is applied to the 260 associated logic circuits to be combined with other signals in the memory unit #1 logic to provide for restoring the four non-addressed words in their respective word locations and also to provide for enabling the write M register to write the word stored therein into the selected word location. A detailed description of the logical operations of memory unit #1 in response to signals $XR\#1$ and $XW\#1$ will be presented in connection with a later discussion of FIGS. 8 to 13.

Main memory timing control circuits (unit #2) shown in FIG. 6b are identical to the circuits shown in FIG. 6a except for the address driver outputs $Ld_{18}'$ and $Ld_{18}$ which provide for selection of the main memory unit #1 or #2. A true signal on input $Ld_{18}'$ as described before indicates an addressed word location in the 20,000 word storage locations in unit #1 of the main memory 9 (FIG. 4) while a true signal on output $Ld_{18}$ indicates an addressed word location in the 20,000 word storage locations in unit #2. The timing signals $E_D$, $E_{RD}$, $E_S$, $E_W$ and $E_{WD}$ and signals $XR\#2$ and $XW\#2$ at the respective outputs therefor are applied to the circuits of main memory unit #2 as shown in FIG. 4 to provide the identical operation of unit #2, when addressed, as described in connection with unit #1. Referring to the scratch-pad memory timing control circuits shown in FIG. 6c, it should be noted that only a single memory unit is provided in the present processing system. Any system operating cycle including a scratch-pad memory cycle (alone or concurrently with main memory cycles) is provided by the true state of memory control flip-flops E1 and E2, where a true output $E_1$ or $E_2$ provides vides for operation of the timing output $E_1$ or $E_2$ provides for operation of the timing control circuits (FIG. 6c) to supply signals $XR\#1s$ and $XW\#1s$ at the respective outputs therefor, timing signals $E_D$, $E_{RD}$, $E_S$, $E_W$ and $E_{WD}$ to operate the scratch-pad memory shown in FIG. 5.

In view of the foregoing description of the timing control circuits, it is seen that timing control is provided for operation of the main memory units #1 and #2 and the scratch-pad memory through read-restore (R–R) memory cycles or clear-write (C–W) memory cycles to read and restore or clear and write addressed words of data in the main memory 9 and scratch-pad memory 13, and further, to operate the memories in synchronism with the logical operations of the processor for processing data in the basic and long operating cycles of the data processing system.

6.2 Detailed description of the main memory

Referring now to FIGS. 7 to 13, inclusive, a more detailed description of the circuits and operation of the main memory 9 will now be set forth. Referring initially to FIG. 8, illustrated therein is an exemplary cylindrical magnetic thin film rod memory matrix Mx1 of the same general type as disclosed in copending patent application Ser. No. 373,980, filed June 10, 1964, and which matrix is employed in the preferred embodiment of the main memory 9 to be described herein.

The exemplary matrix of FIG. 8 typically comprises a plurality of forty stacked planes or plates $P_1$–$P_{40}$ containing sets of solenoidal windings secured in the planes so as to form a row-column array of windings (e.g., winding 210) in each plane. Each of the windings in the respective planes $P_1$–$P_{40}$ is axially aligned with a corresponding winding in each of the other planes whereby axially aligned windings are capable of passing removable rod structures 215. In the completed matrix assembly, a single rod structure is disposed within axially aligned bores (e.g. 210a) provided in respective aligned windings (e.g., 210) in respective planes.

Each of the planes $P_1$–$P_{40}$ may comprise, for example a 65 x 16 array of windings which are designated word windings. Each word winding is formed as a solenoid 210 with a cylindrical bore 210a provided therein of a diameter preferably just sufficient to permit a respective thin film rod structure 215 and its associated winding 216 to be passed therethrough.

Referring now to FIG. 9, illustrated therein is an enlarged view of a typical rod structure 215 and the respective word windings $Wn1$–$Wn40$ associated therewith when the rod structure 215 is inserted into its respective aligned bores in the matrix of FIG. 8. Each thin film rod structure 215 is preferably comprised of a long thin rod-like inner conductive substrate 213 of beryllium copper having a diameter of about 5 to 50 mils, and on which is suitably deposited a thin film magnetic coating 214 having bistable square loop switching properties. The thin film magnetic coating 214 may typically comprise an isotropic magnetic film of approximately 97% iron-3% nickel, by weight, with a thickness of typically 4,000 angstroms, whereby the film exhibits single domain switching properties.

The coaxial helical winding 216 is wound on the rod prior to its insertion into the matrix and serves as both a digit winding and a sense winding, hereinafter referred to as a sense-digit winding. As also illustrated in FIG. 9, the wire 216b at the end of the sense-digit winding 216 nearest the back of the rod structure (as viewed in FIG. 9) is connected, such as by soldering, to the back of the inner conductive substrate 214 so as to connect the sense-digit winding 216 and the substrate 213 in series. Similarly the front of substrate 213 has a wire 213a soldered thereto at a solder joint 213b so as to permit the series-connected sense-digit winding 216 and substrate 213 of the rod structure illustrated in FIG. 8 to be connected to those of rod structures, as will be considered in more detail further on in this description of the main memory 9.

At this point in the description, it will be helpful to consider the basic binary magnetic storage element and its mode of operation. The basic binary magnetic storage element is the portion of the thin film magnetic coating 214 which is in the immediate vicinity of each respective word winding. For example, in FIG. 9, the magnetic thin film encompassed by word winding $Wn1$ would be a typical bistable magnetic element, there being one such element for each of the other word windings on the rod structure 215 in FIG. 9.

It will be understood that the magnetic thin film 214 provided on the rod preferably has a substantially rectangular hysteresis characteristic. It will also be understood that each basic thin film magnetic element may be switched between its two states of saturation by the application thereto of suitable magnetic fields, such as produced by suitable currents applied to its respective word winding and/or sense-digit winding. The two saturation states of the basic thin film storage element may arbitrarily be designated as "1" and "0". Then, "reading" of data stored in a magnetic element is accomplished by driving the element to the "0" saturation state and observing whether an output pulse is induced in the sense-digit winding 216 as a result of switching; a "1" being indicated when an output pulse is induced, and a '0" being indicated when no (or negligible) output signal is produced. "Writing" is caused to take place immediately after "reading", the magnetic element being left in the "0" state in which it resides after reading if a "0" is to be stored, and being driven to the "1" state if a "1" is to be stored.

In the main memory being described herein, reading of a selected bistable thin film element is accomplished by applying a sufficient read current $I_R$ to its respective word winding (e.g., $Wn1$ in FIG. 9) to drive the element to its "0" saturation state, while at the same time detecting whether or not a pulse is induced in the respective sense-digit winding. In order to reduce the time required for switching during reading, it is preferable to choose the read current $I_R$ flowing in the word winding of the selected bistable thin film element so that a magnetic coercive effect is produced which is significantly in excess of the minimum required for switching.

Writing into a selected thin film element is accomplished by the resultant effect produced by a write current $I_W$ flowing in the word winding (e.g., $Wn1$) and a digit current $I_D$ flowing in the sense-digit winding 216. The write current $I_W$ is applied oppositely to the direction of the read current $I_R$, and is chosen so as to apply to the selected bistable element a magnetic coercive effect of two-thirds of the magnitude required for switching the element to the "1" state (see FIG. 7m). The digit current $I_D$ in the respective sense-digit winding 216 is chosen to provide a magnetic coercive effect of one-third the magnitude required for switching (see FIG. 7o). If a "0" is to be stored in the selected thin film element (dashed line in FIG. 7o), the one-third coercive effect produced by the digit current $I_D$ in the sense-digit winding is chosen to be in a direction which opposes the two-thirds coercive effect produced by the write current $I_W$ flowing in the word winding, thereby producing a resultant one-third coercive effect which is insufficient for switching and causes the element to remain in the "0" state indicative of a stored "0". On the other hand, if a "1" is to be stored in the selected thin film element, then the one-third coercive effect produced by the digit current $I_D$ in the sense-digit winding is chosen to be in a direction which aids the two-thirds coercive effect produced by the write current $I_W$ flowing in the word winding, thereby producing a resultant coercive effect which switches the element to the "1" state indicative of a stored "1".

An important feature of the present rod structure illustrated in FIG. 9 will now be considered. As shown, the sense-digit winding 216 is continuous along the rod structure 215 and is returned to the front of the rod structure by way of the inner conductive substrate 213. The use of the inner conductive substrate 213 as a return path eliminates providing an additional return winding in certain cases. In addition, since the digit current flows through the inner substrate 213, a transverse field is produced (that is, a circular magnetic field emanating from substrate 213) which is in addition to the axial field produced by the pitch of the sense-digit winding 216. This transverse field is less than the anisotropy field, but has the advantageous effect of reducing the amount of axial field that would ordinarily be required, and thereby permits the use of a considerably smaller digit current during the writing operation, which may typically be as much as 25% smaller.

A still further advantage of causing digit current to flow in the inner conductive substrate 213 is that the circular or transverse magnetic field produced thereby acts to cancel the circular magnetic field produced around the rod by the pitch of the sense-digit winding 216. As a result, there will be no external circular magnetic field to couple to adjacent rods, which is important since the spacing between rods in the rod matrix can now be greatly descreased so as to achieve a high packing density.

At this point it may also be noted that not only is coupling due to circular magnetic fields practically eliminated, but also, because of the relatively small diameter of the rods (that is, of the order of .010 inch), the problem of axial field coupling between adjacent rods is also very greatly reduced, since the cross-sectional area of each rod is so small that it will not couple enough of the external field produced by the solenoid of an adjacent rod to have any significant effect. Thus, it will be appreciated that the rod construction illustrated in FIG. 9 greatly reduces noise produced as a result of coupling between adjacent rods—the small diameter of the rod reducing axial field effects, and the return path for the digit current through the conductive substrate 213 reducing circular field effects.

Having described the typical rod structure 215 shown in FIG. 9, and its associated word windings $Wn1-Wn40$ when inserted in the matrix of FIG. 8, and having considered the mode of operation of a typical bistable thin-film element, the construction and arrangement of the overall matrix of FIG. 8 will now be considered in further detail. The memory matrix organization is such that there are 65 series-connected word windings in each horizontal row (as viewed in FIG. 8) which represent 5 13-bit words in each row. Since there are 16 such rows in each of the 40 planes $P_1-P_{40}$ of the matrix, the maximum capacity is $16 \times 5 = 80$ words in each plane, and $40 \times 80 = 3200$ words in the entire 40 plane matrix. It should be noted, however, that each of the 16 rows is capable of being connected to selection circuitry and a lesser number of rows need be actually employed for a particular memory. Therefore, the remaining rows are available for use in another memory. For example, as disclosed later in the present description, 13 rows of matrix M$x$1 are utilized for the main memory 9 and 2 rows are used for the scratch-pad memory matrix M$x$1$s$. Further, it is often desirable to provide "spare" rows for later increasing the storage capacity of a memory or substituting a spare row for one of the other rows in a matrix which has become defective during use. Thus, as described later in the present description, only 12 or 13 rows of the 16 rows available in each matrix are shown connected to the selection circuitry 223 (FIG. 10).

In the present data processing system in which the present main memory is employed, eight such matrices as illustrated in FIG. 8, are used to provide a total of 4000 word lines which represent a total word capacity of 20,000 words, since there are 5 words on each word line. Selection of a particular one of these 4000 word lines to receive read and write currents during respective read and write periods is accomplished by a conventional 50 x 80 linear selection factoring arrangement as schematically illustrated in FIG. 10. The connections of the sense-digit windings are omitted from FIG. 10 for clarity and will be considered separately in connection with FIG. 12 later on in this description.

Thus, referring to FIG. 10, it will be understood that the 50 x 80 linear selection factoring of the word lines is accomplished by respectively connecting together the left ends (as viewed in FIG. 10) of those word lines in the matrices which are in the same row so as to form 50 row lines, while respectively connecting together the right ends (through a respective pair of diodes 217 and 218) of those word lines in the matrices which are in the same column so as to form 80 column lines. Each of the 50 row lines is connected to a respective one of 50 row drive lines $x1$–$x50$ of the row driver and selection circuitry 223, while each of the 80 column lines is connected to a respective one of the 80 column drive lines $y1$–$y80$ of the column driver and selection circuitry 224. It will be understood that such a connection of windings in linear selection fashion permits a single word line to be selected to receive current by activating the respective row and column drive lines in accordance with the row-column coordinates of the selected word line. Also, the respective pair of diodes 217 and 218 are provided in the word lines in order to prevent sneak currents from flowing in unselected lines.

The construction and arrangement for the row driver and selection circuitry 223 and the column driver and selection circuitry 224 generally indicated in FIG. 10 is schematically illustrated in FIG. 11, which, like FIG. 10, omits the sense-digit winding circuitry for greater clarity. The eight matrices shown in FIG. 10 constituting 4000 word lines and 20,000 words are represented in FIG. 11 by the single block 231, and the row drive lines $x1$–$x50$ and the column drive lines $y1$–$y80$ in FIG. 11 correspond to the similarly designated lines in FIG. 10. In order to permit the word line driving arrangement of FIG. 11 to be clearly understood, a typical reading and writing operation will be briefly described at this time insofar as it affects the application of current to the word lines. A more complete description of the overall operation of the memory will be presented later on in this description.

Thus, with reference to FIG. 11, in an early part of the reading operation, a decode signal E$_D$ (FIG. 7$h$) is produced which is fed to a row selector 235 at the left side of the matrices and also to a column selector 245 at the right side of the matrices. In response to the decode signal E$_D$, the row selector 235 activates a particular one of 50 read row switches in accordance with the address and more particularly outputs L$d_{6-8}$ and L$d_{10-13}$, while the column selector 245 activates a particular one of 80 read column switches in accordance with the address and more particularly outputs L$d_{1-4}$ and L$d_{5,9,17}$. The construction and cooperative relationship of the row and column selectors 235 and 245 and their respective read and write row and column switches in FIG. 11 may typically be as disclosed in the commonly assigned copending patent application Ser. No. 91,123, filed Feb. 23, 1961.

Shortly after the appearance of the decode signal E$_D$ which results in the activation of a particular one of the 50 read row switches and a particular one of the 80 column row switches, a read dummy signal E$_{RD}$ (FIG. 7$i$) is produced and applied to a read dummy load 230$a$ which, in the absence of signal E$_{RD}$, normally effectively shorts out the read current I$_R$ supplied by a positive read current source 230. However, in response to the read dummy signal E$_{RD}$, the read dummy load 230$a$ unshorts to permit the read current I$_R$ to be steered to the particular one of the 50 read row switches which was activated by the row selector 235. From there, the read current I$_R$ flows through the selected word line to the particular one of the 80 read column switches which was activated by the column selector 245, the selected word line being the one which corresponds to the row-column coordinates of the activated read row and read column switches. The read current I$_R$ is returned back to the read current source 230 via the read current return line 230$b$.

During restore operations, which follow directly after each reading operation, the row and column selectors 235 and 245 act to select the same word line as was selected during reading by activating the corresponding one of the 50 write row switches and the corresponding one of the 80 write column switches which will result in the selection of the same word line as was selected during the just described reading operation. The aforementioned co-pending patent application Ser. No. 91,123 illustrates a preferred way in which this may be accomplished.

A short time after activation of the corresponding write row and write column switches, a write dummy signal E$_{WD}$ (FIG. 7$k$) is produced and applied to a write dummy load 232$a$ which, in the absence of signal E$_{WD}$, normally effectively shorts out the write current I$_W$ supplied by a negative write current source 232. However, in response to the write dummy signal E$_{WD}$, the write dummy load 232$a$ unshorts to permit the write current I$_W$ to be steered through the activated write row switch to the activated write column switch via the same word line as was selected during reading. The write current I$_W$ is returned back to the write current source via the write current return line 232$b$.

Having described how appropriate read and write currents may be applied to a selected word line during respective reading and restoring operations, the winding arrangement and associated circuitry for the sense-digit windings will next be described with reference to FIGS. 12 and 13.

Initially, it should be noted that the simplest and most direct way of interconnecting the helical sense-digit windings 216 (FIGS. 8 and 9) would be to connect together all of the sense-digit windings which correspond to the same bit of a word in the memory to a common sense amplifier and digit driver. Such an arrangement is provided for the scratch-pad memory 13, for example, as shown for the sense digit windings for each of the nineteen (19) bits of a word. Referring again to unit #1 of the main memory, the arrangement for 13 bit word (12 bits plus parity bit) would result in 13 sense-digit lines, 13 sense amplifiers, and 13 digit drivers corresponding to the 13 bits in each word. Accordingly, since there are 20,000 words in the entire memory unit #1, each such sense-digit line would couple 20,000 bits. However, because of line impedances and delays, it would be highly impractical, if not impossible, to achieve high speed memory operation with so many bits coupling the same sense-digit line.

Consequently, in the single memory unit #1 presently being described herein, instead of providing the single sense-digit line for each bit (which is provided as indicated in the previous paragraph for the scratch-pad memory 13) memory unit #1 is divided into 20 separate sense-digit lines, with the additional feature that each such separate sense-digit line does not couple bits on the same word line. Each such separate sense-digit line will then couple only 1,000 bits, and each is provided with its own sense amplifier and digit driver. This means that there will be 20 separate sense-digit lines with 20 respective sense amplifiers and digit drivers for each respective bit of the 13 bits of each word in the memory, and a total of 260 such sense-digit lines with 260 respective sense amplifiers and digit drivers for the entire memory unit #1.

As will be evident hereinafter, the complexities associated with such a division of sense-digit lines into separate smaller sense-digit lines are mitigated to a considerable extent by having each sense-digit line couple bits on different word lines, by reading out all of the words on the same word line at once, and by providing appropriate associated logic for controlling and selecting the data read from and to be restored into the memory unit #1 whereby the driving circuitry required is considerably reduced over what would otherwise be necessary.

Referring now to FIGS. 12 and 13, illustrated therein is the circuit arrangement for the sense-digit windings and the sensing, driving and logic circuitry associated therewith. Specifically, FIG. 12 shows the sense-digit winding interconnection arrangement and associated circuitry for an exemplary one of the 260 sense-digit lines in unit #1 of the main memory 9, namely the word 1, bit 1 sense-digit line for matrices M$x$1 and M$x$3. The word windings are omitted in FIG. 12 for the sake of clarity. Since all of the sense-digit lines of matrices M$x$1 (except M$x$1$s$) and M$x$3 are formed in the manner illustrated in FIG. 12, the exemplary showing therein will suffice to disclose the manner of formation of all of the 65 such sense lines (one for each bit in a row) in matrices M$x$1 and M$x$3. Also, it will be understood from FIG. 10 that matrices M$x$2 and M$x$4, M$x$5 and M$x$7, and M$x$6 and M$x$8 may be paired in the same manner as illustrated for matrices M$x$1 and M$x$3 in FIG. 12 in providing the remaining 195 of the 260 total sense lines in the memory unit #1. There will thus be a total of 260 such circuit arrangements in each of the identical memory units #1 and #2, as typically shown in FIG. 12.

Now considering FIG. 12 in greater detail, a sense-digit winding connection arrangement is employed so as to achieve what is conventionally referred to in the art as common mode noise rejection, whereby much of the noise in the system is cancelled. More specifically, as shown in FIG. 12, the sense-digit windings 216 on rods in odd rows are all connected in series to form a first series-connected line 242, while the sense-digit windings 216 on rods in even rows are all connected in series to form a second series-connected line 244. Resistors 249 serve as line terminating resistors and are chosen so as to eliminate reflections. In providing the interconnection of sense-digit windings illustrated in FIG. 12, the center substrate of each rod is used as a return path for its respective sense-digit winding, as previously explained in connection with FIG. 9.

Still referring to FIG. 12, it will be seen that the terminating resistors 249 at the ends of the series-connected lines 242 and 244 are connected together to form junctions 243 between which a digit driver 260 is connected. Also, a junction 247 is provided in the middle of each of lines 242 and 244 between matrices M$x$1 and M$x$3, which junctions 247 are connected to opposite sides of the primary winding 250$a$ of a sense amplifier transformer 250. The resulting symmetry obtained by such a sense-digit winding connection arrangement serves during reading to cancel out common mode noise (such as caused by capacitive coupling between the word windings and the sense-digit windings), while permitting any output signal induced in a sense-digit winding as a result of the switching of a magnetic element to be passed through the transformer 250 and fed to a respective sense amplifier 262. During writing, the common mode connection of the sense-digit windings serves to cancel out signals produced across the transformer 250 by the flow of digit current from the digit driver 260, so that the sense amplifier 262 will not be overdriven to an extent which will prevent its recovering in time for the next reading operation. Also in FIG. 12, the corresponding circuitry for the scratch-pad memory has been shown. Terminating resistors 249$s$ connect the digit sense windings of only two of the rods in the section M$x$1$s$ to one of the 19 digit drivers for bit 1 of the 19 bit word (FIG. 5).

Sense amplifier transformer 250$s$, as shown, is connected across the lines coupled to the sense-digit windings of these rods to provide an output (arrows) to one of the 19 sense amplifiers for bit 1 of the 19 bit word.

The sense amplifier 262 indicated in block form in FIG. 12 is preferably of the same general type as disclosed in the commonly assigned copending patent application Ser. No. 157,899, filed Dec. 8, 1961, in which tunnel diode discrimination elements are used in conjunction with a differential amplifier circuit arrangement to provide for the amplification and detection of bipolar signals in response to the application of an appropriate strobe pulse occurring during the reading operation. It will be noted in FIG. 12 that the strobe pulse is applied to the sense amplifier 262 through AND gate 262$a$ to which the signal J1, 3 is also applied. The signal J1, 3 is derived from the digit decoder (FIG. 4), and will be at a true logical level during a reading or restoring operation only if the selected word is in matrix M$x$1 or M$x$3. The sense amplifier 262 is thus operative only when its respective matrices M$x$1 or M$x$3 contain the selected word. It will be understood that like signals J2, 4, J5, 7 and J6, 8 are respectively provided for the other three matrix pairs M$x$2, 4, M$x$5, 7 and M$x$6, 8 for a similar purpose. It will also be understood that the sense amplifier 262 is designed to respond to bipolar pulses, since the sense winding connection arrangement of FIG. 12 is such that the two series lines 242 and 244 will apply thereto output signals of opposite polarity.

The sense amplifier 262 in FIG. 12 includes circuitry, such as a blocking oscillator circuit, to shape and stretch the signal to produce an output pulse which is capable of logical combination with other signals during both reading and writing, a true logical level signal being produced when a bit 1 is sensed and a false logical level signal being produced otherwise.

The digit driver 260 in FIG. 12 may also be of conventional form and supplies to digit current until the signal W$r$1, 3 is applied thereto, which signal W$r$1, 3 will occur only during writing (when signal E$_W$ is produced) and only if the selected word is in either matrix M$x$1 or M$x$3 (as indicated by signal J1, 3 being at a true logical level). When signal W$r$1, 3 occurs, the digit driver 260 operates to provide digit current I$_D$ during writing in either one direction or the other, that is, either in opposition to the write current I$_W$ or in support of the write current I$_W$ (FIG. 7$n$), depending on whether a "0" or a "1" is to be written into the selected bit position, as previously described when the basic mode of operation was discussed in connection with FIG. 9. The direction of digit current flow produced by the digit driver 260 when signal W$r$1, 3 appears is determined by whether a true or a false logical level signal is present on input 260$a$, which is in turn determined by the respective associated logic circuit 266 whose specific construction and operation will be considered later on herein.

Referring now to FIG. 13, illustrated therein is the connection and overall logical arrangement for bit 1, which includes the bit 1 circuitry for all four of the matrix pairs M*x*1 and M*x*3, M*x*2 and M*x*4, M*x*5 and M*x*7, and M*x*6 and M*x*8. Each matrix pair has five separate bit 1 sense-digit circuits respectively corresponding to the five words provided on each row of each matrix pair, thereby providing a total of 20 bit 1 sense-digit circuits, each as typically illustrated in FIG. 12. It will be understood that the sense-digit circuits for each of the other 12 bits of the words in the memory may be arranged in the same way as illustrated in FIGS. 12 and 13 for bit 1, so that the description of FIGS. 12 and 13 with respect to bit 1 will suffice for all other bits.

Considering FIG. 13 in more detail, it is to be noted that only the sense amplifier (abbreviated S.A.), the associated logic circuit (abbreviated A.L.) and the digit driver (abbreviated D.D.) are shown for each of the 20 bit 1 sense-digit circuits; the remaining portions of each may be provided as already illustrated for the word 1, bit 1 sense-digit circuit in FIG. 12. The sense amplifier 262, the associated logic circuit 266 and the digit driver 260 of the word 1, bit 1 sense-digit circuit illustrated in FIG. 12 are given the same numerical designations in FIG. 13 as in FIG. 12.

It should also be noted that the "XB" designations in FIG. 13 serve to identify the particular word and bit to which each sense amplifier, associated logic circuit and digit driver shown therein corresponds; the "B" subscripts in FIG. 13 are all "1" since only the bit 1 circuitry is shown therein, and the "X" subscripts represent the particular word in the row to which each unit corresponds. Accordingly, the word 1, bit 1 sense amplifier 262, associated logic circuit 266 and digit driver 260 in the matrix pair M*x*1, M*x*3 are given the designation X1B1 in FIGS. 12 and 13, as also are the word 1, bit 1 circuits for the other matrix pairs. Following the patterns set out above, the word 2, bit 1 circuits are designated X2B1 in FIG. 13, the word 3, bit 1 circuits, X3B1, the word 4, bit circuits X4B1, and the word 5, bit 1 circuits, X5B1.

The construction and operation of the bit 1 sense-digit circuit arrangement of FIG. 13, as well as the detailed construction and operation of each associated logic circuit as exemplified in detail in FIG. 12, will become evident from the following description of the operation occurring during a typical R–R cycle in the main memory unit #1.

For this purpose, reference will also be made to the main memory timing control circuits for main memory unit #1 shown in FIG. 6*a* and the timing diagram of FIG. 7 which illustrates the timing of the various timing signals and other signals produced during a R–R memory cycle of the main memory unit #1.

Thus, referring to FIGS. 6*a* and 7, a R–R memory cycle is initiated in the main memory unit #1 by passing the R–R cycle pulse R1 (FIG. 7*e*) to the delay line 320. In response thereto, the timing pulses $E_D$, $E_{RD}$, $E_S$, $E_W$ and $E_{WD}$ are generated at the timing control circuit outputs as shown in FIG. 6*a*. The timing of these pulses are shown in FIGS. 7*h* to 7*m*. Accordingly, a short time after the R–R memory pulse C*m*#1 is applied to the delay line 320, the selector signal $E_D$ is produced thereby, which is applied to the row and column selectors 235 and 245 in FIG. 11. As a result, the row selector 235 selects a particular one of the 50 read row switches, while the column selector 245 selects a particular one of the 80 read column switches, the particular switches selected being determined by row selection and column selection address outputs L*d*$_{1-13}$ and L*d*$_{17}$ derived from drivers L*d*1–13 and L*d*17, respectively (FIG. 11).

As illustrated in the timing diagram of FIG. 7, a short time after the occurrence of the selector signal $E_D$ (FIG. 7*h*), a read dummy pulse $E_{RD}$ (FIG. 7*i*) is produced which pulse is applied to the read dummy load 230*a* in FIG. 11 to unshort the read current source 230 and thereby cause a read current $I_R$ (FIG. 7*n*) to flow through the selected word line, via the read row switch and the column row switch selected by the row and column selectors 235 and 245 in response to the selector signal $E_D$.

The read current $I_R$ flowing through the selected word line causes all 65 magnetic elements or bits coupled to the selected word line to receive a coercive magnetic effect sufficient to drive each to the "0" saturation state if a "1" is stored therein. Thus, each magnetic element in the selected word line which stores a "1" induces an output signal in its respective sense-digit winding, while each magnetic element which stores a "0" induces no output signal into its respective sense-digit winding.

For the purposes of this description it will be assumed that the selected word line is the one which would be selected by activation of the uppermost read row switch connected to row drive line *x*1 in FIGS. 10 and 11 and the leftmost read column switch connected to column drive line *y*1 in FIGS. 10 and 11. This means that the selected word line is in matrix M*x*1 so that the signal J1, 3 from the J decoder (FIG. 4) and corresponding to the matrix pair M*x*1, M*x*3 is true, while the other matrix pair signals J2, 4, J5, 7 and J6, 8 are false. It will further be assumed that the particular one of the 5 words on the selected word line which is to be ultimately selected is the first word on the row, in which case the signal X1 from the digit decoder and corresponding to the first word on each row is true, while signals X2, X3, X4 and X5 corresponding to other words on each row are false.

In view of the assumptions made in the previous paragraph, the top rod in the word 1, bit 1 digit plane of matrix M*x*1 illustrated in FIG. 12 contains the magnetic element corresponding to bit 1 of the selected word on the selected word line. Thus, when the selected word 1, bit 1 magnetic element stores a "1," the read current $I_R$ flowing through its respective word line switches the element back to the "0" saturation state, causing an output pulse to be induced in the series-connected line designated 242 in FIG. 12. This output pulse is coupled by transformer 250 to the sense amplifier 262 which is activated by the strobe pulse $E_S$ (FIG. 7*j*), since the signal J1, 3 derived from the digit decoder (FIG. 4) is true as a result of the selected word being in matrix M*x*1. The amplified output pulse appearing at the output of the sense amplifier 262 in FIG. 12 is a true logical level signal.

Now referring to FIG. 13 along with FIG. 12, the description will continue in detail only with respect to the circuitry for bit 1, it being understood that operation with respect to the circuitry for each of the other 12 bits occurs in a similar manner. From the description so far it will be evident that, as a result of the read current being applied to the selected word line which has been assumed to be in matrix M*x*1, only the sense amplifiers S.A. of the matrix pair M*x*1, M*x*3 will be of interest, since the word lines of other matrix pairs receive no read current and therefore induce no output signals into their respective sense-digit lines. In any case, the strobe pulses of the sense amplifiers of all other matrix pairs besides M*x*1, M*x*3 will be prevented for activating their respective sense amplifiers (as typically illustrated in FIG. 12) because their respective matrix selection signals J2, 4, J5, 7 and J6, 8 will be false. It will, of course, be understood that if any of the other three matrix pairs were to contain the selected word line, operation would be the same as will now be described for the matrix pair M*x*1, M*x*3.

Thus, referring to FIG. 13 and matrix pair M*x*1, M*x*3 in particular, it will be understood that the true and false states of the outputs of the five M*x*1, M*x*3 sense amplifiers (S.A. X1B1, S.A. X2B1, S.A. X3B1, S.A. X4B1, and S.A. X5B1) during the presence of the strobe pulse $E_S$ (FIG. 7*j*) will represent the data stored in the 5 bit 1 magnetic elements of the 5 words on the selected word line. To select the bit 1 sense amplifier output which corresponds to the selected word, each is fed to a summing gate 300 via a respective one of the OR gates 291*a* to 295*a* and a respective one of the AND gates 291*b* to 295*b* in FIG. 13. Each such respective OR gate-AND gate pair corresponds to a respective one of the 5 words on each row, as indicated by the signals X1, X2, X3, X4 and X5 (representing which of the 5 words on the selected word line is to be selected) being applied to respective AND gates 291b to 295b. It will be noted that, similarly to the matrix pair Mx1, Mx3, the sense amplifier outputs from the other matrix pairs are likewise fed to respective ones of the OR gates 291a to 295a in accordance with the word in the row to which it corresponds, as indicated by the number after the letter "X."

Since it has been assumed that the selected word is the first word in the row, word selection signal X1 will be true, while word selection signals X2, X3, X4 and X5 are all false. Consequently, only AND gate 291b will be enabled to permit the bit 1 word 1 output signal from sense amplifier 262 to be passed to the summing gate 300. In other words, under the assumed conditions, the combination of the matrix selection signal J1, 3 and the word selection signal X1 has restricted the resultant bit 1 output signal appearing at the output of the summing gate 300 to that produced by the word 1, bit 1 magnetic element, while ignoring any other bit 1 signals which may have been induced in the bit 1 sense-digit windings of the other four unselected words on the selected word line in the selected matrix Mx1.

Thus, if a "1" is stored in the word 1, bit 1 magnetic element of matrix Mx1, a true output signal appears at the output of sense amplifier 262 which passes through OR gate 291a and AND gate 291b (enabled by X1 being true) to cause a true logical level signal to be produced at the output of the summing gate 300 in FIG. 13. On the other hand, if a "0" is stored in the word 1, bit 1 magnetic element, a false output signal appears at the output of sense amplifier 262, inhibiting AND gate 291b and causing a false logical level signal to be produced at the output of the summing gate 300.

It should be recalled that the typical memory cycle being considered is a R–R memory cycle. Because the typical memory cycle is a R–R memory cycle, the output of the summing gate 300 (FIG. 13) is passed through AND gate 310 to the read M register storage circuit M1 by the enabling pulse XR#1. The enabling pulse XR#1 is provided by the main memory timing control circuits (FIG. 6a) for unit #1 during R–R memory cycles and only when unit #1 is designated by the output Ld$_{18}$'. Thus, the enabling pulse XR#1 is true during the present typical operation of the memory for a R–R memory cycle to provide for storage of the output (e.g., "1" bit) in the read M register storage circuit M1.

From the above explanation of the manner in which the bit 1 output signal of the selected word is uniquely obtained during reading as a result of the operation of the circuitry of FIG. 13 (even though all 5 bit 1 magnetic elements corresponding to the 5 words on the selected row are read out during reading), it should also be evident how the output signals for all of the other 12 bits of the selected word are uniquely obtained in a similar manner using a respective circuit similar to FIG. 13. There will thus be 13 such circuit arrangements as illustrated in FIG. 13, one for each of the 13 bits in each word which will produce the 13 bits fed to the M register (FIG. 4) during the reading operation of the R–R memory cycle.

Next to be considered is the restoring operation occurring during the typical R–R memory cycle illustrated in FIG. 7. As noted previously, a read-restore operation requires that the same data read out of the selected word in main memory unit #1 stored in the read M register (FIG. 4) during the read portion of a memory cycle be written back into main memory unit #1 during the restore portion of the R–R memory cycle. In the other type of memory operation, i.e., in a clear-write C–W memory cycle, it is required that different data be written back into the selected word in the memory during the write portion of the memory cycle than was read therefrom during the read portion of the C–W memory cycle. Which of these two types of memory cycles (R–R or C–W) is to take place during a memory cycle is controlled by the timing control pulses XR#1 and XW#1 described previously. The pulse XR#1 is at a true logical level during the typical read-restore cycle described. During a clear-write (C–W) memory cycle, however, the pulse XW#1 is at a true logical level. The manner in which these signals XR#1 and XW#1 are used to determine the particular binary data to be restored into the memory during the write portion of the cycle will now be described.

In considering the restoring operation, it is important to recognize that, even though only the 13 bits of the selected word read-out during the read portion of the cycle are stored in the read M register (FIG. 4), nevertheless, all 65 magnetic elements on the selected row line have been driven to the "0" saturation during the reading operation and, therefore, reside in the "0" state after reading is completed. It is thus necessary, in providing the operations required for both the read-restore and clear-write cycles with respect to the 13 magnetic elements of the selected word, to also provide for writing back into the remaining 52 unselected elements on the selected row the same data as was read therefrom.

The typical read-restore (R–R) memory cycle will be considered first, since it involves the same type of restoring operation for both selected and unselected elements of the five words on the selected row. With reference to FIG. 12, it will be understood that the read-restore operation to be described with respect to FIG. 12 occurs in a like manner for all 65 magnetic elements of the five words on the selected row. Thus, it will be understood with reference to FIG. 12 that when the timing pulse XR#1 is true during the R–R memory cycle, it passes through an OR gate 302 of the associated logic circuit 266 to enable an AND gate 304. As a result, if the output of the sense amplifier 262 is true as a result of a "1" having been read out from its respective magnetic element in the selected word line during the read portion of the memory cycle, then this true sense amplifier output signal (which is caused to have a pulse width sufficient to remain present during the restore portion of the memory cycle) will pass through the AND gate 304 enabled by the read-restore timing pulse XR#1, and through OR gate 305 to make the input 260a of the digit driver 260 true. Then, when the write signal E$_W$ (FIG. 7k) is generated by the main memory timing circuits (FIG. 6a) during the restore portion of the R–R memory cycle, the digit driver 260 will be activated (since matrix selection signal J1, 3 is also true) and, in response to the true signal on its input 260a, will cause a digit current I$_D$ (FIG. 7p) to be produced in a direction which will aid the write current I$_W$ (FIG. 7n).

As explained previously in connection with FIG. 11, the row and column selectors 235 and 245 act during restoring to select a respective write row switch and a respective write column switch so that, when the write dummy signal E$_{WD}$ (FIG. 7m) unshorts the write dummy load 232a from the write current source 232 in FIG. 11, the write current I$_W$ (FIG. 7n) flows through the same word line as was selected during reading. As a result, the write current I$_W$ in the selected row in conjunction with the aiding digit current I$_D$ produced by the digit driver 260 in FIG. 12 will write back into the respective magnetic element the same "1" that was read out therefrom during reading.

Of course, if a "0" was previously stored in the respective magnetic element, then the sense amplifier output remains false during writing, causing a false signal to appear on digit driver input 260a. In such a case, an opposing digit current I$_D$ (shown by dashed lines in FIG. 7p) is produced by the digit driver 260 which prevents switching of the respective magnetic element, thereby maintaining the "0" stored therein prior to reading. It will be understood that, because the digit current I$_D$ (whether in an aiding or an opposing direction) produces a magnetic coercive effect of only one-third the amount required for switching, unselected magnetic elements on the same sense-digit line as the selected one will remain undisturbed.

The foregoing completes the description of the typical R–R memory cycle and a clear-write (C–W) memory cycle will now be described. As explained previously, a C–W memory cycle is one in which new data, indicated by signals $Ma_{1-13}$ at the outputs of the write M register storage circuits Ma1–13 (FIG. 4) is to be written into the selected word of the selected word line, rather than merely restoring the previously read data as in a read-restore cycle. In such a case the main memory is operative in the clear portion of the C–W memory cycle in the same manner as during the read portion of the R–R memory cycle except that the bit outputs of the selected word being read out are blocked by gate 310 (FIG. 13). Also during the write portion of a clear-write cycle, the clear-write pulse XW#1 from the memory timing control circuits (FIG. 6a) now becomes true (instead of the read-restore pulse XR#1), and, together with the word selection signals X1, X2, X3, X4 and X5 from the digit decoder (FIG. 4) provide for the appropriate operation of each associated logic circuit (FIGS. 4 and 13) as will now be explained.

Thus, returning again to the exemplary sense-digit circuit in FIG. 12, it will be seen that the clear-write pulse XW#1, the word selection signal X1, and the new bit 1 data signal $Ma_1$ are all applied to an AND gate 303 in the associated logic circuit 266 of FIG. 12. Since the respective magnetic element in the FIG. 12 circuit corresponds to bit 1 of the selected word on the selected word line, the word selection signal X1 will be true. Therefore, since the clear-write pulse XW#1 is true during the C–W memory cycle, the new bit 1 data signal $Ma_1$ can pass through AND gate 303 and OR gate 305 to the digit driver 260 to cause the new bit 1 data to be written into the respective bit 1 magnetic element of the selected word on the selected word line. It will be noted that AND gate 304 remains inhibited so as to prevent the output of the sense amplifier 262 (which contains the previous bit 1 data read out during the read portion of the cycle) from being applied to the digit driver 260. AND gate 304 is inhibited because no pulse XR#1 is generated and also the output of AND gate 306 fed thereto via OR gate 302 is false. The output of AND gate 306 is false, since word selection signal X1 (which is true because the respective magnetic element is part of the selected word) is applied to AND gate 306 through inverter 306a which results in a false signal being applied to AND gate 306. It will be understood that all of the other 12 new bits $Ma_2$ to $Ma_{13}$ are written into respective magnetic elements of the selected word in the same manner as just described for bit 1.

Having explained how the new data signals $Ma_{2-13}$ are written into their 13 respective magnetic elements of the selected word in the selected word line during a C–W memory cycle in the main memory unit #1, it will now be explained how magnetic elements of unselected words in the selected word line are handled. It will be remembered that even though such unselected magnetic elements on the selected word line are not ultimately required to be supplied to the read M register (M1–13), they nevertheless are driven to the "0" saturation state during reading. It is thus necessary to restore the same data read out from the unselected magnetic elements on the selected word line during the clear portion of the C–W memory cycle, back into each respective magnetic element during the write portion of the C–W memory cycle. This is required since only the one selected word of the five words is cleared for the one new word of data and the remaining unselected four words on the selected word line must be restored. The manner in which this is accomplished will be explained with reference to FIG. 12 by assuming that word selection signal X1 is false, indicating an unselected word as would be the case for those sense-digit circuits of unselected magnetic elements of any one of the unselected four words on the selected word line. Thus, to prevent undue repetition of circuits for each word in the drawings, it is now being assumed that the first word is one of the unselected words whereby the same FIG. 12 can be used to demonstrate how unselected words on the selected word line are restored in their respective memory cells.

It will thus be understood that the false state of signal X1, indicating an unselected word will then act to inhibit AND gate 303 to prevent the new data signal $Ma_1$ (bit 1) from passing therethrough. On the other hand, in order to provide for restoring the false signal, X1 after inversion by the inverter 306a will apply a true signal to AND gate 306. Since pulse XW#1 is also true, a true signal will appear at the output of AND gate 306 and will pass through OR gate 302 to enable AND gate 304. As a result, the output of the sense amplifier 262 will be applied to the digit driver 260 via AND gate 304 and OR gate 305 to restore the respective unselected magnetic element in the selected word line, the same data as was read therefrom during the clear portion of the C–W memory cycle. It will be understood that all of the other unselected magnetic elements (of the unselected words) will have the same data resorted during a C–W memory cycle in the same manner as just described. Thus, it should be noted that as for the unselected words, the effect of the C–W memory cycle is the same as for unselected four words in the R–R memory cycle, i.e., the words read-out are restored at the same address in the memory.

One further point to note with respect to the C–W memory cycle, generally, is that only the digit drivers in the selected matrix pair $Mx1$, $Mx3$ are activated to operate during writing. This is the case because only for these digit drivers of matrices $Mx1$ and $Mx3$ will the respective matrix selection signal J1, 3 be true, which is necessary as typically illustrated in FIG. 12, since the matrix selection signal J1, 3 is applied to the digit driver AND gate 261 along with the write signal $E_W$ to form the digit driver activation signal $Wr1$, 3. Having completed the description of the main memory unit #1, it is to be understood that memory unit #2 operates in the same identical manner when the addressed word location is in the main memory unit #2 (addresses 20,000 to 39,999). Also, since the scratch-pad memory 13 only involves selection of any one of 80 word locations which are individually addressable, the foregoing description provides a complete understanding of the operation of the scratch-pad memory.

7. PROGRAM CONTROL SYSTEM

Referring now to FIGS. 14a and 14b, the program control system of the data processing system functions during each operating cycle to energize a predetermined program control transistor (NPN) by selectively applying positive and negative signals to the base and emitter thereof. In response thereto, a low level logical signal (program control signal) is produced on the collector of this selected transistor which collector is diode coupled to program control lines (e.g., as shown by diodes 160 in FIG. 15) to render operative those logical diode circuits required to accomplish the particular operations to be performed during the current operating cycle. For convenience and clarity, the operations to be performed during a sequence of operating cycles may be represented by respective operation blocks such as illustrated in FIGS. 23–26 which will be described in detail, infra.

The particular program control transistor 150 selected during a system operating cycle is determined by the states of flip-flops N7–11 of the instruction registers 155 (FIG. 14b) and flip-flops N1–4 and N5–6 of the program counters 157 (FIG. 14a) and 159 (FIG. 14b) whose states during each operating cycle are determined in accordance with the particular commands in the routines of the processing system. The manner in which the program control system provides for the control of logical circuits in accordance with the instruction and program counter flip-flops N1–11 will be set forth later in a detailed description of the program control circuits, following the description of the general arrangement, which follows.

The instruction register 155 (FIG. 14b) includes flip-flops N7–11 for the storage of an instruction designated as the command code which specifies the command to be executed in the subsequent operating cycles. After the instruction register 155 has been set at the beginning of the execution of a command, this register remains unchanged until the required operation blocks in the command are performed or until a decision (e.g., interrupt) is made to the contrary. The states of the flip-flops N7–11 for the typical commands are indicated in the table shown in FIG. 16. The states of flip-flops N7–11 for the load command O1-, for example, are 00001 wherein flip-flop N7 designates the least significant bit and the order of significance of the flip-flops increases with the flip-flop number. The outputs $N_{7-11}$ of flip-flops N7–11 acting through instruction decoder and amplifiers 166 (FIG. 14b) and instruction drivers 173 select one of the column drive lines 154 of octally numbered transistors 150 (01–04 to 01–06) in the program control transistor array 152. For example, when flip-flops N7–11 have the octal configuration 01-, driver transistor 173a will become conductive to produce a negative pulse on line 154a and the emitters of the transistors connected to this line to thereby select the first column 01-.

In many of the commands, twelve or a lesser number of logical operation blocks are required for the performance of the operations individual to the command, in which case only a single column of transistors 150 in array 152 (each column in array 152 having twelve or a lesser number of transistors) is required for the execution of the command. For such commands, the outputs $N_{7-11}$ of the instruction register provide the necessary inputs to instruction decoder 166 for selection directly, according to the command, the proper column of transistors 150 in the array 152. On the other hand, in certain instances, data processing commands are such that more than twelve logical operation blocks may be required for completion or execution of the operations individual to the command. In such instances, a single column of twelve transistors is insufficient and a group of columns of transistors are provided to accommodate the execution of the long command, one transistor 150 corresponding to each operation block. The maximum number of columns which are used in a group is four to provide a maximum number of forty-eight transistors corresponding to the forty-eight operation blocks available for a long command; but as in the case of other commands, not all of the operation blocks need be used. The use of additional columns of transistors to continue the count for commands which require more than twelve operation blocks has an advantage in that it simplifies and reduces the number of components in the program counter 159, counter decoder and drivers 170, and the number of row drive lines 156. In longer commands requiring more than twelve operation blocks, including in some instances various modes, i.e., alternate operation blocks to be performed, flip-flops N7–11 and N5–6 acting through the instruction decoder and amplifiers 166 select any one of a group of as many as four columns of transistors 150 in the array 152 which correspond to the long command to be performed. It should be noted that the instruction register flip-flops N7–11 remain the same for all columns of transistors 150 of a group for a single long command and only the program counter flip-flops N5 and N6 need be changed to select the different columns of transistors 150 of the group.

Thus, the instruction decoder 166 is responsive to the setting of flip-flops N5–6 to select the particular column of transistors 150 in the array 152 from the group of columns selected by instruction register flip-flops N7–11.

The various combinations of the states of flip-flops N5 and N6 for typical commands are shown in the table illustrated in FIG. 16 alongside the states of the instruction register flip-flops N7–11. Where the command includes a group of columns in the array 152, various combinations of the states of flip-flops N5 and N6 are indicated corresponding to the selection of particular columns in the group.

It should be noted that the instruction register flip-flops N7–11 do not enter into the selection of transistors in the program control array 153 shown in FIG. 14a. The program counter flip-flops N5 and N6 themselves acting through counter decoder 168 and drivers 176 select a single column of transistors 150 in the array 153, and the instruction register 155 (FIG. 14b) is not involved in the selection.

The order in which the transistors in a selected column are energized during execution of a command (and thus the order in which the operation blocks are performed during successive operating intervals) is controlled by program counter flip-flops N1–4 (FIG. 14b) which during each operating interval select the drive line 156 of one of the twelve octally numbered rows making up arrays 153 and 152 in FIGS. 14a and 14b, respectively. Specifically, during each operating cycle, flip-flops N1–4 acting through counter decoder and drivers 170 select any one of the four rows –00– to –03– in array 153 if one of the transistors in array 153 is ot be energized, or one of the twelve octally numbered rows –04– to –17– in array 152 if a transistor in array 152 is to be energized. If one of the four rows –00– to –03– of array 153 is selected, the selection of the transistor in array 153 to be energized is then completed by flip-flops N5 and N6 acting through counter decoder 168 and driver transistors 176 to select one of the four columns in array 153. However, if one of the twelve rows –04– to –17– (octal) in array 152 is selected, the selection of the transistor in array 152 to be energized is then completed by flip-flops N7–11 acting through instruction decoder and amplifier 166 to select a group of columns, and in addition, by flip-flops N5 and N6 also acting through counter decoder and amplifier 166 to select a particular one of the columns from the group. Of course, if flip-flops N7–11 select only one column, the use of flip-flops N5 and N6 is not necessary. As will be evident, infra, the transistors of array 153 correspond to command level ("set up") operation blocks, while the transistors of array 152 correspond to operation blocks individual to the respective commands.

Both the columns and the rows of transistors 150 have been octally numbered so that each transistor corresponds to the particular configurations of flip-flops N7–11, N1–4, and N5–6, respectively, which are required for its selection; the numbering of each transistor also corresponds to a like numbered operation block. For example, the transistor in array 152 (FIG. 14b) designated as 01–04 corresponds to operation block 01–04 and is selected by flip-flops N7–11 having the configuration 01 and N1–4 having the configuration 04– (flip-flops N5–6 having the configuration –0 which is not shown in array 152). As another example, the transistor in array 153 (FIG. 14a) designated as XX–00–0 corresponds to operation block XX–00–0 and is selected by flip-flops N1–4 having the configuration 00– and N5–6 having the configuration –0. The "XX" at the beginning of the number is provided to indicate that flip-flops N7–11 have no part in the selection of transistors in array 153, the selection of a transistor in array 153 depending only on the configurations of flip-flops N1–4 and N5–6.

In FIG. 17, the states of the flip-flops N1–4 have been indicated in the table for each of the rows –00– to –17–, inclusive, wherein the numbering used employs octal digits only, i.e., 0 to 7 and 10 to 17, inclusive. The table in FIG. 17 has been divided into two sections, the upper section including rows –00– to –03– of array 153, and the lower section including rows –04– to –17– of array 152. The various possible configurations of the states of program counter flip-flops N5 and N6 for each row are also indicated in FIG. 12 alongside the individual states of flip-flops N1–4 for respective rows. As explained in the previous paragraph, when flip-flops N1–4 select one of the rows –00– to –03– of array 153, only flip-flops N5 and N6 are required to select the transistor in array 153 to be energized; on the other hand, when flip-flops N1–4 select one of the rows –04– to –17– of array 152, the transistor in array 152 to be energized is selected by flip-flops N7–11 acting alone if only one column is selected, but if flip-flops N7–11 select a command requiring a group of columns (which may be as many as four), then flip-flops N5 and N6 are required to choose a particular column from the selected group.

Additional tables illustrated in FIGS. 18 and 19 show the states of instruction register flip-flops N7–11 and program counter flip-flops N1–4 for the energization, during successive operating cycles, of those transistors (each transistor corresponding to a predetermined operation block of the same number as pointed out previously) which are required for the performance of a single stage exemplary command "load" (FIG. 18) and the performance of a double stage exemplary command "move" (FIG. 19). As noted alongside the tables in FIGS. 18 and 19, the upper sections of the tables are common to all single and double stage commands, respectively. As mentioned previously, the operation blocks having a first portion designation of XX correspond to transistors in array 153 (FIG. 14a) and the instruction register 166 (flip-flops N7–11) does not control their selection. It should be noted that the XX–00–0 and XX–01–0 operation blocks are common to both single and double stage commands.

Now considering the program control apparatus in detail with reference to FIGS. 14a and 14b, along with FIG. 15, it will be seen that the transistors 150 of arrays 152 and 153 are arranged in columns and rows by means of column lines 154 and row lines 156. The bases of transistors 150 common to a single row are connected to the same row drive line 156, while the emitters common to a single column are connected to the same column drive line 154. In FIG. 15, a selected group of transistors 150a, 150b, 150c and 150d from array 153, has been chosen for illustrating the operation of the program control system in providing program control signals.

The selection of any one of the transistors 150 in the arrays 152 and 153, for example, transistor 150a or logical operation block XX–00–0, is accomplished during each operating cycle by the proper choice of column and row drive lines 154 and 156 in accordance with the configurations of flip-flops N1–4 and N5–6, as described previously. The timing of the selection is illustrated by the timing diagram (FIG. 3k). As is evident therefrom, the program control signals are provided throughout each system operating cycle except for the early portion of each system cycle during the time interval in which the flip-flops N1–11 are being set and the following time interval required to decode their outputs $N_{1-11}$. After decoding output $N_{1-11}$, the output signals of the decoders in any selected pair of row and column lines 156 and 154 select the proper one of the transistors 150 in one one of the arrays 152 or 153 to provide program control signal X— — for the corresponding operation block. For example, in order to provide a system operating cycle for performance of operation block XX–00–0, the flip-flops N1–4, N5–6, and N7–11 are set as shown in the table in FIG. 18. As a result of this setting, outputs $N_{1-4}$ cause counter decoder and drivers 170 (FIG. 14b) to produce a high level signal on row line –00– (FIG. 14a), and outputs $N_{5-6}$ cause counter decoder 168 to energize transistor 176a to produce a low level signal on column line –0. These concurrent signals on lines –00– and –0– are applied to the base and emitter of transistor 150a to produce a low level program control signal 189 on its collector and program control lines 180 (XGa1, XGa4, XL4, XL1, XF1, XE1 XE2 and XN1) as shown in FIG. 15. These lines 180 are connected to diode gating networks of the processor (as shown in FIGS. 32–40) to provide the logical operations required during the system operating cycle for operation block XX–00–0.

It should be understood that a particular one of the program control lines 180 is, in the usual case, coupled to more than one of the transistors 150 in the respective array whereby a program control signal is produced on that control line whenever energizing any one of the transistors 150 to which the particular control line is coupled. It should be clearly understood that the transistors 150 are selected one at a time by the setting of the column and row flip-flops and that one of the transistors 150 corresponds to each operation block. Resetting the program counter flip-flops N1–4 by the logic pulse Pf at the beginning of each of the system cycles is effective to change the coordinate selection of transistors 150 to proceed to the next operation block in the same column.

With the foregoing discussion of the program control 10, a description of a typical operation will now be set forth briefly with primary reference to the detailed circuit diagram of FIGS. 14a and 15. For the purposes of this description, FIG. 15 has been drawn to include typical associated program control line circuits along with the program control transistors 150a, 150b, 150c and 150d for operation blocks XX–00–0 and XX–01–0 for all commands, and X–02–0 and XX–03–0 for single stage commands. To select transistor 150a corresponding to operation block X–00–0, only flip-flops N5–6 and N1–4 need be set to their required configurations at the logic pulse Pf of the current operating cycle. From previous discussions it will be understood that the configurations required to select transistor 150a are: flip-flops N1–4 be set to configuration $N_1'$, $N_2'$, $N_3'$, $N_4'$ corresponding to row –00– in array 153 containing rows –00– to –03– and flip-flops N5 and N6 be set to the configuration corresponding to column 0. The setting of flip-flops N7–11 does not affect the selection of transistors in array 150, i.e., any setting of program counter flip-flops N1–4 for rows –00– to –03–. In practice, flip-flops N7–11 are set to the proper command to be executed during operation block XX–01–0 even though the outputs $N_{7-11}$ are not used in the selection of any one of the transistors in array 153 and these outputs will not be used for selection until performance of operation blocks in array 152 is required.

In operation, it will be understood that the outputs of flip-flops N5–6 act to cause the counter decoder 168 to produce a high output signal 174 on a decoder output line 167 which is coupled to the base of a NPN switching transistor 176a, as shown in FIG. 14a. The signal 174 turns on the transistor 176a to produce a low level signal 174a on line 154 (column –0) and to the emitters of program control transistors 150a, 150b, 150c and 150d. The selection of transistor 150a is then completed by a high output signal 175 on decoder output line 156 for row: 00– which signal is provided by a counter decoder 170 (FIG. 14b) in response to the –00– row configuration of flip-flops N1–4. As shown in FIG. 14a, the decoder output line 156 for row –00– is coupled to the base of the NPN transistor 150a and in response to the signal 175, transistor 150a is "turned on" to produce a program control signal 189 on the collector thereof. As shown in FIG. 15, the collector of transistor 150a is coupled to program control lines 180 by individual diodes 160 to produce low level program control signals XGa1, XGa4, XL4, XL1, XF1, XE1 and XN1.

It will now be evident that energization of transistor 150a, corresponding to the operation block XX–00–0, produces program control signals XGa1, XGa4 — — — and XN1 on each of the program control lines 180 coupled to the collector thereof. Each program control line 180 is connected to a respective program control signal X— — of one or more logical product circuits (as illustrated in FIGS. 32–40) so that the logical circuit remains inactive during an operating cycle unless a program control signal X— — is applied thereto. Thus, when program control pulses XGa1, XGa4 — — and XN1 are generated in response to transistor 150a being energized, those logical circuits to which those signals are fed become operative during the respective operating cycle. The energization of the program control transistor 150a is thereby able to activate the predetermined combination of logical circuits which are required to be operative during the operating cycle in order to perform the operations corresponding to operation block XX–00–0. In a like manner, the energization of a different transistor 150b (FIG. 15) during the next operating cycle would induce program control signals XFa1, XL2, — — and XL4 on the program control lines coupled to that transistor 150b, whereby the predetermined combination of logical circuits fed by these lines would become operative during the next operating cycle to perform the operations required for the corresponding operation block XX–01–0. For single stage commands, transistors 150c and 150d are sequentially energized in the following operating cycles except when R=(−) when transistor 150c (and corresponding operation block XX–02–0) is skipped. This is accomplished by outputs of decision circuits 11b (FIG. 1) which outputs force program counter flip-flops N1–4 into the configuration $N_1, N_2, N_3', N_4'$ on the third operating cycle of the command instead of $N_1', N_2, N_3', N_4'$. In view of the foregoing, it is seen that by proper choice of the program control transistor during an operating cycle, any of a considerable number of possible combinations of logical circuits may conveniently be made operative in order to perform the wide variety of operations which may be required for the different operation blocks provided by the processing system and in the sequence desired.

Each of the program control signals, such as illustrated by the timing diagram in FIG. 3k are at the low logical level for approximately the entire system cycle (basic or long). This is an important feature in that the logical operations need not be timed to occur simultaneously but can occur throughout the system cycle. For example, logical operations are performed at different times of pulses Pf and Pas (FIG. 3e and 3i). In this regard, it should be noted that logic pulse Pf for flip-flops is operative with program control signals X— — produced during the prior operating cycle (and operation block). The later logic pulse Pas for storage circuits Ma, Sa, La, Aa is operative with program control signals produced in the same operating cycle (and operation block). Thus, flip-flops set in operation block XX–01–0 (by logical inputs including program control signal inputs) are controlled by program control signals initially produced in operation block XX–00–0 and extending over into operation block XX–01–0. The program control signals X— — of the prior operation block XX–00–0 are present during the period of time indicated by "Set N1–11 F/F" in FIG. 3k since the flip-flops N1–11 are capable of maintaining outputs during the logic pulse Pf, for example, which often applies new logical inputs to the flip-flops to cause a change in their state. An adequate time period for propagation of logical signals through the logical circuits is also inherently provided for those circuits which have been made operative during an operative cycle in response to a program control signal in a respective program control line 180 fed thereto.

The foregoing describes the operation of the program control system during a complete operating cycle indicated as operation block XX–00–0 in which program control signals XGa1, XGa4 — — and XN1 are supplied on program control lines 180 to predetermined logical circuits of the computer during an operating cycle in order to make these predetermined logical circuits operative to perform the operations desired in accordance with the operation block to which the transistor 150a corresponds. Also, in the following operating cycle the system performs operations of operation block XX–01–0 by actuation of program control transistor 150b which produces program control signals XFa1, XL2 — — and XL4 on program control lines 180 coupled thereto. Alternatively, as a result of the logic coupled thereto. Alternatively, as a result of the logic performed in the operating cycle for operation block XX–01–0, the subsequent operation block or another operation block may be performed in the immediately following operation cycle, or sequentially shown operation blocks (FIG. 22) may be skipped, depending on the operation of the program counter flip-flops N1–4 and N5–6 controlled by the outputs of decision drivers Ks1, Ks2, and Ks3. Also, as indicated in FIG. 22, the same operation block (e.g., operation block 01–05) is performed repeatedly in immediately following operating cycles, therefore, the same transistor 150 may be energized again or a selection may be made of another transistor 150 which corresponds to an operation block selected in accordance with decisions during the performance of the logical operations in the last operation block to be performed.

Now referring also to FIG. 22, an exemplary portion of a sequential "flow diagram" or operation block diagram is depicted illustrating typical sequential steps or block operations within different commands which may be executed by suitable selection of predetermined program control transistors 150 of arrays 152 and 153 during successive operating cycles. As pointed out previously each of the operation blocks shown in FIG. 22 has an operation block number by which it is identified and which number corresponds to the numerical designation of a transistor in either array 152 or 153 which controls the activation of a predetermined group of logical circuits represented by that block. For example, transistor 01–04 (FIG. 14b) controls the activation of the predetermined group of logical circuits whose operation is represented by operation block 01–04 of FIG. 22. As will hereinafter be made clearly evident in greater detail, each operation block represents, in the operation sense, a set of logical equations which define the logical relationship of the predetermined logical circuits which are made effective during an operating cycle by the program control signals 189 induced in program control lines coupled to the program control transistor 150 corresponding to that operation block, as pointed out previously. It will thus become evident from the foregoing description that it is possible to make the processing system self-sequencing so that, as a result of carrying out the operations represented by a given operation block during an operating cycle, the logical circuits controlling the N flip-flops may be controlled by other processor logical circuits (such as decision circuits 11b) to permit the N flip-flops to be set to the configurations required to select the next program control transistor corresponding to the operation block to be performed during the same operating cycle. Consequently, the order in which the operation blocks are performed by the processor is thus conveniently and advantageously made automatically self-sequencing.

As hereinbefore indicated, the specific operations which are represented by a particular operation block which are carried out in predetermined order during an operating cycle, may be repeated in each of one or more operating cycles, depending on a binary decision formed in the decision logic of decision circuits 11b and brought into effect by the output of the decision drivers Ks1–3. An example of this choice in response to logical operations is indicated at operation block 02–05 in FIG. 22, wherein, as indicated, the computer may, in normal action, encounter the next operation block, or skip (for example, to block XX–00–0, or "stick," i.e., repeat the operations of a block 02–05, as determined by the results of operations within the decision circuits 11b and placed in effect through decision drivers Ks1 and Ks2). Another choice which may be provided within a given command is that at certain operation blocks, a choice between two alternate subsequent operation blocks may be made by the true-false status of one of the program counter flip-flops N5 and N6. This choice may, for example, cause the sequence of operations during that step to be controlled by a program control transistor 150 in an adjacent column of array 152 (FIG. 14b) rather than by the next transistor following in the present column. Thus, it is evident that besides being self-sequencing, logical decisions made by the processor while performing the operations defined by the operation blocks of the command may determine the actual flow path of block operations followed during the processor operation.

8. COMMAND STRUCTURE

The present data processing system is a modified single address system wherein only one main memory field and only one operand stored in the main memory field is normally accessed in a single command. Those commands which access only a single operand are referred to herein as single stage commands and are graphically illustrated in FIG. 20. Some commands, however, are capable of accessing two operands in order, for example, to transfer information from one location in the memory to another. These latter commands are referred to as double stage commands and are illustrated diagrammatically in FIG. 21.

In the present data processing system an actual operand is sometimes stored in the second word (word #2) of a command (in lieu of an address for that operand) where the operand consists of a single word. This is a special case termed implicit addressing and in these instances, since the operand is the second word (word #2) (A) of the command in FIG. 20, the operand may be made available immediately by accessing the main memory cells of the command corresponding thereto. Thus special case of implicit addressing is represented in a command by the last four bits (R) of word #1 thereof which four bits are 1111, i.e. (R=(−)), to indicate that the second word (A) of the command is the operand.

Another mode of addressing which may be employed is referred to as relative addressing wherein the second word (A) of the command does not contain the operand as in implicit addressing described above but instead, the second word of the command contains a twelve bit relative address which upon combination with an eighteen bit base number in one of the index registers 15 of the scratch-pad memory 13 (FIG. 1) provides the eighteen bit address of the first word of the main memory field containing the operand or as more simply stated, the first word of the operand. Thus, in relative addressing the operand is found by means of the second word (A) of the command which serves as a relative address, and upon being combined with a particular base number in a specified index register provides the address of the first word of the operand in the main memory 9. The modification of the relative address (A) in this manner thereby permits different data to be operated upon with the same sequence of commands, and makes possible increased operating speeds as well as permitting greater versatility with a minimum of circuit complexity.

The particular base number in the index register with which the second word (A) of the command is to be combined to provide the address of the first word of the operand is specified by the (RX) portion of the first word of the command which, instead of the (R) portion being set to 1111 as in implicit addressing previously described, the (R) portion combines with the (X) portion to provide an (RX) portion which is the address of the index register where the base number can be found.

The twelve bit relative address (A), which is the second word of the command, is combined with the eighteen bit base number accessed from the addressed index register by addition of the two in the adder 11a, the sum being put into the read address L register (La1–18). The sum stored in the L register (La1–18) is the address of the first word of the operand.

The following is an example illustrating how a single stage command may be accessed from the main memory 9 (FIG. 1) in which it is stored in order to initiate the execution of a command. For this example, it will be assumed that the first word (word #1 of FIG. 20) of the command to be accessed is a number (351) and is stored in a first cell of main memory unit #0 (FIG. 1) at address (40); it will also be assumed that the second word (A) of the command to be accessed is a number (150) and is stored in a second cell of main memory unit #1 at address (41). To access these first and second words of the command stored in the main memory unit #1, it is first necessary that the address of the word #1 (40) be looked up in the Control No. Register (one of the index registers 15) where it is stored; the address is then "read out" of the Control No. Register, stored in the read S register (S1–18), and then transferred to the read L register (La1–18) to permit the words (351) and (150) at addresses (40) and (41) in the main memory unit #1 to be sequentially "read out" into the read M register (M1–12). The state of the read address L register (La1–18) for the address (40) obtained from the Control No. Register and the state for the address (41) of the word #2 are illustrated below along with the first and second words (351, 150) sequentially "read out" of main memory unit #1 into the read M register (M1–12) in response to addresses 40 and 41 being set up in the read L register (La1–18) during consecutive operating cycles.

| Read L Register | La18 | La17 | La16–La9 | La8 | La7 | La6 | La5 | La4 | La3 | La2 | La1 |
|---|---|---|---|---|---|---|---|---|---|---|---|
| Address (40) of word #1 (351) | 0 | 0 | | 0 | 1 | 0 | 0 | 0 | 0 | 0 | 0 |
| Address (41) of word #2 (150) | 0 | 0 | | 0 | 1 | 0 | 0 | 0 | 0 | 0 | 1 |

| Read M Register | M12 | M11 | M10 | M9 | M8 | M7 | M6 | M5 | M4 | M3 | M2 | M1 |
|---|---|---|---|---|---|---|---|---|---|---|---|---|
| | (R=3) | | | | X | (F=5) | | | (C—1) | | | |
| Word #1 (351) | 0 | 0 | 1 | 1 | 0 | 1 | 0 | 1 | 0 | 0 | 0 | 1 |
| | (A=150) | | | | | | | | | | | |
| Word #2 (150) | 0 | 0 | 0 | 1 | 0 | 1 | 0 | 1 | 0 | 0 | 0 | 0 |

So far, a typical single stage command, such as illustrated in FIG. 20, has been analyzed to the extent that the function of the second word (A) of the command has been illustrated as well as the functions of the portion (R) and the combined portions (RX) for implicit and relative addressing, respectively. It has been shown that the second word (A) of the command may itself be the operand, in which case portion (R) of the first word of the command is 1111 to permit those memory cells in the main memory corresponding to the second word (A) of the command (which is the operand) to be accessed. Alternatively, the second word (A) of the command may merely be a relative address which is added to a base number found in one of the index registers 15 to provide the eighteen bit address required to access the first word of the operand in the main memory 9, the address of the register containing the base number in the index registers 15 being provided by the (RX) portion of the first word of the command.

Thus, the remaining portions of the single stage command to be considered are the portions (F) and (C) of the first word. The portion (F) is a three bit binary number representing the number of words in a main memory field (which may have up to eight words as explained previously). The portion (F), therefore, is able to provide information as to when the last word in the field has been accessed. Finally, the purpose of the (C) portion of the first word of the single stage command may be considered. This (C) portion is a four bit binary number representing the command code; that is, remembering the previous discussion of the program control system shown in FIGS. 14a and 14b, the configuration of instruction register 155 (FIG. 14b) containing flip-flops N7–11 is determined by the command code (C), and these flip-flops N7–11 in turn determine those columns of program control transistors 150 (and their corresponding operating blocks) which are capable of becoming energized during the execution of a command.

Turning now to a consideration of a double stage command, the basic structure of a typical command is illustrated diagrammatically in FIG. 21. It will be seen that, in general, the first and second words (word #1 and word #2) are the same as the first and second words of a single stage command (FIG. 20), and may likewise provide the information for a first operand. In a double stage command the (F) portion and the (C) portion together provide the information for setting the instruction register flip-flops N7–11. However, in addition to the first and second words, a double stage command requires two more words (word #3 and word #4, which are able to provide the information for a second operand. Since the command code already has been provided by the (C) portion and the (F) portion of the first word of the command, the (G) portion of the third word is available to provide the field of the first operand; or if no field length information is necessary, the (G) portion is available for various alternatives which may be involved in executing the double stage command. The other portions of the third word (Q), (Y), and (J) may have similar functions to those described for portions (F), (X), and (R), respectively of the first word of a single stage command. Also, in the same manner in which the second word (A) of the command may represent the relative address of the first word of the field containing the first operand, the fourth word (B) of the command may represent the relative adresss of the first word of the field containing the second operand.

It will be appreciated that the arrangement and functions of the various portions of the command structure described above and illustrated in FIGS. 20 and 21 are not limited to the specific examples presented, and may be given different representations and functions depending on the particular data processing operation to be performed.

9. TYPICAL LOGICAL STORAGE CIRCUIT

The storage circuit shown in FIG. 28 and also the flip-flop circuit shown in FIG. 31 are also disclosed and described in commonly assigned copending U.S. patent application entitled Digital Circuitry, of Robert O. Gunderson and Martin H. Jurick, Ser. No. 408,014, filed Nov. 2, 1964.

Referring now to FIG. 28 for a description thereof, a typical logical storage circuit S1 for the present processor is shown to comprise a binary storage device for the lowest order bit of the read S register, for example. In addition, clear-store gate 51c and logical networks 51d and 51e are shown to illustrate the operation of this storage circuit S1. As shown, therefore, the circuit S1 provides storage of the logical level applied to its single logical input $dS1$ by logical networks 51d and 51e and complementary high and low signals at its true output $S_1$ and false output $S_{1'}$. Thus, a true, low level signal (−3 v.) applied to the input $dS1$ provides a true, low level signal at its true output $S_1$ and a false, high level signal (0 v.) at its false output $S_{1'}$, and vice versa. The gate 51c has a timing control signal input Pc which provides for clearing the storage circuit S1 each system cycle at the time of clear pulse Pc (FIG. 3d) and then "latching" the storage circuit S1, if placed in a true state by either one of the logical networks 51d or 51e, for the duration of each system cycle (i.e., between clear pulses Pc). The gate 51c is a necessary part of the storage circuit S1 and is required to provide clearing and holding, i.e., storage of the logical signals applied to the single input $dS1$. The present logical storage circuit shown in FIG. 28 is typical of binary storage circuits for address and input-output data registers for the memories 9 and 13. These storage circuits provide current gain and complementary logical output (e.g., $S_1$ and $S_{1'}$) of opposite high and low logical levels in response to logical signals applied to the single logical input $dS1$, for example. Other circuits of this type are found in the S registers (S–19, Sa1–19), M registers (M1–13, Ma1–13), L registers (L1–18, La1–18) and A registers (A1–7, Aa1–7).

In order to illustrate the operation of the typical storage circuit S1; the logical network or gate 51e is shown coupled to sense amplifier output $as1$ which provides a low logical level signal when a binary "1" digit is read-out of the respective "bit" position of addressed location of the scratch-pad memory 13 to set the storage circuit S1. When no R–R memory cycle in the scratch-pad memory 13 is provided in any system cycle, timing control pulse Ps1 (FIG. 2) is produced, and the logical network or gate 51d is enabled by pulse Ps1 to couple output $Sa_1$ to the logical input $dS1$ to transfer the state of the corresponding storage circuit Sa1 of the read S register to the present storage circuit S1 in order to retain this data therein from one system cycle to the next. When either of the gates 51d or 51e provides a low logical level signal output, it is coupled to the logical input $dS1$ to set storage circuit S1 in the true state. Clear-store gate 51c operates to maintain the true state of storage circuit S1 after being set by outputs of gates 51d or 51e. Gate 51c provides this function by coupling the true, low logical level output $S_1$ to the logical input $dS1$, and gate 51c continues to couple low level output $S_1$ to input $dS1$ for the remainder of any system operating cycle and until cleared by the next (high logical level) clear pulse Pc in the next system cycle. It should be noted, however, that storage circuit S1 is always placed in the false state each system cycle by clear pulse Pc (FIG. 3) and circuit S1 remains in this false state until a low level output of gates 51d or 51e places it in the true state. Thus, an interval of time after each clear pulse Pc exists during each system cycle in which storage circuit S1 is in the false state. The other storage circuits S2–18, M1–18, L1–18 and A1–7 are operated in substantially the same manner except for the different inputs which are corresponding logical inputs. As for storage circuits Sa1–18, Ma1–12, La1–18 and Aa1–7, it should be noted that these circuits are controlled by timing control pulses Pac and Pas (FIG. 2) which are concurrent in time instead of spaced in time as are timing control pulses Pc and Ps (Ps1, Ps2 or memory outputs $as1$–13, $am1$–13). Thus, the other storage circuits Sa1–18, Ma1–12, La1–18 and Aa1–7 are cleared and then set concurrently according to their respective logical inputs at the time of control pulses Pac and Pas.

Referring now to FIG. 28 for a detailed description of the circuitry in the logical storage circuit S1, this circuit is shown to comprise a differential amplifier 50 including a pair of NPN transistors 51a and 51b; and true and false output stages 52 and 54 including PNP transistors 53 and 55, respectively. In differential amplifier circuit 50, the logical signal voltage appearing at the logical input $dS1$ is compared to a reference voltage −V1 applied to terminals on both sides of the differential amplifier 50 as shown. Input signals are applied to the base of differential amplifier transistor 51a via input dS1, while the base of differential transistor 51b receives a constant reference voltage —V1 as its input. In operation, both of the differential amplifier transistors 51a and 51b are maintained in the active region of operation but only one of the transistors 51a or 51b will be conducting a large amount, causing the respective one of the output transistors 53 or 55 to be "turned on" to provide a high logical level signal at its output and a low logical level signal at the output of the other output transistor. The output transistors 53 and 55 are in either of two states; that is, "saturated" or "cut-off." When one of the output transistors 53 or 55 is "saturated," the output voltage thereof is raised to the collector-emitter voltage drop of the respective transistor (i.e., approximately 0 volts). When the other one of the transistors 53 or 55 is in the "cut-off" state, the resistor-voltage divider network determines the output voltage level at —3 volts, for example.

For the purpose of explaining the operation, it is assumed that the storage circuit S1 is initially in a false state whereupon a low logical level signal is shown applied to the logical input dS1 to place the storage circuit in the true state to thereby provide a low logical level signal at output $S_1$ and a high logical level signal at output $S_{1'}$. The low logical level signal at logical input dS1 causes a large decrease in collector current of transistor 51a which raises the voltage at its collector and at the base of transistor 53. In response to the higher voltage at its base, a reverse bias is produced across its base-emitter junction of transistor 53 forcing it into the "cut-off" state, thereby lowering the voltage at the collector and the true output $S_1$ to the low logical level (—3 volts).

At the same time as transistor 51a is forced to conduct very little current as a result of the large decrease in collector current; the differential transistor 51b is caused to conduct a large amount of current which lowers the voltage at its collector to produce a forward bias across the base-emitter junction of transistor 55 causing the output transistor 55 to conduct and go into saturation, thereby raising its collector voltage and the voltage at the false output $S_{1'}$ to the high logical level (0 volts). In the foregoing manner, complementary high and low logical level signals are provided at the true and false outputs in response to the low logical level signals applied to the single logical input dS1.

In response to a high logical level signal applied to the single logical input dS1, the differential amplifier transistor 51a conducts a large amount of current to lower the voltage to provide a forward bias across the base-emitter junction of output transistor 53 causing it to "turn on" whereby its collector voltage and the voltage at the true output $S_1$ is raised to the high logical level. The complementary low logical level is produced at the false output $S_{1'}$ as the transistor 55 is forced into "cut-off" when transistor 51b is caused to conduct very little current in response to transistor 51a conducting a high amount of current.

In order to provide for a large number of logical circuits to be coupled to the single input dS1 (high "fan in"), the input circuit includes a clamping circuit including diodes 56 connecting the base thereof to the reference voltage —V1 to provide upper and lower clamping of the voltage at the base of transistor 51a. This clamping circuit prevents the base of transistor 51a from varying more than the diode forward voltage drop, above and below the reference voltage —V1. Also, because of the large number of logical circuit inputs and the input capacity associated therewith, it is desirable to maintain the logic current high, for example, 3 milliamperes. Under these conditions, there is a provision for a current of approximately 1 milliampere in either one or the other of the two diodes 56 and any noise coupled to the single input dS1 must be larger than this current before it can affect the state of the differential amplifier transistor 51a. In view of the foregoing, it should be apparent that the storage circuit S1 provides for high reliability, higher speed, noise immunity and other features for improved operation of the data processing system.

10. HOLDOVER CIRCUIT

Referring to FIG. 29, the details of the holdover circuit Hd0, shown in block form in FIG. 1, are shown in FIG. 29 to illustrate the circuit arrangement and operation thereof. This holdover circuit Hd0 provides a time delay between system cycles as required for synchronization with certain peripheral equipment operating at a slower rate as previously described in connection with the processor timing (FIG. 2). The holdover circuit, as shown in FIG. 2 and FIG. 29, includes the logical storage circuit as shown in FIG. 28 wherein the output 58a of the holdover timing circuit is coupled to single input hd0 to provide complementary high and low logical level outputs $Hd_0$ and $Hd_0'$ as shown by the timing diagram in FIG. 30. The time delay of output pulses 65 and 66 (FIGS. 30c and 30d) is provided from the time any of the negative pulses 64 are applied to the single logical input dHd0. More particularly, the time period of delay begins at the trailing edge of each pulse 64.

Referring now to FIG. 29 for a detailed description of the holdover circuit shown therein, the holdover timing circuit is shown to include a charging network which comprises an adjustable resistor 57 and a compensating voltage supply source 62 connected to a capacitor 58 for precise regulation of the time required to charge the capacitor 58, i.e., for any setting of the adjustable resistor 57, the time required to charge capacitor 58 does not vary. As shown, the compensating voltage supply 62 includes Zener diodes connecting the series voltage dropping resistors to the voltage tap —V5. This same voltage tap —V5 is also connected to the lower side of capacitor 58 (and also to the emitter of transistor 59) which is shown by another voltage point —V5 in FIG. 29. Further, the voltage applied to tap —V1, which is shown connected to diode 56 in FIG. 29, is supplied by the same voltage supply 62 via Zener diode 61a. As a result, precise voltage regulation is provided for charging the capacitor 58 even through voltage at sources +V and tap —V5 vary slightly but in the same manner, i.e., due to current load and temperature variation. Due to the fact that the voltage tap —V5 is connected as described, the maximum uncompensated variation of the resistor 57 has been found to be less than 1.12%. Variation in the time delay of the holdover circuit Hd0 over the range provided by the capacitor 58 is provided by the adjustable resistor 57 wherein decreasing the resistance thereof decreases the charging time of capacitor 58, and also the time delay required to return the holdover timing circuit output 58a to a high logical level. Normally, this output 58a is considered to be at the high logical level as provided by the voltage at the collector of transistor 59 during cut-off which is also the voltage across the fully charged capacitor 58. The range of the period of time delay is changed by providing a selected capacitor 58 of the proper value wherein a large capacitor 58 provides for a range of time delay for longer time periods and the variation of the time delay within the range of the seelcted capacitor 58 is controlled by the adjustable resistor 57. A typical range of time period of delay of the timing circuit is from 4 to 17 microseconds for the large capacitor 58, the adjustable resistor being provided primarily to vary the charging rate and thereby control the time delay within the range of the time period of delay of the capacitor 58, including adjustment for component variations of the holdover timing circuit and other circuits coupled thereto.

In order to provide fast and reliable operation of the holdover Hd0 in the range of time periods being discussed, the false output $Hd_0'$ is coupled back to the input hd0 by a feedback circuit including a transistor 68, as shown in FIG. 29. This feedback circuit provides for fast transition of the signal at input hd0 (FIG. 30b) through the critical threshold region 69 (FIG. 30a) of transistor 51a. When the signal passes through this threshold region, transistor 51a is "turned-on" which changes the state of the holdover Hd0 from a true state to produce pulses 65 and 66 (FIGS. 30c and 30d) at the respective outputs $Hd_0$ and $Hd_0'$. Accordingly, it is important that the rise in voltage of the signal at input hd0 continue to rise until it passes through threshold region 69 and "turn-on" transistor 51 without delay. In operation, the signal at the input hd0 is a rising voltage ramp which is applied thereto by capacitor 58. When in the threshold region 69, the voltage level causing the transistor 51a to turn-on is critical and even a slightly lower voltage level of capacitor 58 will not turn-on transistor 51a. Accordingly, a positive feedback during the transition period would assure proper operation.

On the other hand, without the feedback current this circuit would be susceptible to noise in that noise can cause spurious "turning-on" of transistor 51 when in the threshold region 69. The present feedback circuit avoids this problem, by producing an abrupt change rather than a gradual change in voltage level of the signal at the output hd0 when the signal voltage reaches the threshold region. Thus, when the signal voltage rises to the threshold region and transistor 51a starts to "turn-on," the differential amplifier produces a rise in voltage at the base of transistor 55 causing it to start to turn-off (go out of the state of saturation). When transistor 55 starts to turn-off, the collector voltage decreases and the feedback circuit transistor 68 starts to "turn-on." As the transistor 68 starts to "turn-on," it supplies current to transistor 51a via feedback circuit capacitor 67. The transition through the threshold voltage region of the transistor is caused to be an abrupt change as shown in FIG. 30b rather than a gradual change as would be the case without the feedback circuit. Accordingly, the operation of the transistor 51a and the change of the state of the holdover Hd0 is fast and reliable in providing the precise time delay required for synchronization of the processor with the operation of peripheral equipment at the operating rate determined by the holdover Hd0.

Having considered the more important details of the holdover arrangement, the overall operation of the holdover circuit Hd0 will now be presented. In the operation of holdover Hd0, each of the negative pulses 64 causes the holdover Hd0 to produce pulses 65 and 66 at outputs $Hd_0'$ and $Hd_0''$ respectively. These pulses 64 are applied to the input dHd0 from a source of timing pulses for synchronizing the processor operation with particular peripheral equipment (not shown) for input/output operations. As discussed previously in the description of the processor timing in FIG. 2, the system operating cycles are synchronized to the rate of pulses at the output $Hd_0'$ whenever program control signal XHCL is provided for input/output operation of the processor at the synchronized rate. During the time period between pulses 66, therefore, the initiation of a system operating cycle of the processor is inhibited by the high logical level signal at output $Hd_0'$.

Considering now the overall operation of the holdover timing circuit, each of the negative input pulses 64 applied to the single input dHd0 causes transistor 60 to "turn-on" to produce positive pulses 63. Each of these positive pulses 63 is coupled to the base of transistor 59 causing this transistor to "turn-on." Each time the transistor 59 is "turned-on," the previously charged capacitor 58 is discharged through the transistor 59. At the end of each positive pulse 63, transistor 59 is "turned-off" and capacitor 58 is charged at a time rate determined primarily by the adjustable resistor 57. In the timing diagram of FIG. 30, the input hd0 (FIG. 30b) illustrates the discharge of capacitor 58 in response to each of the positive pulses 63 and the charging rate for producing a 10-microsecond pulse rate for producing a system operating cycle every 10 microseconds which is the operating rate of the peripheral equipment for which the holdover Hd0 is provided. Thus, synchronized operation of the processor and particular peripheral equipment (not shown) is provided at the 10-microsecond rate of the peripheral equipment whenever required.

11. TYPICAL FLIP-FLOP CIRCUIT

In certain registers, namely, the N registers and T registers (FIG. 1), each binary storage device comprises a flip-flop, i.e., N1–11, T1–12, TM1–3, TK1–3, and T@1–3. Flip-flop circuits are also provided for control of the main and scratch-pad memories, i.e., flip-flops E1, E2, F1, F2 and F3 in the special logical circuits 11c. All these flip-flops are placed in the proper true or false state according to their respective logical inputs at the beginning of each system operating cycle (e.g., #1, #2, and #3, FIG. 3) at the time of logic pulse Pf, FIG. 3e (and clear pulse Pc, FIG. 3d). The flip-flops are placed in the proper states as determined by logical operations and decisions of the immediately preceding operating cycle, e.g., all of the flip-flops are placed in their respective proper states at the time of the logic pulse Pf (FIG. 3e) in system cycle #2 (FIG. 3) in accordance with the logical operations and decisions of system operating cycle #1. Of course, in many system cycles, no logical operations or decisions occur which involve changes in states of certain flip-flops; accordingly, these flip-flops will remain in the same states through two or more successive operating cycles. For example, the flip-flops N7–11 of the instruction register will often remain in the same states throughout the many system operating cycles for the operation blocks performed in the execution of a single command.

Referring now to FIG. 31 for a detailed description of the operation of a typical flip-flop N1, the circuit arrangement is shown to include a binary storage circuit 70 and a single logical input circuit 72. The binary storage circuit 70 provides complementary high and low logical level signals at outputs $N_1$ and $N_1'$ in response to logical signals applied to single logical input sN1. Further, the flip-flop N1, as shown, provides for retention of its true or false state for the duration of any system cycle. At the beginning of each system cycle, a logic pulse Pf places the flip-flop N1 in the state corresponding to the low (true) or high (false) logical level signal applied to its input sN1. It should be noted, however, that the input circuit 72 provides a sufficient time delay of the logical signals applied to input sN1 whereby changes in logical level of the logical signal applied to input sN1 during the time period of logic pulse Pf (and clear pulse Pc) will not affect the resulting state of flip-flop N1. Thus, changes in the outputs $N_1$ or outputs of other flip-flops by the current logic pulse Pf and coupled to input sN1, for example, will not cause retriggering of the flip-flop N1. Also as shown in FIG. 31, separate timing control inputs for flip-flop N1 are provided for applying the logic pulse Pf to a logic gate 78 at the beginning of each system cycle for gating the logical input signal and clear pulse Pc to a clear-store gate 80 to clear the flip-flop for setting the flip-flop in accordance with the logical input signal passed by logic gate 78. It should be noted that the low level timing signal between clear pulses Pc enables clear-store gate 80 to pass the true input $N_1$ for retaining the state of the flip-flop N1 throughout the remainder of the current system cycle.

In order to describe the operation, it will now be assumed that a high level (false) logical signal (0 v.) is applied to the single logical input sN1 to change the flip-flop from the true state to the false state at the time of logic pulse Pf (and clear pulse Pc, e.g., system cycle #2 FIG. 3d). As a result, the true output $N_1$ is changed from a low to a high logical level, and the false output $N_1'$ is changed from high to a low logical level.

In operation, therefore, the high logical level signal applied to the logical input sN1, as shown in FIG. 31, is delayed by the input circuit 72 including an inductor 71. The time delay of the input circiut 72 and the inherent delay of the logical circuit 70 provides the total time delay necessary to prevent retriggering of the flip-flop N1. The delayed high level logical signal 74a applied to the input 74 of the binary storage circuit 70 is coupled to sum diode 75 of a logic gate 78 which includes product diode 76 for the logic pulse Pf. The sum diode 75 is connected to the base of transistor 51a for applying the delayed high level logical signal thereto for controlling the state of differential amplifier 50 and true and false output states 52 and 54 to provide a high level signal at the true output $N_1$ and a low level signal at the false output $N_1'$ in the manner described previously in connection with FIG. 28 in which corresponding reference numerals indicate the corresponding parts thereof. In general, at the time of the logic pulse Pf, the delayed high level logical signal 74a at the input 74 is gated to place the flip-flop N1 in a false state when the delayed logical signal 74a is at a high logical level (−3 v.) or in a true state when the delayed logical signal 74a is at the low logical level (0 v.).

Referring now to the clear-store gate 80 for a more detailed discussion thereof, it was previously noted that the clear pulse input is provided for clearing the flip-flop N1 each system operating cycle to enable the binary storage circuit to be placed in either one of the binary states according to the logical level of input signal 74a. Also as noted before, the clear-store gate 80 also provides for retention of the binary state for the current system cycle (the time period between successive clear pulses Pc of successive system operating cycles). This clear-store gate 80 comprises a sum diode 81 and product diodes 82 and 83.

Prior to the clear pulse Pc (e.g., system #2, FIG. 3d), the diode 83 couples the true output $N_1$ (as shown in FIG. 31) to the sum diode 81 and the product diode couples a low level timing control output signal (FIG. 3d), which is present at clear pulse input, to the sum diode 82. This low level timing enables clear-store gate 80 to pass the true output $N_1$ to the base of transistor 51a to retain the state of the flip-flop N1 (store) for the duration of the current system cycle #2. At the time of clear pulse Pc, the gate 80 is disabled to block the output $N_1$ in order to allow the flip-flop N1 to be placed in the false state according to the high (false) level of the logical signal 74a. In the false state, flip-flop N1 provides a high level signal (0 v.) at true output $N_1$ and a low level signal (−3 v.) at the false output $N_1$. The flip-flop N1 is retained in its false state throughout the current system cycle #2 because the high level signal at the true output $N_1$ is coupled to clear-store gate 80 to produce a high level signal at its output. Also, it should be noted that the output of logic gate is false having the remainder of the current system cycle #2. Thus, the signal applied to the base of the transistor 51a remains at a high level during the remainder of the current system cycle #2 to retain the flip-flop N1 in the false state.

In general, the logical inputs to the transistor 51a for control of the flip-flop N1 can be expressed simply by the logical equation as follows:

$$db = i\ (Pf) + N_1\ (Pc)$$

where $db=$ is the input to transistor 51a and
$i=$ input 74 (applied to logic gate 78),
$(Pf)=$ logic pulse input (applied to logic gate 78),
$N_1=$ true output of flip-flop N1 (applied to clear-store gate 80), and
$(Pc)=$ clear pulse input (applied to clear-store gate 80).

Considering now the next later system operation cycle #3, for example, the logical input is assumed to have returned to the low logical level (true) during system cycle #2 as a result of logical operations and decisions in system cycle #2. This exemplary operation illustrates the manner in which the state of flip-flop N1 is changed from its false state to its true state in response to a low level logical signal (true) at input 74 at the time of logic pulse Pf (and clear pulse Pc). At the time of the logic pulse Pf (system cycle #3, the logic gate 78 has both a low level logical signal (true) at the logical input and a low level logic pulse Pf at the logic pulse input. Thus, the flip-flop N1 is placed in the true state at the beginning of system cycle #3, in response to the low level output of logic gate 78 which is applied to the transistor 51a. The flip-flop N1 is retained in this true state for the entire system cycle #3 by the low level output of the clear-store gate 80 having low level signals at both inputs thereof, i.e., clear pulse input Pc and the input connected to the true output $N_1$.

Considering now the remaining circuitry of flip-flop N1 which has not been discussed previously, a parallel resistance-capacitance network 85 is shown connected to the input to transistor 51a. This network provides a time delay for signals applied to the base of transistor 51a in order to insure that the flip-flop is placed in the true state, i.e., a low level output of logic gate 78 will remain at least until the clear-store gate 80 provides a low level output for retaining the flip-flop N1 in the true state. Accordingly, the low level signal is retained until after the clear pulse Pc is gone and the clear pulse input has returned to the low level; and the output $N_1$ is at a low logical level to provide all low level inputs to clear-store gate 80. Thus, even when a change in state of flip-flop N1 is involved i.e., the flip-flop was previously in a false state, the low logical level will be retained by the network 85 until the flip-flop N1 is placed in the true state wherein the output $N_1$ is changed from a high level to a low level and until the clear pulse input has returned to the low logical level.

Referring now to the single logical input circuit 72 for a more detailed discussion thereof, this circuit is shown to include an inductance-resistance network comprising inductor 71 and resistance 71a. As noted previously, this network provides the time delay required to prevent retriggering of the flip-flop N1 during the time period of logic pulse Pf. Thus, the logical input signal (or any changes thereof) at the logic input sN1 during the time period of logic pulse Pf will not affect either the setting or the resultant state of the flip-flop N1 in the respective system operating cycle. As is known, spurious changes in the logical signal applied to flip-flop inputs (e.g., sN1) occur during the logic pulse Pf; and these spurious changes must not affect the resulting state of flip-flops (e.g., N1). Accordingly, the time delay of inductor 71 and the inherent time delay of the remainder of the circuits of flip-flop N1, for example, provides for setting the flip-flop N1 according to the logical signal level present at input sN1 prior to the logic pulse Pf and signals at input sN1 during logic pulse Pf are delayed so as not to affect the resulting state of flip-flop N1. Further, as shown, a transistor 77 is connected in the input circuit 72 for current amplification in order for flip-flop N1 to provide for large "fan in" capability. In response to a high level logical (false) signal at input sN1, current is passed through inductor 71 and into the base of transistor 77 to "turn-on" this transistor. When transistor 77 is "turned-on," the collector thereof and ground (0 v.) are connected to the input 74 to provide a high level signal to logic gate 78. On the other hand, in response to a low logical level signal at input sN1, current passes through diode 79 from the source −V1 and through inductor 71 in the opposite direction to the logical networks (not shown) which are coupled to logical input sN1. This produces a negative signal at the base of transistor 77 causing it to "turn-off" whereupon the input 74 is returned to a low level (−3 v.) at the time of logic pulse Pf. Also as shown in FIG. 31, a set input is provided which is connected directly to the base of transistor 51a. Because of this direct connection, any low logical level signal applied to this set input will immediately cause the flip-flop N1 to be placed in the true state. Thus, no logic pulse P$f$ (or clear pulse P$c$) is required to place the flip-flop in a true state when low logical level signals are applied to the set input. Thus, the flip-flop N1 can be placed in the true state at any time. In the same manner, any high logical level signal (false) applied to the set input will immediately cause the flip-flop N1 to be placed in the false state. In view of the foregoing description, the operation of this typical flip-flop N1, and the operations of the other flip-flops of the present system should be clear.

12. OPERATION

A detailed description of the operation of the data processing system during four successive operating cycles will be provided in order to illustrate the mechanization and operation of a specific data processing system in accordance with the invention. The operation of the data processing system was previously shown to be accomplished in successive system operating cycles, i.e., basic and long system operating cycles for basic and long operation blocks, respectively. In order to provide a clear understanding of the mechanization of block operations of exemplary commands, which follows later, the manner in which the basic operating cycle and long operating cycles are capable of performing the logical operations of each operation block will now be briefly summarized with the aid of the timing diagram of FIG. 3 which illustrates a basic system operating cycle and long operating cycle. While it may be noted that system cycle #1 (FIG. 3) is directed to performing basic operation block XX–00–0 (FIG. 23) and system cycle #2 is directed to performing long operation block XX–01–0 (FIG. 24), the following summary will not be directed to these details but to basic and long system cycles, in general, to briefly illustrate the manner in which any operation block is capable of being performed by these system operating cycles.

As shown in FIG. 3, each system cycle is initiated by a clock pulse C (FIG. 3c). This clock pulse C, as noted earlier, is applied to the delay line 40 (FIG. 2) to produce the timing pulses required for performing the necessary logical and control operations, and memory pulses for initiating memory cycles in the system cycle. Considering a basic system cycle first, the operations are as follows:

(1a) Clear the read data M, S registers (M1–13, S1–19) by the clear pulse P$c$ (FIG. 3$d$) in preparation for receiving the data read out of the respective main and scratch-pad memories (see following paragraph 3a);

(1b) Clear the write address L, A registers (L1–18, A1–7) by clear pulse P$c$ in preparation for copying read address therein (see following paragraph 3b);

(2) Initiate read-restore (R–R) memory cycle(s) in the main and scratch-pad memories by applying a read pulse R1 (FIG. 3$f$) to the respective memory timing control circuits;

(3a) Copy read addresses into write address L, A registers (L1–18, A1–7) from read L, A address registers (L$a$1–18, A$a$1–17) at the time of timing pulse P$s$ (FIG. 3$g$) in order to provide for writing modified data at the same address in following C–W memory cycle, if any;

(3b) Set read data M, S registers (M1–13, S1–13) by the sense amplifier outputs during strobe (FIG. 3$f$) of the respective main and scratch-pad memories during R–R memory cycles;

(3c) When no R–R memory cycle of the main memory (F$_1$'), timing pulse P$s$2 is produced to copy data into read data M register (M1–13) from write data M register (M$a$1–13), and when no R–R memory cycle of scratch-pad memory (E$_1$'), timing pulse P$s$1 is produced to copy data into read data S register (S1–19) from write data S register (S$a$1–19);

(4a) Clear read address L, A register (L$a$1–18, A$a$1–7) for new read address and clear write data M, S registers (M$a$1–13, S$a$1–19) for new data by clear pulse P$ac$ (FIG. 3$h$);

(4b) Set read address L, A registers (L$a$1–18, A$a$1–7) to new read address in preparation for reading in the next system cycle and set write data M, S registers (M$a$1–13, S$a$1–19) to new data by logic pulse P$as$ (FIG. 3$i$) according to the results of the logical operations performed during the preceding logic time period;

(5a) Clear all flip-flops including flip-flops N1–11 for program control by clear pulse P$c$ (FIG. 3$d$);

(5b) Set all flip-flops to new data, according to the results of the logical operations performed during the preceding logic time period at the time of logic pulse P$f$ (FIG. 3$e$); flip-flops N1–11 for program control (FIG. 3$k$) are set to new program control data, according to the results of the decision logical operations performed during the preceding decision logic time period.

The long system cycle, e.g., system cycle #2 (FIG. 3) includes the basic system cycle and is immediately followed by a C–W memory cycle in the long system cycle. A long system cycle is provided only for those operation blocks requiring a C–W memory cycle in either the main memory or scratch-pad memory or both of these memories. In each of the long system cycles, the write pulse W1 is produced and a C–W memory cycle is produced in the main memory and scratch-pad memory by applying the write pulse W1 (FIG. 3$j$) to the respective memory timing control circuits. During the C–W memory cycles, the data stored in the write data M, S registers (M$a$1–13, S$a$1–19) is written into the storage locations as specified by the addresses copied into the write address L, A registers (L1–18, A1–7) from the read address L, A registers (L$a$1–18, A$a$1–7) respectively, at the time of pulse P$s$ (FIG. 3$g$). Having briefly summarized the operations performed in basic and long system cycles, the operational description will now proceed to the discussion of the performance of operation blocks of exemplary commands.

12.1 Block operation of exemplary commands

It is to be understood that the following description is intended merely to be representative of a relatively small portion of processing system activity during successive operating cycle, and for the sake of brevity and clarity, does not include all the possible considerations or the complete operating details which may be involved in the operation of a specific data processing system. However, from the previous discussions, and from the following operational description and the logical equations and mechanization to be presented, one skilled in the art would have no difficulty in providing the mechanization and operation necessary for the design of a data processing system in accordance with the invention for a wide variety of data applications.

The command flow diagram illustrated in FIG. 22 describes block operations of exemplary commands and, as such, represents an overall picture of the data processing system operation. It may be noted that the operation blocks are generally arranged in FIG. 22 to correspond to the location of their respective transistors 150 in arrays 152 and 153 of the program control system shown in FIGS. 14$a$ and 14$b$, one program control transistor (and thus one operation block) being energized for each operating cycle. As pointed out in connection with the description of the program control system of FIGS. 14$a$ and 14$b$, the energization of a program control transistor during an operating cycle causes a predetermined combination of logical circuits to become operative during that operating cycle in response to program control signals induced in program control lines coupled to the energized transistor. Thus, by energizing the program control transistors in a predetermined manner during successive operating cycles, any desired command may be performed; also, the selection of each program control transistor to be energized during each operating cycle is advantageously determined by the logical operations performed during the previous operating cycle and various decision circuits 11$b$ (FIG. 1) in a manner so that automatic self-sequencing operation is obtained.

Referring again to the operation blocks of FIG. 22, it will be seen that the first two operation blocks, namely XX–00–0 and XX–01–0 are particularly significant in that all commands are set up for execution by first passing through these two operation blocks; that is, operation blocks XX–00–0 and XX–01–0 are common to all commands. Single stage commands are then further processed in blocks XX–02–0 and XX–03–0, after which any of a number of single stage commands may then be performed by energizing, during successive operating cycles, the program control transistors whose operation blocks correspond to the particular single stage command to be executed. FIG. 22 illustrates the command flow of the typical single stage commands: load, store, and divide.

The command flow for all double stage commands is first through blocks XX–00–0 and XX–01–0 in the same manner as for single stage commands, but as shown in FIG. 22, the flow then proceeds to blocks XX–00–1, XX–01–1, and XX–03–1, in that order, with provision for exceptions as noted by the "skips" indicated. After these blocks, the command flow may then proceed to any of a number of double stage commands, one such double stage command being indicated by the "move" command in FIG. 22.

One or more "skips" such as indicated in connection with block XX–00–1 in FIG. 22, may be provided in executing a command for various purposes, for example, in order to avoid unnecessary block operations, or after the data on which the computer is operating has been processed to a predetermined point. Decision circuits, such as 11b in FIG. 1 which includes decision logic and decision drivers Ks1 and Ks2, act to control when a "skip," "jump," or some other decision operation is to take place after a particular operation block. For example, the "skip" from blocks XX–01–0 to XX–03–0 are results of decisions which depend upon whether an operand is contained in the second word of respective commands.

12.2 *Mechanization and control of logical operations in exemplary operation blocks*

In FIGS. 23 to 26 rectangles representing the operation blocks are enlarged, and within each of the blocks concise statements appear which define exemplary operations or activity of the processor occurring during the operating cycle for which the program control transistor corresponding to the particular operation block is energized. Below each of the blocks, logical equations are presented which represent (by means of Boolean algebra) the logical operations provided by the predetermined combination of logical circuits made operable by the program control lines coupled to the collector of the energized transistor.

It should be noted that certain forms of the logical equations occur in more than one of the exemplary operation blocks, which indicates that the same group of logical circuits are made operable during more than one operation block. It will be understood that with the program control system employed in the present invention, it is only necessary to provide logical circuitry for generating this equation once, and then to cause the particular logical circuits corresponding to the equation to become operable for each operation block where required. Structurally, this merely means that the particular sense lines which are coupled to the logical circuits representing the equation, be also coupled to those program control transistors corresponding to operation blocks where the equation is required. This multiple use of logical circuits very considerably reduces the number of logical circuits required in the data processing system. In the description which follows, it should be noted that the terms for parity bit storage circuits S/C M13, M$a$13, S19 and S$a$19 are not included since these terms are not necessary in the logical operations and control operations being considered for the block operations of the exemplary commands. Accordingly, a clearer understanding of these operations can be obtained by not including the aforementioned terms in the equations shown in FIGS. 23 to 26 and circuits therefor (FIGS. 37 and 38$a$).

Referring to FIGS. 32 to 40 inclusive, there are shown typical logical circuits which may be associated with the adder 11$a$ and the registers and drivers involved in the performance of the four operation blocks XX–00–0, XX–01–0, XX–02–0, and XX–03–0 illustrated in FIGS. 23 to 26, respectively. FIG. 33, for example, depicts typical storage circuits S/C L1–18 and S/C L$a$1–18 of the L registers along with their respective associated exemplary logical circuits and complete logical equations therefor. Since there is general similarity of circuitry for each of the storage circuits S/C L1–18 and S/C L$a$1–18, respectively; the storage circuits S/C L1, L18, L$a$1 and L$a$18 and the input circuitry associated therewith may be considered as illustrative of the others.

Still referring to FIGS. 32 to 40, it will be noted that the logical circuits for the storage circuits, flip-flops and drivers shown therein are made up of conventional diode "and" and "or" logical circuits. The sum diode corresponding to the logical "or" function is shown slightly above the associated product diode or diodes in each logical circuit in order to easily distinguish it therefrom. The accompanying circuitry for the product diodes are illustrated in FIGS. 32 to 40 only for the product diodes and not for the sum diodes; however, the accompanying circuitry for the sum diodes may be considered as incorporated in a conventional manner as part of the storage circuits or drivers to which these sum diodes are coupled as inputs therefor. It will be seen from FIGS. 32 to 40 that the outputs of the logical circuits are connected to the logical inputs of storage circuits, flip-flops or drivers to control the states thereof, as will become apparent from the operative description to be presented herein.

Referring now to FIG. 33, the storage circuits S/C L1–18 and S/C L$a$1–18 of the L registers and their associated logical circuits will be considered in some detail to illustrate the mechanization of a typical register. It will be noted that storage circuits S/C L1–18 and S/C L$a$1–18 are involved in each of the operation blocks XX–00–0 to XX–03–0 inclusive in FIGS. 23 to 26, the complete logical equation for the logical circuits associated with these storage circuits S/C L1–18 and S/C L$a$1–18 being indicated below the circuit diagrams in FIG. 33. The portion of this complete logical equation which is applicable during each operation block is listed under the heading "L registers" in FIGS. 23 to 26, respectively. The signals preceded by the letter "X" (such as XL2, XL1, etc.) in FIG. 33 and FIGS. 23 to 26 each represent the program control signal appearing on a respective program control line (see FIG. 15), and as such the program control signal (e.g., XL2) is true when a program control pulse is produced in the corresponding program control line during a system cycle, and false if no pulse is produced. Thus, in accordance with conventional notation, the prime of a program control signal (such as XL4′) has the opposite meaning and is true if no pulse is produced in the corresponding program control sense line and false if a pulse is produced therein.

From the logical circuitry associated with the storage circuits L$a$1–18 in FIG. 33, it will be noted that the first term of the complete equation, namely logical product (J$a_{1-18}$XL1) P$as$, is common to operation block XX–00–0, as shown in FIG. 23 as well as to operation block XX–02–0, illustrated in FIG. 25. Consequently, the circuitry for implementing this equation need only be provided once. Whenever the logical equation representing this logical product (J$a_{1-18}$XL1) P$as$ occurs in an operation block, it is only necessary that the program control signal XL1 be made true, and this is accomplished by diode coupling the program control sense line corresponding to XL2 to the collector of the program control transistor 150$a$ corresponding to each operation block in which the equation occurs, as shown in FIG. 15.

The logic pulse Pas is produced during each basic system operating cycle to set the storage circuits S/C L$a$1–18 in accordance with the logical inputs thereto.

The second term of the complete logical equation shown in FIG. 33 is the logical product (L$_{1-18}$ count up) XL2) Pas, and is implemented by the logical circuits which include these terms as inputs. The term L$_{1-18}$ (count up) represents the outputs L$_{1-18}$ modified by a "count up" function in a manner well known to those in the art and includes counting up one in the read address L register (adding one to the number stored in the storage circuits S/C L$a$1–18 of the read address L register) for addressing the next word in the main memory for read-out and restore in a R–R main memory cycle.

The third and last product (L$_{1-18}$XL4') Pas in the logical equation shown in FIG. 33 represents the logic required for retaining the address stored in the storage circuits L1–18 for clearing and writing in the addressed word location, such as is required in operation block XX–03–0 (FIG. 26). Storage circuit L$a$1, for example, has a logical circuit having inputs L$_1$, XL4' and Pas (logic pulse), the input XL4' being obtained by feeding the program control line corresponding to XL4 (FIG. 15) to the product diode in this logical circuit through an inverter I. Thus, the term XL4' is true in each operation block in which the transistor 150 corresponding to the operation block does not include program control line XL4, e.g., operation block XX–03–0. The prime of a program control signal is used instead of the program control signal itself (such as XL4' above) for those program control signals where the logical circuit controlled by the program control signal is to be made operative for a majority of the operation blocks. By such a choice, the program control line need be coupled only to those program control transistors corresponding to the smaller number of operation blocks where the logical circuit does not occur.

Finally, it will be understood from FIG. 23 and the preceding discussion of a typical storage circuit S/C S1 in connection with FIG. 28, that each of the storage circuits S/C L$a$1–18, like each of the other logical storage circuits in the data processor system, is set at the logical pulse Pas (FIG. 3$i$) in accordance with the logical potential level present at its logical input at the time of pulse Pas. It is important to note that changes in states of the storage circuits S/C L$a$1–18 can occur only at the time of logic pulse Pas (and clear pulse Pac, FIG. 3$h$), and further that the true states (low logical level voltage —3 v.) of any one of the storage circuits S/C L$a$1–18 is retained between logic pulses Pas (and clear pulse Pac) produced in successive system operating cycles by the logical input provided by the logical product networks having inputs L$a_{1-18}$ and low logical level timing control output Pac (the timing control output Pac provides a low level output between high level clear pulses Pac). Thus, a low logical level output L$a_1$, for example, resulting from storage circuit L$a$1 being placed in a true state providing a low level output L$a_1$ at the logic pulse Pas in system cycle #1 (FIG. 3$i$) and this state of L$a$1 is retained until the next clear pulse Pac (FIG. 3$h$) in the immediately succeeding system operating cycle #2.

Referring now to FIGS. 23 to 26 and FIGS. 27$a$ to 27$d$, operations within the four operation blocks XX–00–0, XX–01–0, XX–02–0, and XX–03–0 of FIG. 22 through which all single stage commands must be processed will now be described in detail in order to demonstrate the mechanization and operation of a typical portion of the data processing system in accordance with the invention. The particular combinations of logical circuits which are made operable by energization of the program control transistor for each operation block are represented by the logical equations accompanying each of FIGS. 23 to 26.

Referring now to FIG. 23 and FIGS. 27$a$ to 27$d$ along with FIG. 15, a detailed description of the first operation block XX–00–0, which is the first of the two operation blocks common to all commands, will now be presented. The function of operation block XX–00–0 is to permit the Control No. (which is the address of the first word in the command in the main memory which is to be accessed) to be looked up in the Control No. Register (one of the index registers 15) and set up in the read address L register (L$a$1–18) via the adder 11$a$. To initiate operation in operation block XX–00–0, the program counter and instruction register flip-flops (N1–11 in FIGS. 14$a$ and 14$b$) are set to select program control transistor 150$a$ (FIG. 15) corresponding to operation block XX–00–0, whereby a program control pulse 189 is produced on the collector thereof, causing control signals XG$a$1, XG$a$4, XL4, XL1, XF1, XE1, XE2, and XN1 (as shown in FIG. 15) to be produced on corresponding control lines to render operable the logical circuits associated with the adder, L register, A register, S register, N registers, and T registers in accordance with the logical equations shown in FIG. 23 for performance of operation block XX–00–0 in system cycle #1 (FIG. 3). This operation block provides a R–R scratch-pad memory cycle and no main memory cycle. In addition, this operation block provides logical inputs XE1, XE2, and XF1 for setting flip-flops E1, E2 (FIG. 38$b$) and F1 (FIG. 37) in their true state at the beginning of the next system cycle #2 for R–R and C–W memory cycles in the scratch-pad memory cycles (E$_1$ and E$_2$) in system cycle #2 for a long operation block XX–01–0 and also a R–R memory cycle in the main memory (F$_1$) in system cycle #2 for operation block XX–01–0.

It will be assumed that the Control No. which is to be looked up, is Control No. (40) corresponding to the first word of the command to be executed, which will be assumed to be the load command shown in FIG. 27$a$, having a first word (351) and a second word (150) as shown which have been stored at addresses (40) and (41), respectively, in the main memory. It will further be assumed that Control No. (40) has been previously stored in the Control No. Register by suitable means, such as a keyboard input, and that the read address A register (A$a$1–7) is set to the address (037) of the Control No. Register to access the Control No. (40). As indicated in the operation block XX–00–0 in FIG. 23 and the schematic representation thereof in FIG. 27$b$, the first operation in that block is a read-restore (R–R) scratch-pad memory cycle which provides for "reading out" the Control No. (40) from the Control No. Register in the scratch-pad memory into the read S register (S1–18) and restoring the Control No. (40) at the same address during the R–R memory cycle time interval of the system operating cycle #1 (FIG. 3) for operation block XX–00–0. For the details of operations such as "reading out" in a R–R scratch-pad auxiliary memory cycle, reference is made to the detailed description of FIGS. 2 and 5. Briefly, "reading out" of a memory register in the scratch-pad memory 13 (FIG. 1) includes a read-restore memory cycle therein; therefore, flip-flop E1 has been set in the preceding operating cycle to its true state to provide a low potential level output E$_1$ to the AND gate circuit 36 to pass read pulse R1 to the scratch-pad memory 13 for starting the R–R memory cycle therein. The storage circuits S/C S1–18 of the read S register are cleared each system cycle at the beginning thereof by clear pulse Pc which is prior to transfer of the Control No. to the read S register (S1–18). Having cleared the read S register, the scratch-pad memory outputs $a$s1–18 provide required logical inputs for storage circuits S/C S1–18 to store the Control No. in the read S register for system cycle #1 (FIG. 3). The outputs $a$s1–18 are of the different high and low logical levels (e.g., 0 v. and —3 v.) to provide useable logical signals for product networks having inputs $a$s1–18 (FIG. 38$a$). Thus, no special set and reset inputs for storage circuits S1–18 are required for the outputs $a$s1–18 of the scratch-pad memory in order to store the memory output (e.g., Control No. (40)).

Still considering operations in operation block XX–00–0 but now considering those operations necessary in preparation for the next system operating cycle, the address of the Control No. Register must be recirculated in the A registers for accessing the Control No. (40) to increment it by 2 to thereby provide the Control No. for the next command. The logical equations for recirculation of the address of the Control No. in the A registers are indicated under the heading "A registers" in FIG. 23. First, the storage circuits S/C A1–7 copy the read address from S/C A$a$1–7 at the time of pulse P$s$ when the outputs A$a_{1-7}$ are applied to the logical inputs $d$A1–7 by the networks for the product (A$a_{1-7}$P$s$) of the equation:

$$dA1\text{--}7 = Aa_{1-7}Ps + A_{1-7}Pc$$

The other product (A$_{1-7}$P$c$) provides for retaining the write address for the remainder of the operation block. Having stored the address in S/C A1–7, the address can be again copied into S/C A$a$1–3 and S/C A$a$4–7 by the networks from the products (A$_{1-4}$XA3′) P$as$ and (A$_{4-7}$XA4′)P$as$ of the logical equation:

$$dAa1\text{--}3 = A_{1-3}XA3'Pas + Aa_{1-3}Pac$$

and $$dAa4\text{--}7 = A_{4-7}XA4'Pas + Aa_{4-7}Pac$$

for these storage circuits. The networks provided for products (A$a_{1-3}$P$ac$) and (A$a_{4-7}$P$ac$) act to retain the read address for the remainder of the system cycle #1 and also for most of the next system cycle #2 to thereby make the read address available during the R–R memory cycle in system cycle #2 for operation block XX–01–0. The logical circuits for the storage circuit A$a$1–3 and A$a$4–7 in FIG. 34 are rendered operable by program control signals XA3′ and XA4′, respectively, which are true during block XX–00–0, since program control lines XA3 and XA4 are not coupled to the program control transistor 150$a$ corresponding to this operation block, as can be seen from FIG. 15.

The next logical equations which will be considered in FIG. 23 (operation block XX–00–0) are those listed under the heading "Adder" and represent the logic required to copy the Control No. (40) from the read S register (S1–18) into the read address L register (L$a$1–18) by way of the adder as shown in FIG. 27$b$. The logical input circuits for adder inputs G$a$1–4 and G$a$5–12 (FIGS. 1 and 32) are rendered operable by program control signals XG$a$1 and XG$a$4, respectively (both of which are true as can be seen from FIG. 15) for transferring the portion of Control No. (40) stored in storage circuits S/C S1–4 and S/C S5–12, respectively, through the adder 11$a$. Simultaneously, the logical input circuits for adder inputs J$a$13–18 are rendered operable by the program control signal XJ$a$1′ (which is true since sense line XJ$a$1 is not coupled to transistor 150$a$) for copying the remaining portion of Control No. (40) from storage circuits S/C S13–18 through the adder 11$a$.

In order to transfer information from the read S register through the adder, the other input logic to adder inputs F$a$1–12 must be zero. The output of the adder is coupled to the logical input circuits associated with the read address L register (L$a$1–18) (FIG. 33) to set the storage circuits S/C L$a$1–18 to the Control No. (40) when the logical pulse P$as$ occurs during system cycle #1 for the present operation block XX–00–0. The adder 11$a$ can be any of the well-known circuits for adding decimal coded binary digits. A description of one of many suitable adder circuits is the adder disclosed in commonly assigned copending U.S. patent application Ser. No. 100,735, filed Apr. 4, 1961, for Parallel coded digit adder, by Robert O. Gunderson and Tom T. Tang.

The logical equations for operation of the read address L registers (L$a$1–18) in block XX–00–0 to store the Control No. being transferred from the read S register (S1–18) via the adder are indicated under the heading "L registers" in FIG. 23. The logical circuits for storage circuits S/C L$a$1–18 are rendered operable by the program control signal XL1 (which is true as shown in FIG. 15 since this program control line is connected to the collector of transistor 150$a$) to complete copying of the Control No. (40) from the read S register (S$a$1–18) to the read address L register (L$a$1–18) through the adder. Note that the parity bit stored in S/C S19 is not transferred. As indicated by the equation:

$$dLa1\text{--}18 = Ja_{1-18}XL1Pas + La_{1-18}Pac$$

and the logical product network therefor shown in FIG. 33, the adder outputs J$a$1–18 provide signals J$a_{1-18}$ to the inputs of the respective logical networks associated with the storage circuits S/C L$a$1–18 of the read address L register to complete the copying of the Control No. into the L register for the purpose of reading out the first word of the present command from the main memory unit #1 in the system cycle. The binary configuration of Control No. (40) in the S and L registers is illustrated in FIG. 27$b$ along with a flow diagram of the transfer from the S register (S1–18) to the read address L register (S$a$1–18) via the adder.

The next operation required for performance of operation block XX–00–0 is the preparation for setting of the program counter flip-flops N1–4 to advance to the next operation block XX–01–0 in system cycle #2 (FIG. 3). It should be noted that flip-flops, including flip-flops N1–11 of the N register are set at the beginning of each system operating cycle in accordance with the logic and decisions made in the immediately preceding system cycle. Accordingly, the logical operations and decisions made in operation block XX–00–0 (system cycle #1) are effective to control the state of the flip-flops N1–11 at the very beginning of the following operation block XX–01–0 (system cycle #2) at the time of logic pulse P$f$ (FIG. 3$e$). The change in state of flip-flops N1–4 to provide the binary configuration 0001, required to advance to operation block XX–00–0, is produced at the beginning of operation block XX–00–0 as one of the first operations in system cycle #2 (FIG. 3) to provide the program control signals required for operation block XX–01–0 during system cycle #2, for example.

The logical equations required for setting the program counter flip-flop N1–4 are indicated under the heading "N registers." The pertinent equations for this operation involve the program counter flip-flops N1–4 and more particularly flip-flop N1. As indicated in the table shown in FIG. 17, the flip-flop N1 must be placed in its true state to provide the binary configuration 0001 in the program counter flip-flops N1–4. This is accomplished by the logical input for flip-flop N1, i.e., logical AND network (FIG. 35) having inputs K$s_1'$, K$s_2'$, K$s_3'$, XN1 for implementing the equation:

$$N1 = Ks_1'Ks_2'Ks_3'XN1 \quad \text{(FIG. 23)}$$

The program control signal XN1 renders operative this logical input networks to the flip-flop N1 having other inputs K$s_1'$ K$s_2'$ K$s_3'$, as shown in FIG. 35. The false states of decision drivers K$s$1, K$s$2 and K$s$3 (FIG. 36) indicate that the following operation block XX–01–0 will be performed in the following operating cycle #2. The data in the instruction register flip-flops N7–11 is recirculated as illustrated in FIG. 35 for flip-flops N7–10 by rendering the respective input logical circuits for recirculation operative by the program control signal XN34′, which is true since program control line XN34 is not coupled to transistor 150$a$ for operation block XX–00–0. The logical equations and logical input circuits for the flip-flop N11 have not been shown in FIGS. 23 and 35 since they are not necessary to an understanding of the exemplary operation being described herein. Also, it will be noted in the description to follow, whenever the operation of a storage circuit, flip-flop or driver is not necessarily involved in the exemplary operation for the selected operation blocks, the flip-flop or driver will not appear in FIGS. 32 to 40, and its equation will not appear in FIGS. 23 to 26. Further, logical networks shown enclosed by dashed lines are special illustrations of typical logical operations that do not occur in exemplary operation blocks shown in FIGS. 23 to 26 and therefore the equations are not shown in FIGS. 23 to 26.

Referring now to the logical decision operations of the processor in operation block XX–00–0, the logical decisions made in the first operation block provide the final determination of the next operation block to be performed. The false state of the drivers Ks1, Ks2 and Ks3 (outputs $Ks_1'$ $Ks_2'$ $Ks_3'$) provide the logical inputs to the program counter flip-flop N1 for the decision to proceed to the operation block XX–01–0. The driver Ks3, however, has been provided to override the decisions provided by the decision drivers Ks1 and Ks2. An output Ks3 therefore, will override outputs $Ks_1'$ $Ks_2'$ in the event a "skip" to the "rest" block XX–00–3 is warranted. The exemplary logical input circuit for the decision driver Ks3 is indicated in FIG. 36 and is shown to indicate a flip-flop KR0. Flip-flop KR0 is set, for example, by the "rest" button being depressed to provide a low logical potential (−8v.) which is coupled directly to a set input KR0 to provide a special flip-flop setting operation which does not require gating by the logic timing pulse Ps. At any instant therefor, that the rest button is depressed, the flip-flop KR0 is set. As a result, the processor advances to operation block XX–00–3 ("rest block") at the beginning of the very next system cycle. This operation is effective to stop the processor since the processor will remain in the "rest" operation block XX–00–3 until the "rest button" is reset and then the "compute" button is depressed. As shown in FIG. 36, the "compute" button is connected to ground and when depressed will override the other input $KR_0$ (low level when flip-flop KR0 is set) to provide the high logical level (ground) at the flip-flop input sKR0 which resets flip-flop KR0 in the false state to provide a high logical level signal at output $KR_0$ and a low logical level signal at output $Ks_3'$. As noted earlier, this low level output $Ks_3'$ is required for setting the flip-flop N1 to provide the configuration 0001 for "skip" or advance to operation block XX–01–0.

The driver Ks3 is a logical circuit having an output from the second state Ks3 when turned on by a low logical potential (−3v.) (true logical signal) at its input dKs3. The typical logical storage circuit shown in FIG. 28, without logical input networks 51c, 51d and 51e, is suitable for use for decision drivers Ks1, Ks2, Ks3 and other drivers such as Kw1. The processor is returned ("skip") to "reset" operation block XX–00–3 by placing both flip-flops N5–6 in the true state by the respective logical networks having input Ks3 as shown in FIG. 35 and as shown for the logical equations for flip-flops N5 and N6 in FIG. 23. The output Ks3 renders the respective logical input circuits for flip-flops N5 and N6 operative to "skip" to "rest" block XX–00–3 in the next operating cycle. When the compute button (FIG. 36) resets flip-flop KR0, the system returns to block XX–00–0 from the "rest" block XX–00–3 via operation block XX–01–3 as shown in FIG. 22. In the exemplary operation, the logical equations for decision in operation blocks XX–01–0, XX–02–0 and XX–03–0 (FIGS. 24–26) specify dKs3=0 to simplify the networks for flip-flops N1–4. It should be realized that in practice each of these networks would include in addition to other inputs, an input $Ks_3'$ to provide for "skip" to the rest block from these operation blocks.

Considering now the logical operations in operation block XX–00–0 for the T registers shown in FIGS. 39 and 40, the logical equations therefor are listed under the heading "T registers" in FIG. 23. The network shown in FIGS. 39 and 40 implement the equations to provide for the recirculation of the T registers, including the T register flip-flops T1–12, the TM register flip-flops TM1–3, and the T@ register flip-flops T@ 1–3, by rendering the respective logical input circuits operative by program control signals XT4', XT5', and XT6' for the T register; XTM1' for the TM register, and XT@1' for the T@ register. No logical operation of the TK register is provided for in operation block XX–00–0.

Referring now to logical operations involving certain special flip-flops for control of memory cycles; first, the special flip-flops F1, F2 and F3, as previously described, provide for R–R and C–W memory cycles respectively in the main memory 9 during system operating cycles. The logical equations for flip-flops F1, F2 and F3 are indicated in FIG. 23 under the heading "M registers." The logical equation:

$$sF1 = Ks_1'Ks_2'Ks_3'XF1$$

provides for setting the flip-flop F1 in its true state to provide a read-restore (R–R) main memory cycle in the next operation block (XX–01–0). The logical equations for the flip-flop F2 (FIG. 23) allow it to remain in its false state whereby no clear-write (C–W) main memory cycle will be performed in the next operation block XX–01–0. Since a read-restore (R–R) main memory cycle is indicated in operation block XX–01–0, flip-flop F1 only will be set true by the logical timing pulse Pf at the beginning of system operating cycle #2 (operation block XX–01–0) unless a decision is made to "skip" to the "rest" block (Ks3). The above equation for flip-flop F1 indicates that the logical network therefor, shown in FIG. 37, is rendered operable by the low level outputs $Ks_1'$ $Ks_2'$ $Ks_3'$ XF1. The program control signal XF1 is provided by program control line being connected to transistor 150a (FIG. 15). Since no logical network input to flip-flop F1 is provided for output Ks3, no main memory cycle will be performed in the event a "skip" is made to the "rest" operation block XX–00–3 by depressing the "rest" button.

The remaining memory cycle flip-flops are E1 and E2 which are provided for control of read-restore (R–R) and clear-write (C–W) memory cycle, respectively. The flip-flops E1 and E2 are controlled by logical input networks (FIG. 38b) implementing the logical equations shown under the heading "S registers" in FIG. 23. The flip-flops E1 and E2 provide control of cycles in the scratch-pad memory 13 in a similar manner as flip-flops F1 and F2 provide control of cycles in the main memory 9. Additional discussion of the operation of the special flip-flops F1 and F2 and E1 and E2 can be found in the description of the memories and timing control therefor in FIGS. 4, 5, 6a, 6b and 6c. Since both R–R and C–W memory cycles are provided in operation block XX–01–0, the flip-flops E1 and E2 will be set true by the logical input networks having inputs for implementing equations:

$$sE1 = Ks_1'Ks_2'Ks_3'XE1$$

and $$sE2 = Ks_1'Ks_2'Ks_3'XE2$$

respectively.

As shown by these equations for operation block XX–01–0, the logical networks therefor include program control signals XE1 adn XE2, respectively, which are provided by program control lines connected to the collector of transistor 150a (FIG. 15). In the event a decision is made to "skip" to the "rest" block, flip-flops E1 and E2 will be allowed to remain in their false states because driver Ks3 will be in a true state (Ks3) and the logical input networks for E1 and E2 each require driver Ks3 to be in a false state for low level output $Ks_3'$.

Thus, during operation block XX–00–0, Control No. (40) is read out and restored in the Control No. Register of the scratch-pad memory, is set up in the read S register (S1–18), and is then copied from the read S register (S1–18) into the read L register (La1–18) by way of the adder as shown in FIG. 27b, while at the same time the program counter (flip-flops N1–4 in FIG. 14b) is set to go to the next operation block XX–01–0. Thus, as shown in FIG. 27b, at the end of the first operation block XX–00–0, the L register (La1–18) is set to read-out and restore the contents of the memory cell at address (40)

in the main memory at which address the first word (35) of the command, word #1 (351) (FIG. 27a) is stored; and the logical operations required for the program counter have been performed in preparation for setting flip-flops N1–4 at the beginning of system cycle #2 to go to operation block XX–01–0 during operating cycle #2 (FIG. 3).

The second operation block, XX–01–0, as illustrated by logical equations in FIG. 24 and the diagram of FIG. 27c is performed during system cycle #2 (FIG. 3). This operation block XX–01–0 includes both main memory and scratch-pad memory cycles and, therefore, provides an operation block which is more illustrative of block operations of the present system. The memory cycles in operation block XX–01–0 are as folows:

(1) R–R main memory cycle,
(2) R–R scratch-pad memory cycle, and
(3) C–W scratch-pad memory cycle.

In operation block XX–01–0, therefore, three memory cycles are performed out of the four possible memory cycles. The memory cycle not being performed is the C–W main memory cycle.

Considering now the program control operation required in this operation block, a different program control transistor, namely 150b (FIG. 15), is now energized after decoding of flip-flops N1–4 in system cycle #2 (FIG. 3) causing a different set of logical circuits to be rendered operable as indicated by the corresponding set of equations below operation block XX–01–0 in FIG. 24. As shown in FIG. 15, program control lines 180 are connected to the collector of transistor 150b to provide program control signals XFa1, XL2———XL4, for the performance of operation block XX–01–0. The program control signals produced on these lines render operative the appropriate logical networks for performance of logical networks for performance of logical operations required in operation block XX–01–0.

In looking up the first word (351) of the command in the main memory at address (40) in the R–R main memory cycle, the contents of the cell at address (40), which address has been set up in the L register (La1–18) during the previous operation block XX–00–0, is "read out" into the M register storage circuits S/C M1–12 and restored in the cell at address 40, as shown in the functional flow block diagram of FIG. 27c corresponding to this operation block. The logical equations in FIG. 24 under the heading "M registers" are implemented by the logical networks shown in FIG. 37. From the following equation for operation block XX–01–0, namely:

$$dM1\text{-}12 = am1\text{-}12 + M_{1\text{-}12}Pc$$

it is seen that the outputs $am1\text{-}12$ provide the logical inputs for the M register storage circuits M1–12. In preparation therefor, the storage circuits M1–12 are cleared by pulse $Pc$ (system cycle #2, FIG. 3) and the retention of their states is provided by the product $M_{1\text{-}12}\,Pc$ which is implemented by the networks having inputs $Pc\ M_1\ldots Pc\ M_{12}$ as shown in FIG. 37.

is implemented by the networks having inputs $$Pc\ M_1\ \ldots\ Pc\ M_{12}$$

as shown in FIG. 37.

In order to provide a more complete understanding of the processing system operation, certain logical input networks have been included for storage circuits M$a$1–12 even though the logical operation blocks being discussed in FIGS. 23 to 26 do not include the logical operations included by their networks. These logical networks are shown in FIG. 37 for products of the following equations:

(1) $dMa1\text{-}6 = Pas(M_{1\text{-}6}XM2) + PacMa_{1\text{-}6}$
(2) $dMa7\text{-}12 = Pas(M_{7\text{-}12}XM10) + PacMa_{7\text{-}12}$ The networks implementing products $Pas\ (M_{1\text{-}6}\ XM2)$ and $Pas\ (M_{7\text{-}12}\ XM10)$ provide for transferring data stored in storage circuits M1–12 to storage circuits M$a$1–12 in order to write the data into the addressed cell location (L1–18) in a clear-write (C–W) main memory cycle. The transfer is provided at the time of logic pulse $Pas$ (FIG. 3i) and the data is retained in storage circuits M$a$1–12 by the networks implementing products $Pac$ $Ma_{1\text{-}6}$ and $Pac$ $Ma_{7\text{-}12}$ as shown in FIG. 37. As indicated, the program control signal XM2 and XM10 render respective groups of the logical networks operative for transfer from storage circuits M1–12 to M$a$1–12.

Referring again to FIG. 24 and logical operations actually performed in operation block, XX–01–0, only the logical operations necessary for copying the first word of the command from the M register storage circuits M1–12 into the T register flip-flops T1–12 and the actual setting of flip-flops T1–12 does not occur until the time of logic pulse $pf$ at the beginning of the next operation block XX–02–0. The logical circuits for copying into the T register (FIG. 39) are provided by input networks for the flip-flops T1–12 which are rendered operable by the program control signal XT7. The logical equation for these networks is shown in FIG. 24 under the heading T registers as follows:

$$sT1\text{-}12 = M_{1\text{-}12}XT7$$

The T register provides temporary storage for the first word of the command for later use in logical operations in subsequent operation blocks.

Also, in operation block XX–01–0, only logical operations are performed for copying the command code (C) (FIG. 27a) from storage circuits M1–4 into flip-flops N7–10 and the actual setting of flip-flops N7–10 does not occur until the beginning of the next operation block XX–02–0 at the time of logic pulse P$f$ (FIG. 3e). The command code (C) comprises the last four bits of the first word (351) of the command and is stored in storage circuits M1–4 of the M register. According to the exemplary operation, the load command is to be performed. The words of the load command are illustrated in FIG. 27a and as shown this load command has the command code (C) of binary configuration 0001, in accordance with the table for commands in FIG. 16. As indicated by the logical equation:

$$sN7\text{-}10 = M_{1\text{-}4}XN32$$

in FIG. 24, under the heading N Registers, the program control signal XN32 is provided in logical operations block XX–01–0 to make the resceptive input networks therefor operative to transfer M1–4 to N7–10 at the next logical pulse P$f$ (operation block XX–02–0). Accordingly, flip-flops N7–10 in the instruction register are set to the configuration of storage circuits S/C M1–4 in the M register for the load command at the beginning of operation block XX–02–0 in response to logical operations performed in operation M1–4 will be checked for a possible "skip" to nection with the discussion of the decision logic in this operation block, the command code (C) stored in storage circuits M1–4 will be checked for a possible "skip" to operation block XX–00–1 in the event the command code specifies the command to be one of the double stage commands.

In preparation for a R–R main memory cycle in the next operation block, the address copied into the L register (L1–18) from L register (La1–18) at the time of pulse P$s$ (FIG. 3g) is modified by adding one by means of "count up" logic that is provided by input networks to storage circuits S/C La1–18 to produce the modified read address in S/C La1–18 a the time of logic pulse Pas (FIG. 3i). These networks for storage circuits S/C La1–18 implement the logical equation:

$$dLa1\text{-}18 = L_{1\text{-}18}\ \text{(count up)}\ XL2Pas$$

which is shown in FIG. 24 under the heading "L Registers." The second word (150) of the command (FIG. 27a) is located in the memory cell at address (41) immediately following the memory cell at address (40) containing the first word (351) of the command. As before, adding one to the address copied into the read L register (L1–18), therefor, will provide the address of the second word of the command for "read out" the second word of the command in the R–R main memory cycle to be performed in the next operation block XX–02–0. As indicated by the logical equation, the program control signal XL2 renders the logical input networks of the respective storage circuits L$a$1–18 operative to "count up" one incrementing the address stored in the storage circuits S/C L1–18 of the L register by one. This program control signal is supplied by program control line XL2 connected to transistor 150$b$ (FIG. 15).

The next logical operations to be considered for operations block XX–01–0 pertain to use of the scratch-pad memory for producing a new Control No. for providing access to the command to be executed after the present load command has been performed. The commands in a routine are generally stored at addresses of the main memory so that merely by updating the Control No. by two in the adder, the address of the next command can be conveniently obtained. If a double stage command is to be executed which includes four words, the Control No. is incremented by an additional two during operation block XX–03–1 (FIG. 22) for double stage commands only.

For the present single stage load command, therefore, the processor: (1) provides (system cycle #2 (FIG. 3)) a R–R scratch-pad memory cycle to read-out the old Control No. into the read S register, (2) adds two to the Control No. in the read S register (S1–18), and (3) places the results (new Control No.) in the write S register (S$a$1–18). In the same system cycle #2, the new Control No. is "written" into the Control No. register by a C–W scratch-pad memory cycle. This updates the Control No. for the next command which follows the present single stage load command. As shown in FIG. 24 (S register) the logical equation for "reading out" the old Control No. into the read S register (S1–18) and storing therein is as follows:

$$dS1\text{–}18 = as1\text{–}18 + S_{1\text{–}18}Pc$$

The networks for this operation are shown in FIG. 38$a$. The logical equations for adding two to the old Control No. and placing the results (new Control No.) in the write S register (S$a$1–18) are shown in FIG. 24 under the headings "Adder" and "S Registers," respectively. The logical networks for implementing the adder equations are shown in FIG. 32 wherein program control signals XF$a$1, XG$a$1, XG$a$4, and XJ$a$1' render operable the logical circuits to which these program control signals are fed in this operation block XX–01–0. The program control signal XF$a$1 at adder input $dF a2$ provides for the addition of two to the Control No. provided at adder inputs $dG a1\text{–}12$ and $dJ a13\text{–}18$. The logical networks for implementing the logical equations for the write S register (S$a$1–18) are shown in FIG. 38$a$. The networks are made operative by the program control signals XS8, XS3, and XS4 in this operation block XX–01–0 at the time of logic pulse P$as$ (FIG. 3$i$). In the operation of the scratch-pad memory through R–R and C–W memory cycles for the previously discusssed updating of the Control No.; the address of the Control No. (037) was recirculated in the A registers (A1-7, A$a$1–7) for "reading out" the old Control No. and "writing" the new Control No. Also, the new address (RX) for the index register (in the scratch-pad memory at address RX) is transferred from the M register (M8–12 only) to prepare for the next operations block in which the contents of the index register are read out in a R–R memory cycle. The logical equations for these operations in operation block XX–01–0 are set forth in FIG. 24 under the heading "A registers." Thus, logical equation:

$$dA1\text{–}7 = A a_{1-7}Ps + A_{1-7}Pc$$

provides for recirculation of the address (037) from the read address A register (A$a$1–7) to the write address A register for writing in the C–W memory cycle in system operating cycle #2 (FIG. 3). The other remaining logical equations for inputs to storage circuits A$a$1–5 provide for transfer of the address (RX) of the index register from the M register (M8–12 only) to the A register (A$a$1–5 only) as shown in FIG. 27$c$. The logical networks for implementing these equations are shown in FIG. 34.

The foregoing discussion of the A registers discloses the manner in which the logical operations of block XX–01–0 prepares for the next operation block XX–02–0. The RX portion of the command (FIG. 27$a$) provides the address of one of the index registers 15 (FIG. 1) containing the base number which is used for forming the address of the operand in the main memory 9, in accordance with the method of relative addressing described previously. The program control signals XA10 and XA18 render these logical circuits operable to cause the first five bits (RX—00110) of the command to be set up in the storage circuits A$a$1–5 of the A register at the logical pulse P$as$, as illustrated by the flow diagram in FIG. 21$c$. It should be noted, however, that the address (RX) is stored in the read address A register (A$a$1–5), and therefore it is not effective during the write time interval (during write pulse W1, FIG. 3$i$) of the present operating cycle so as not to interfere with the writing of the new Control No. (42) into the Control No. Register. Instead the address of the Control No. register (037) which is retained by write A register (A1–7) is used for writing the new Control No. (42) into the Control No. Register.

Referring back briefly to review the decision portion of the operations in block XX–00–0, it will be noted that the decision driver K$s$3 provided for a "skip" from operation block XX–00–0 to the "rest" block XX–00–3, whereas the outputs K$s_1'$ K$s_2'$ K$s_3'$ of drivers K$s$1, K$s$2, and K$s$3 set the program counter to energize, during the next operating cycle, the transistor 150$b$ corresponding to the present operation block XX–01–0. In operation block XX–01–0 decisions are also required and, as shown in FIG. 24, the decision logic for block XX–01–0 is more involved in that decision logic is provided for alternate "skips" to operation blocks XX–03–0 or XX–00–1 in addition to proceeding to the next operation block XX–03–0.

In FIG. 24, the decision logic is stated by the equations for decision drivers K$s$1 and K$s$2 under the heading "Decision." As set forth in operation block XX–01–0 shown in FIG. 24, "program counter set: (1) block XX–00–1 of (K$s_1$ K$s_2$) . . ." the program counter is set to go to block XX–00–1 if both drivers K$s$1 and K$s$2 are in their true state (turned on) for the processing of a double stage command. Both drivers K$s$1 and K$s$2 are true to provide outputs K$s_1$ K$s_2$ if either product $M_1 M_2 M_3 M_4$ XK$s$1 or $M_1' M_2' M_3' M_4'$ XK$s$1 is true as indicated by the logical equation in FIG. 24 under the heading "Decision." The storage circuits M1–4, in addition to storing the complete command code for individual single stage commands, also provide the indication for a double stage command, and XK$s$1 is the program control signal coupled to logical circuits of drivers K$s$1 and K$s$2 from transistor 150$b$ (FIG. 15) in this operation block XX–01–0. The particular double stage command is determined by the states of storage circuits M5–7 and M1–4 wherein the true or false states of storage circuits M1–4 determine the group of double stage commands. The logical circuits and equations are not involved in the operations for single stage commands (e.g., load command described herein) and, therefore, have not been shown. The logical circuits for drivers K$s$1 and K$s$2 along with the logical equations therefor, are shown in FIG. 36, and include implementation of the products in the equation whereby if a command code (C) has a configuration such that the binary bits are all zeroes or ones, provides for turning on both drivers K$s$1 and K$s$2 to provide a decision to "skip" to operation block XX–00–1 in the next operating cycle #3. The decision is made available at the time of logical pulse P$f$ at the beginning of operating cycle #3 whereby the program counter flip-flop N5 will be set to the true state to provide the binary configuration for the first operation block XX–00–1 for double stage commands as indicated in the table in FIG. 14.

The second possible skip from block XX–01–0 is to block XX–03–0 as indicated in FIG. 24 which would occur in the event that immediate addressing is involved where the second word of the command is the operand and not just the relative address. This decision is controlled by the driver K$s$2 which is turned on to provide the output K$s_2$ if the product $M_9 M_{10} M_{11} M_{12}$ XK$s$4 is satisfied in the logical input circuit for K$s$2 including those terms as shown in FIG. 36. Since the first word of the command is stored in the M register (M1–12) in operation block XX–01–0, storage circuits M9–12 contain the first four bits (R portion) of the first word of the command as illustrated in FIG. 27a. No logical circuit is provided for the driver K$s$1 for this latter product as shown in FIG. 36; therefore, the driver K$s$1 will not be turned on by this product and its output will be K$s_1'$. Thus, the decision driver outputs for the "skip" to operation block XX–03–0 is: K$s_1'$ K$s_2$. In FIG. 24, under the heading "N registers," these terms are shown in the products of the logical equations for flip-flops N1 and N2. The product for flip-flop N1 includes the program control signal XN13 and at the logical pulse P$f$ (at the beginning of the next system cycle #3) the flip-flop N1 will be triggered into its true state along with flip-flop N2 provided with the program control signal XN14. The state of the program counter after the logical pulse P$f$ (system cycle #3), with flip-flops N1 and N2 true, corresponds to operation block XX–03–0, as indicated in the table in FIG. 18. The logical circuits for implementing the equations of the program counter for triggering the flip-flops N1 and N2 are, as shown in FIG. 35, connected to the logical inputs $s$N1 and $s$N2 of flip-flops N1 and N2, respectively.

From the foregoing, it is evident that the decision drivers K$s$1, K$s$2, and K$s$3 provide logical outputs during each operating cycle which will affect the choice of the operation block to be performed during the next operating cycle. The particular column from which the next active transistor in the array 153 (FIG. 14a) is to be chosen is determined by the configuration of the N5 and N6 flip-flips; in a similar manner, by operationally comparable circuits and equations, the N1–4 flip-flops (FIG. 14b) determine the row in which the next transistor in array 153 is located. It is also evident that after the logic time period in any system cycle and before the next logical pulse P$f$, the program counter setting depends upon the states of the decision drivers K$s$1, K$s$2, and K$s$3. Further, as illustrated by input network to decision driver K$s$1 for operation block 23–05, the decision circuits depend upon decision logic performed after the other logic (e.g., adder) has been completed. The reason is that an intermediate decision driver output KJ$_1$ is capable of controlling the decision to return to operation block XX–00–0 from operation block 23–05 (see FIG. 22). The adder inputs to driver KJ1 are shown in FIG. 39a. Thus, the setting of flip-flops N1–11 is dependent upon the decision logic and cannot be set until after the decision logic is completed (see FIG. 3).

Thus, as indicated in FIG. 24 and represented in FIG. 27c, it will be understood that as a result of the operations performed in operation block XX–01–0, word #1 (351) of the command (FIG. 27a) has been "read out" from the cell at address (40) of the main memory into the read M register (M1–12); then, the entire word (351) in thet M register will be copied into the T register in system cycle #3 for use during subsequent operating cycles, the (RX) portion (00110) of word (351) in storage circuits M8–12 has been copied into storage circuits A$a$1–5 of the read address A register (in the order 00011) for setting up the address of the base number in the index register 15, and the command code (C) portion (0001) of word (351) in storage circuits M1–4 will be copied into flip-flops N7–10 of the instruction register in system cycle #3 to set up the load command code configuration as shown by the table in FIG. 18. Also, as indicated in FIG. 24, the read address L register (L$a$1–18) is increased by one from address (40) to address (41) so as to permit word #2 (150) of the command at address (41) in the main memory to be accessed during the next operating cycle; and the new Control No. in the write S register (S$a$71–18) has been increased by two from (40) to (42) to provide the address of the next command which is at address (42) in the main memory, and which is to be performed after the present command (FIG. 27a) has been executed. In addition, since the load command shown in FIG. 27a is a single stage command and relative addressing is indicated by the (R) portion of the first word (351) now in storage circuits M1–4, K$s_1$ and K$s_2$ will both be false (i.e., the product K$s_1'$ K$s_2'$ is true) and the program counter will be set to operation block XX–02–0 at the beginning of the next system operating cycle #3.

During the next system operation cycle #3, therefore, program control transistor 150c (FIG. 15) corresponding to operation block XX–02–0 will be energized rendering operative a third set of logical circuits, as indicated by the set of logical equations below block XX–02–0 in FIG. 25 in order to perform the logical operations for operation block XX–02–0.

As indicated in FIG. 25 and represented in the flow diagram of FIG. 27d, operation in block XX–02–0 is such that the base number (5,000) at address (RX) in the index registers 15 is "read out" of the scratch-pad memory and stored into the read S register (S1–18), while at the same time word #2 of the command at address (41) in the main memory is "read out" of the main memory and stored in the read M register (M1–12); then, the address (5,150) of the first word of the field in the main memory containing the operand is obtained by supplying word #2 (150) (which is the relative address) now in the M register (M1–12) to the adder along with the base number (5,000) now in the S register (S1–18), where the two are added and the sum (5,150) put into the read L register (L$a$1–18), which sum represents the read address of the first word of the operand. Also, during operation block XX–02–0, the field length (F) of the command (word #1) (FIG. 27a), which represents the number of words of the operand, i.e., the number of words in the field containing the operand, and which was previously read out of the main memory and stored in storage circuits M5–7 of the M-register and then copied into flip-flops T5–7 of the T register during the previous operation block XX–01–0, is now copied from flip-flops T5–7 into flip-flops TM1–3 of the TM register for use in subsequent operation blocks for indicating the length of the field. The actual number of words in a field is (F) plus one. While the above operations are taking place in operation block XX–02–0, the logic necessary to set program counter is performed to go to block XX–03–0, the last of the four operation blocks XX–00–0 to XX–03–0 which are common to all single stage commands.

At the beginning of operation block XX–03–0, the flip-flops N1–4 are set and outputs N$_{1-4}$ decoded in order to energize transistor 150d in (FIG. 15) causing a fourth set of logical circuits to be rendered operable as indicated by the set of logical equations below operation block XX–03–0 in FIG. 25. During this operation block, XX–03–0, there is no scratch-pad memory cycle or main cycle. The only logical operations that occur are: the field length (F) is transferred from flip-flops TM1–3 of the TM register into flip-flops TK1–3 of the TK register, the address (5,150) in the L register (which is the address of the first word of the field in the main memory containing the operand) is copied into the S register, and the logic necessary to set the program counter is performed to go to operation block 01–04 corresponding to the load command as shown in FIG. 22.

The function of the load command is to put a particular operand from the main memory 9 into the accumulator 17 of the scratch-pad memory 13 shown in FIG. 1. (The operand could also be obtained from the second word of the command (word #2 in FIG. 15) if implicit addressing is involved.) In accordance with the load command shown in FIG. 27a, the operand to be put into the accumulator 17 has its first word at address (5,150) in the main memory, which address has been set up in the read L register (L$a$1–18) and S register (S1–18) as a result of processing through the four operation blocks XX–00–0 to XX–03–0 as just described. It will be assumed that the operand has six words ($(F)+1$ where $(F)=5$), for example, 000,000,000,003,256,154 wherein the cell at address (5,150) in the main memory contains the first word 000. The complete six words of the operand are contained in cells at addresses (5,150) to (5,155) in main memory unit #1 as shown by the following illustration:

| Addresses | Cell contents | |
|---|---|---|
| | Decimal | Binary |
| 5150 | 000 | 0000 0000 0000 |
| 5151 | 000 | 0000 0000 0000 |
| 5152 | 000 | 0000 0000 0000 |
| 5153 | 003 | 0000 0000 0011 |
| 5154 | 256 | 0010 0101 0110 |
| 5155 | 154 | 0001 0101 0100 |

In each cell a decimal digit is represented by four bits as indicated above wherein the maximum length of a cell is three decimal digits or twelve bits which constitute one word. As noted, the least significant word of the operand (154) is located in the highest order address of the memory field (5,155). If the operand is a negative number, the minus sign is always located in the lowest order address (5,150) of the main memory field and in the most significant (left) digit position. As mentioned earlier, the binary configuration for the minus sign is 1111.

It will be remembered that in the last operation block XX–03–0 of the four operation blocks XX–00–0 to XX–03–0 which are common to most single stage commands, the address (5,150) of the first word of the operand in the L register (S1–18) was copied into the S register (S$a$1–18), the field length ($F=5$) indicating a six word memory field ($5+1=6$) was prepared for transfer from flip-flops TM1–3 of the TM register to flip-flops TK1–3 of the TK register, and the logical operations necessary to set program counter flip-flops were performed to go to operation block 01–04 corresponding to the load command, the command code ($C=0001$) having been copied from the M register into the instruction register at the beginning of block XX–02–0.

In operation block 01–04, the first word of the operand at address (5,150) in the main memory is "read out" of the main memory and stored in the read M register (M1–12) where storage circuits S/C M9–12 are examined to determine if the operand is positive or negative. If the storage circuits S/C M9–12 are all set (1111), the operand is negative. The accumulator sign flip-flop K@ (FIG. 1) stores the sign of the operand (instead of storing the sign in the accumulator 17). Also in block 01–04, the address (5,150), which was copied into the write S register (S$a$1–18) during the previous operation block XX–03–0, is transferred to storage circuits S/C S1–18 and then added to the field length ($F=5$) and the sum (5,155) is stored in the write S register (S$a$1–18) at the logical pulse P$as$ to provide the address (5,155) of the word having the least significant digits (154) of the operand. Also in operation block 01–04, the address in the read address A register (A$a$1–7) is changed to the least significant address in the accumulator 17, for example (117), where the accumulator addresses range from 110 to 117. Also the number 7, corresponding to the last cell (117) in the accumulator, is stored in flip-flops T1–4 of the T register at the beginning of the following cycle for keeping a tally of the particular cell being addressed in the accumulator by the read A register (A$a$1–7). And, like other operation blocks previously described, operation block 01–04 includes logical operations whereby the program counter is prepared to go to the next operation block, which is 01–05 for the load command, as shown in FIG. 22.

12.3 Operation blocks for the load command

Having discussed the operation blocks common to all single stage commands, the operation blocks of exemplary single stage command, i.e., "load" command will now be considered. Operation block 01–05 is the first operation block which is individual to the "load" command. In block 01–05, each word of the operand, starting with the last word, is in turn "read out" of the main memory and stored in the read M register (M1–12) during successive system operating cycles and fed to the accumulator 17, word by word via the adder 11$a$ and the write S register (S$a$1–18). In transferring words through the adder in this manner where no addition is required, zero is added to the word being transferred. Operation block 01–05 will thus be repeated in subsequent operating cycles until the entire six word operand (154), (256), (003), (000), (000), and (000) is exhausted. The words (154), (256), (003), (000), (000), (000) transferred into cells (117), (116), (115), (114), (113), and (112), respectively, of the accumulator in six system operating cycles, each operating cycle including both a main memory cycle and a scratch-pad memory cycle in order to provide for one word of the operand to be transferred to an accumulator cell for each system operating cycle. However, if a binary (1111) were present in the first word of the operand, it would be ignored and (0000) inserted instead. In the exemplary operand being considered herein, no minus sign is involved. In order to transfer from and store into the proper cells in the main memory and scratch-pad memory, respectively, the read address A and L registers (A$a$1–7 and L$a$1–7) will each count down one (from the number stored in A1–7 and L1–18, respectively) during each operating cycle. The contents of the accumulator 17 after the complete transfer are shown in the following illustration:

ACCUMULATOR

| Address in accumulator | Cell contents (decimal) | Accumulator Cell contents (binary) |
|---|---|---|
| 110 | | |
| 111 | | |
| 112 | 000 | 0000 0000 0000 |
| 113 | 000 | 0000 0000 0000 |
| 114 | 000 | 0000 0000 0000 |
| 115 | 003 | 0000 0000 0011 |
| 116 | 256 | 0010 0101 0111 |
| 117 | 154 | 0001 0101 0100 |

Another operation involved in operation block 01–05 is to decrement by one the flip-flops TK1–3 of the TK register, which stores the field length (5), in each operating cycle involving the transfer of a word containing a significant digit. Operation block 01–05 is repeated during successive operating cycles until TK is 0 at which time the entire six word operand has been transferred to the accumulator as illustrated above. When TK is equal to 0, K$s$1 and K$s$2 will be false (K$s_1'$ K$s_2'$) and the program counter flip-flops N1–4 are set for block 01–06 in the following operating cycle.

Also, during each of the operating cycles in block 01–05, the output of the adder is checked to determine if a word contained a significant digit. If the adder output contains a significant digit, the A register storage circuits A1–3, are copied into the T register flip-flops T1–4; if not, the address contained in flip-flops A1–3 is not copied into flip-flops T1–4. Thus, at the end of the six operating cycles for which block 01–05 is repeated, the T register flip-flops T1–4 will contain the address in the accumulator (115) of the most significant word of the operand, and thereby indicate the effective length in the accumulator of the significant words of the operand. In the above example being considered, the words of the operand containing the digits 154, 256, and 003 are the significant digits; therefore, the length of the significant digits in the accumulator is three words. The last word of the operand which would contain the minus sign, if any, is checked and if the digits in the word, other than the minus sign, are 0, the word will be considered not to contain a significant digit. This check is provided when the first word of the operand is being addressed and TK1–3 is set to 0.

In the next and last operation block 01–06 of the "load" command, which occurs after the complete operand has been placed in the accumulator, the address in the accumulator of the most significant word of the operand is stored in the T@ register for use during the next command which is readied in block 01–06 by the dicision to set the program counter to go to the first block XX–00–0 at the beginning of the following system cycle.

Thus, it has been illustrated how execution of the load command shown in FIG. 27a, by processing in operation blocks XX–00–0 to XX–03–0 and 01–04 to 01–06 of FIG. 22, as just described, causes the six-word operand 000,000,000,003,256,154 located at addresses (5,150) to (5,155) in the main memory to be loaded into the accumulator at addresses 112 to 117, respectively; also, it will be remembered that the decision has been that the program counter be set to return to opration block XX–00–0 in readiness for the next command whose address is now the updated Control No. 42.

12.4 Operation of the S register and other registers as address registers for the main memory In order to very briefly demonstrate the operation of addressing cells in the main memory 9 (FIG. 1) by use of the write S register (S1–18), it will be assumed that the next command is the "move" command which is a double stage command. This command is illustrated by the flow diagram in FIG. 22 to include operation blocks 23–04 to 23–16. The function of the move command is to change the location of a series of words of data stored in a first series of cells in the main memory 9 to a new location of a second series of cells in the main memory. For example, two addresses are provided in the command, a first address ($RX+A$) which specifies by relative addressing, the location (address) of the first word to be transferred to the new location (address) $JY+B$. Assuming that the address is the most significant word ($Q=0$) and the number of words to be moved is specified by the number that has been stored in the tally register T@, the actual transfer can now be provided by "sticking" in operation block 23–16 until all of the specified number of words have been transferred from the old location in main memory to the new location in the main memory.

The logical operations performed each time the operation block 23–16 is repeated for each word to be transferred is as follows: (1) read-out the first word into the read M register (M1–12) in a R–R main memory cycle at the word #1 address (old location) specified by read address L register (L$a$1–18), (2) write-back word #1 from the M register (M$a$1–12) into the main memory in a C–W memory cycle at the address (new location) specified by the S register (S1–18), now operating as a write address register for the main memory, (3) during the logic time, increase word #1 address (old location) in the L register (L1–18) by one by count-up logic (FIG. 33) to provide the read address (old location) for word #2 in the L register (L$a$1–18), (4) increase the word #1 address (new location) in the S register (S1–18) by one by adding one thereto in the adder to provide the write address (new location) for word #2 in the S register (S$a$1–18). The processing system is capable of performing the foregoing logical operations and thereby transferring one word during each operation block 23–16 because the S register (S1–18) was capable of being used as a write address register. In the absence of this feature (S register capability of acting as an address register), two different operation blocks (and system cycles) would be required for each word to be transferred from the old location to the new location because of the added requirement that the old location addresses and new location addresses be transferred between the L and S registers in order to address the main memory. Thus, only one-half of the number of system cycles is required for each word of a number of words to be moved in the main memory by enabling this S register (S1–18) to provide the address for writing the word stored in the M register (M$a$1–12). Similar additional advantages are provided in other commands by the provision of this feature. In the last move operation block 23–16, the decision is made to return to operation block XX–00–0 to begin processing the next command after the last word of the series has been transferred to the new location in the main memory. Thereafter, operation continues in this self-sequencing manner until the entire operation for which the data processing system has been programmed is completed.

In the data processing system as disclosed herein, it was shown wherein the S register (S1–18) is used as the write address register in execution of the move command. In a similar manner, other registers can be provided for use as address registers where large amount of use in the execution of the commands warrants the additional logical circuits required. For example, it has been found that a modified (live) Control No. Register comprising eighteen storage circuits including logical inputs therefore and similar in construction to storage circuits L$a$1–18 would permit elimination of operation block XX–00–0. In use, this modified Control No. Register would store the Control No. and would also provide the read address directly to the main memory during operation block XX–01–0. This can be readily understood in view of the fact that the only logical operations required in operation block XX–00–0 are to read-out the Control No. from the scratch-pad memory and then place the Control No. in the read address L register (L$a$1–18) in order to read out the first word (word #1) of the command to be executed. Thus, instead of "reading-out" the Control No. from cells in the scratch-pad memory into the S register (S1–18) by a R–R memory cycle and then transferring the Control No. to the L register (L$a$1–18) the outputs of the modified Control No. Register would be gated to drivers L$d$1–18 in a manner similar to the gating of the S register outputs ($S_{1-18}$) to drivers L$d$1–18. Thus, a flip-flop output $F_4$ (not shown) and similar to $F_3$ and the read pulse R1 would gate the outputs of the storage circuits of the modified Control No. Register to the drivers L$d$1–18, respectively, during operation block XX–01–0 instead of gating outputs L$a_{1-18}$ to drivers L$d$1–18. Thus, the logical operations specified for the L registers in operation block XX–01–0 would be provided by the Control No. Register and consequently the present operation block XX–00–0 would be eliminated and operation blocks XX–01–0, XX–02–0 and XX–03–0 would be programmed as operation blocks XX–00–0, XX–01–0 and XX–02–0.

From the foregoing description of typical data processing operations and the exemplary mechanization and Boolean equations applicable thereto, it should now be apparent to those skilled in the art how the data processing system in accordance with the invention may advantageously be constructed for use with a high speed thin-film memory while having the capability of operating in a self-sequencing manner to provide for a wide variety of data processing operations at higher speeds than heretofore possible; and in addition, a data processing system which requires a minimum of circuits and complexity in view of the data handling capacity and versatility of operation as achieved by means of the present invention.

It will also be apparent to those skilled in the art that many modifications and variations may be made, both in the structure and operation of the exemplary embodiments presented herein, without departing from the spirit of the invention. Therefore, the present invention is not to be considered as limited to the embodiments presented herein, but is to be considered as including all possible modifications and variations thereof coming within the scope of the invention as defined in the appended claims.

What is claimed is:

1. A data processing system for performing logical operations upon data in successive system operating cycles comprising: a data processor including logical circuit means and electronic storage means for performing logical operations in successive system operating cycles to process the data supplied thereto and storing the processed data in said storage means; magnetic memory storage means including individually addressable storage locations for storing data, said memory storage means being constructed and arranged to operate during a read-restore memory cycle to access and transfer data from any addressed storage location therein to said electronic storage means for performing logical operations upon the data transferred thereto and to restore said data to the same addressed storage location and being constructed and arranged to operate during a clear-write cycle to clear data from any addressed storage location and transfer processed data from said electronic storage means to the cleared storage location; system timing means including clock pulse forming circuit means for forming clock pulses to initiate system operating cycles periodically for operation of the system at different operating rates and timing pulse circuit means coupled to said clock pulse forming circuit means, said timing pulse circuit means being constructed and arranged to produce timing pulses for timing the logical operations and initiating memory cycles during system operating cycles and to control the time duration of the system cycles by regulating the clock pulse forming circuit means to provide different time intervals between clock pulses for system operating cycles of different time durations including a basic system cycle terminating after a short time period required for a read-restore memory cycle and logical operations on the data accessed from the memory and stored in the electronic storage means, and a long system cycle terminating after an additional time period required for a clear-write memory cycle for storing processed data in said long system cycle; program control circuit means producing program control signals at the beginning of the system operating cycles and coupling said program control signals to said logical circuit means for controlling the performance of logical operations in the processing of data in the system operating cycles and controlling the operation of said system timing means to provide any desired operating rate of the system for processing data including controlling said timing pulse circuit means to provide both said basic and long system operating cycles as required in the processing of said data.

2. A data processing system for performing logical operations upon data in successive system operating cycles comprising: a data processor comprising logical circuit means including electronic storage means for performing logical operations in successive system operating cycles to process the data supplied thereto and storing the processed data in said storage means, a magnetic memory comprising a plurality of individually addressable storage locations for storing data, said magnetic memory being constructed and arranged to operate during a read-restore memory cycle to access and transfer said data from any addressed storage location therein to said electronic storage means and restore said data to the same addressed storage location and being constructed and arranged to operate during a clear-write memory cycle to clear data from any addressed storage location and transfer processed data from said electronic storage means to the cleared storage location; system timing means including clock pulse forming circuit means for forming clock pulses to initiate system operating cycles periodically for operation of the system at different operating rates and timing pulse circuit means coupled to said clock pulse forming circuit means, said timing pulse circuit means being constructed and arranged to produce timing pulses for timing the data processor including logical operations and initiating memory cycles during system operating cycles and to control the time duration of the system cycles by inhibiting the formation of clock pulses by the clock pulse forming circuit means during system operating cycles to provide different time intervals between clock pulses for system operating cycles of different time durations including inhibiting the formation of clock pulses during a basic system cycle terminating after a short time period required for a read-restore memory cycle and logical operations on the data accessed from the memory and stored in the electronic storage means, and inhibiting the formation of clock pulses during a long system cycle terminating after an additional time period required for a clear-write memory cycle for storing processed data in the long system cycle; said data processor further including control circuit means for producing program control signals at the beginning of the system operating cycles and coupling said program control signals to said logical circuit means for controlling the performance of logical operations in the processing of data in the system operating cycles and coupling said control signals to the system timing means for controlling the operation thereof to provide any desired operating rate of the system for processing data including coupling a program control signal to said timing pulse circuit means for controlling said timing pulse circuit means to provide basic and long system cycles in successive system cycles.

3. The data processing system according to claim 2 in which said timing means further includes a holdover circuit having an input coupled to said control circuit means for receiving a control signal and an output coupled to said clock pulse forming circuit means, said holdover circuit being constructed and arranged to produce a holdover output signal of a predetermined time duration in response to a predetermined control signal applied to its input and said clock pulse forming means being responsive to said holdover output signal to inhibit the formation of a clock pulse and the initiation of operating cycle whereby the system operating rate is determined by time duration of the holdover output signal and the time duration of the system operating cycles.

4. The data processing system according to claim 2 in which said timing means further includes a plurality of system operating rate control means for operating said system at predetermined operating rates of peripheral units, at least one signal source producing timing signals at the operating rates of said peripherals, each operating rate control means having inputs coupled to said control circuit means for receiving a control signal and coupled to said signal source for receiving timing signals produced at the desired operating rate of the respective one of said peripheral units, an output for said operating rate control means coupled to said clock pulse forming means, any one of said system operating rate control circuit means being responsive to a timing signal from said signal source and control signal applied to its respective inputs to produce an output signal of predetermined time duration according to the operating rate of the respective peripheral unit, said pulse forming circuit means being responsive to said output signal to inhibit the clock pulse forming means to provide system operation cycles at the operating rate of the respective peripheral unit.

5. In a data processing system, the combination comprising: logical circuit means for processing data by performing logical operations on information in successive system operating cycles including basic system operating cycles and long system operating cycles; a memory including data storage means providing individual access to word locations for individually reading any one word of data stored therein or storing a new word of data in a single memory cycle; timing means comprising clock pulse forming means having an input and an output providing periodic clock pulses having an adjustable time interval between pulses of not less than the time period of a basic system operating cycle providing for a single memory cycle and logical operations of said logical circuit means, and delay line circuit means comprising first and second sections, said first section being coupled to the output of said clock pulse forming means and including means responsive to said clock pulses to produce a basic system cycle including timing signals for timing certain operations of said logical circuit means and providing for initiating a memory cycle, and both said first and second sections being coupled to said input to inhibit the forming of a clock pulse at said output during the time periods of the system cycles; said delay line circuit means further including gating circuit means interconnecting said first and second sections to provide for coupling said clock pulses from said first section to said second section to provide a long system cycle; and control circuit means coupled to said gating circuit means for controlling said gating circuit means to provide for passing said clock pulse to said second delay line section in order to extend the time duration of the system cycle to include a subsequent memory cycle, and said second delay line section including means responsive to said clock pulse to produce a timing pulse for initiating a memory cycle in said memory.

6. A data processing system, the combination comprising: logical circuit means for processing data; memory means for magnetically storing data; timing circuit means for producing a first series of timing pulses to produce a basic system operating cycle including a read-restore memory cycle of said memory means and logical operations of said logical circuit means for processing data, and a second series of pulses to produce a long system operating cycle including read-restore and a clear-write memory cycle and logical operations of said logical circuit means for processing data; control circuit means having inputs and outputs coupled to said logical circuit means, said control circuit means being constructed and arranged to provide control signals for controlling said system to produce successive system operating cycles of said data processing system for processing data by said logical circuit means, said logical circuit means being responsive to predetermined control signals to provide logical operations in each system cycle to process said data in successive system operating cycles and said timing circuit means being responsive to at least one of said control signals to provide timing pulses in a short time interval of a basic system operating cycle to time logical operations of the logical circuit means and to provide a memory timing pulse for producing said read-restore memory cycle for accessing data from said memory means, and said timing circuit means being responsive to control signals produced by said control circuit means to extend said basic system cycle to provide a long system cycle including a timing signal for producing said clear-write memory cycle after performance of said logical operations in order to store the data processed by logical operations including logical operations performed in the long system cycle.

7. A data processing system for performing logical operations upon data in successive operating cycles comprising: logical circuit means for performing logical operations upon data supplied thereto, said logical circuit means including first logical storage means for storing data to be logically operated on and second logical storage means for storing the results of said logical operations on said data; data storage means including accessing means capable of supplying data signals from any one of a plurality of locations therein to said first logical storage means during each operation cycle; control means including accessing means capable of supplying control signals from any one of a plurality of locations therein to said logical circuit means during each operating cycle; timing means for initiating each of said successive operating cycles and controlling the timing of logical operations in each of said cycles, said timing means including circuit means for producing a plurality of spaced timing signals including a logic pulse during each of said operating cycles; first timing circuit means coupling a first one of said plurality of timing signals to said control means to enable said control means to supply said control signals to said logical circuit means; second timing circuit means coupling a second one of said spaced timing signals to said data storage means to enable said data storage means to access and supply data signals from any one of the plurality of locations therein to said first storage means; and logical timing circuit means coupling said logic pulse to said second logical storage means to enable said second logical storage means to store the results of the logical operations performed under the control of said control means, said logic pulse being spaced in time to provide sufficient time for completion of said logical operations on the data stored in said first logical storage means in each operating cycle.

8. A data processing system for performing logical operations upon data in successive operating cycles comprising: logical circuit means for performing logical operations upon data supplied thereto, said logical circuit means including first storage means for storing data to be logically operated on and second storage means for storing the results of said logical operations on said data; a magnetic thin-film main memory providing internal storage for data to be processed, said memory including data accessing means capable of supplying data signals from any one of a plurality of locations therein to said first storage means during each operating cycle; control means including accessing means capable of supplying control signals from any one of a plurality of locations therein to said logical circuit means during each operating cycle; processor timing means for initiating each of said successive operating cycles and controlling the overall timing of accessing data from said memory and timing of logical operations on accessed data in each of said cycles, said timing means including delay line circuit means for producing a plurality of spaced timing signals including a logic pulse during each of said operating cycles; first timing circuit means coupling a first one of said plurality of timing signals to said control means to enable said control means to supply said control signals to said logical circuit means for controlling the logical operations to be performed on data accessed from said memory during each operating cycle; second timing circuit means coupling a second one of said spaced timing signals to said memory data accessing means to enable said accessing means to access and supply data signals from any one of the plurality of locations therein to said first storage means; and logical timing circuit means coupling said logic pulse to said second storage means to enable said second storage means to store the results of the logical operations performed under the control of said control means, said logic pulse being spaced in time to provide sufficient time for completion of said logical operations on the data stored in said first storage means in each operating cycle.

9. A data processing system for performing logical operations upon data in successive operating cycles including basic operating cycles and long operating cycles comprising: logical circuit means for performing logical processing operations upon data supplied thereto said logical circuit means including first electronic storage means for storing data to be logical operated on and second electronic storage means for storing the results of said logical operations on said data; a magnetic thin-film main memory providing internal storage for account numbers and data for said accounts to be processed in successive operating cycles, said memory including accessing means capable of reading-out data and supplying data signals from any one of a multiplicity of word storage locations therein to said first electronic storage means and restore said data in a read-restore cycle of said memory, and clear data from any one of said locations and writeback data from said second electronic storage means in said cleared location in a clear-write cycle of the memory during a long operating cycle; control means capable of supplying control signals to said memory and logical circuit means during each operating cycle; processor timing means for initiating each of said successive operating cycles and controlling the overall timing of the memory cycles and timing of logical operations in each of said cycles, said timing means including circuit means for producing a plurality of spaced timing signals including a logic pulse and a first memory timing signal during each of said operating cycles and a second memory timing signal during long operating cycles only; first timing circuit means coupling a control timing signal to said control means at the beginning of each operating cycle to enable said control means to supply predetermined control signals to said logical circuit means for controlling the logical operations to be performed on data during each operating cycle and supply predetermined control signals to said memory to initiate read-restore and clear-write memory cycles; second timing circuit means coupling said first memory timing signal to said memory to enable said memory accessing means to access and supply data signals from any one of the plurality of locations therein to said first storage means during a read-restore memory cycle; logical timing circuit means coupling said logic pulse to said second storage means to enable said second storage means to store the results of the logical operations produced in response to control signals of said contorl means, said logic pulse being spaced in time to provide sufficient time for completion of said logical operations on the data stored in said first logical storage means; and third timing means coupling said second memory timing signal to said memory to enable said accessing means to clear any storage location and write processed data therein from said second storage means.

10. In a data processing system, the combination comprising: a processor capable of processing data in a plurality of operating cycles; processor timing means for initiating a processor cycle and for providing timing signals during each initiated processor cycle, said processor timing means including first and second delay lines; a plurality of tapped points along each said delay line from which said timing signals are derived; pulse generator means for applying a pulse to said first delay line to initiate a processor cycle; a plurality of summing diodes located at spaced points along at least said first delay line, amplifier-shaper circuit means cooperating with said delay lines to control the amplitude and shape of a pulse propagated there along; means summing the outputs of said summing diodes and applying the summed output thereof to said pulse generator means, the spacing of said diodes and the shaping provided by said amplifier-shaper circuit means being such that an output signal appears at the summed output of said diodes when a pulse is being propagated in said delay line, said output signal being chosen in conjunction with said pulse generator to inhibit the generation of a new pulse thereby; and gating means interconnecting said first and second delay lines for blocking said pulse from the first delay line to said second delay line to inhibit generation of timing signals from tapped points along said second delay line.

11. The combination in accordance with claim 10, wherein means are provided operating in parallel with said output signal for producing a signal which will also inhibit said pulse generator.

12. The combination in accordance with claim 10, wherein means are provided operating in parallel with said output signal for delaying the generation of a new pulse by said pulse generator for a predetermined time after said output signal no longer appears so as to provide a slower operating rate for said processor for use with a slower operating peripheral unit.

13. The combination in accordance with claim 10, wherein said second delay line is operated in series with said first delay line for producing timing signals for a long operating cycle.

14. The combination according to claim 13, in which timing signals derived from taps of said first delay line include a memory timing signal for timing a read-restore memory cycle in an operating cycle and timing signals derived from taps of said second delay line include a memory timing signal for timing a clear-write memory cycle in a long operating cycle.

15. A data processing system for processing data in successive system operating cycles comprising: a data processor including logical circuit means for performing logical operations for processing said data in successive operating cycles, and first electronic storage means for storing said data for processing and second electronic storage means for receiving and storing data after said logical operations; memory storage means including individually addressable storage locations for storing data, said memory storage means being constructed and arranged to access and transfer said data from any addressed storage location therein to said first storage means for processing thereof in a read memory cycle of said memory storage means, and transfer processed data from said second electronic storage means to any addressed storage location in a write memory cycle of said memory storage means; system timing means including timing pulse circuit means; said timing pulse circuit means being constructed and arranged to produce timing pulses and coupling said pulses to said data processor for timing the logical operations for processing data, and to produce separate memory timing pulses for said memory storage means for initiating a read memory cycle and a write memory cycle, and controlling the time duration of the system operating cycle to terminate the system operating cycle after performance of the logical operations and read memory cycle in those system operating cycles in which a write memory cycle is not to be performed and extend the time duration of system operating cycles in which a write memory cycle is to be performed to include the time period of said write memory cycle; and program control circuit means producing program control signals at the beginning of the system operating cycles and coupling said program control signals to said logical circuit means, said logical circuit means being responsive to the program control signals produced during the respective system operating cycles to provide the logical operations required each system cycle to process the data and to control the system timing means to provide memory cycles and both basic and long system operating cycles as required in the processing of data accessed from said memory storage means for processing and returned to the memory storage after processing, 16. A data processing system for processing data in successive system operating cycles comprising: a data processor including logical circuit means for performing logical operations for processing said data in said successive operating cycles, and first electronic storage means for storing said data for processing and second electronic storage means for receiving and storing data after said logical operations; a magnetic thin-film memory providing internal storage locations for all data to be processed in thin-film elements having single domain switching characteristics, said memory including memory accessing means for accessing any addressable storage location in said memory, said memory accessing means being constructed and arranged to access and transfer said data at high speed from any addressed storage location therein to said first storage means for processing thereof in a read memory cycle of said memory, and transfer processed data from said second electronic storage means to any addressed storage location in a write memory cycle of said memory; system timing means including timing pulse circuit means, said timing pulse circuit means being constructed and arranged to produce timing pulses and coupling said pulses to said data processor for timing the logical operations for processing data, and to produce separate read and write memory timing pulses for said memory, said read memory timing pulse being coupled to said memory accessing means to initiate a read memory cycle and said write memory pulse being coupled to said memory accessing means to initiate a write memory cycle, and each of said memory timing pulses having substantially the same duration as any one memory cycle and said read memory timing pulse being positioned in time in the system operating cycle to terminate operation of said accessing means after performance of the logical operations for a read memory cycle to enable said accessing means to be made operative by said write timing pulse to store data at a different addressed location in the memory in system operating cycles in which a write memory cycle is to be performed; and program control circuit means producing program control signals at the beginning of the system operating cycles and coupling said program control signals to said logical circuit means, said logical circuit means being responsive to the program control signals produced during the respective system operating cycles to provide the logical operations required each system cycle to process the data and to control the system timing means to provide memory cycles and both basic and long system operating cycles as required in the processing of data accessed from said memory storage means for processing and returned to the memory storage after processing.

18. A data processing system for processing data in successive system operating cycles comprising a memory including individually addressable storage locations for storing data, said memory being constructed and arranged to access any addressed storage location therein in any memory cycle including read-restore memory cycle or a clear-write memory cycle; a data processor including address storage means and data storage means and logical circuit means for performing logical operations for processing said data in successive operating cycles; said address storage means including read address storage means for supplying a read address to said memory and write address storage means for supplying a write address to said memory and said data storage means including a read data storage means for storing data read out of said memory and a write data storage register for storing data to be written into said memory; system timing means including timing circuit means for producing timing signals and coupling said timing signals to said logical circuit means for timing the logical operations performed during each system operating cycle, and capable of producing read-restore and clear-write memory timing signals, each having a time duration substantially equal to said memory cycle and coupling said read-restore memory signal to said read address storage means to gate the address stored in said read address storage means to said memory during each read-restore memory cycle to read out data from the addressed storage location to said read data storage means, and gate the address stored in the write address storage means to said memory during each clear-write memory cycle to write data in the memory from the write data storage means; memory timing control circuit means including clock pulse circuit means coupled to said processor timing circuit means and responsive to any of said memory timing signals to produce a memory clock pulse for initiating a memory cycle, said memory timing control circuit means including delay line circuit means coupled to said clock pulse circuit means and responsive to said clock pulse for producing a series of memory timing pulses for timing the read-restore and clear-write operations in memory cycles for reading out and restoring, and clearing and writing data at any addressed storage location specified by the respective read address storage means and write address storage means, respectively.

17. A data processing system for processing data in successive system operating cycles comprising: a data processor including address and data storage means and logical circuit means for performing logical operations for processing said data in successive operating cycles; a memory including individually addressable storage locations for storing data and memory timing control means, said memory being coupled to said address storage means and constructed and arranged to access data from any addressed storage location therein specified by an address stored in said address storage means and supply said data to said data storage means for processing by said logical circuit means, in a memory cycle under control of said memory timing control means; system timing means including processor timing circuit means having timing signal outputs including memory timing signal outputs, said processor timing circuit means producing processor timing signals and memory timing signals and coupling at least one of said timing signal outputs to said logical circuit means for timing the logical operations performed during each system operating cycle, and coupling said memory timing signal outputs and memory signals, each having a time duration substantially equal to any one memory cycle, to said address storage means to gate the address stored in said address storage means to said memory during each of said memory cycles; said memory timing control means including clock pulse circuit means coupled to said processor timing circuit means and responsive to said memory timing signals to produce memory clock pulses for initiating memory cycles in said memory, said memory timing control means further including circuit means coupled to said clock pulse circuit means and responsive to said clock pulses for producing a series of memory timing pulses for timing read and write operations of the memory for reading out and writing back data at any addressed storage location specified by said address storage means.

19. A data processing system comprising: logical circuit means for performing logical operations on data in successive operating cycles; control means coupled to said logical circuit means for controlling the logical operations of said processing system, a thin-film magnetic memory comprising a plurality of thin-film magnetic bistable elements each having a substantially square-loop hysteresis characteristic, winding means coupled to each element, means coupled to said winding means so as to form a plurality of word lines each of which couples a different plurality of elements constituting a plurality of multi-bit words, means also coupled to said winding means so as to form a plurality of sense-digit lines each coupling a plurality of elements on different word lines which represent the same respective bit of a word, driving means cooperating with said word lines and said sense-digit lines so as to permit applying a magnetic coercive effect sufficient to switch all of the elements coupled to a selected word line to one bistable state during a reading operation and selected ones of the elements coupled to the same word line to the other bistable state during a writing operation following after the reading operation while causing the states of the elements on unselected word lines to remain undisturbed during such reading and writing operations, means coupled to said sense-digit lines for selecting predetermined ones thereof so as to permit discrimination between output signals from elements corresponding to a selected one of the words on the selected word line and those corresponding to unselected words on the selected word line, means also coupled to said sense-digit lines for causing elements of unselected words on the selected word line to be returned during said writing operation to the same bistable state in which they resided prior to said reading operation while permitting elements of the selected word on the selected word line to either be returned during said writing operation to the same bistable state in which they resided prior to said reading operation or to have new data written therein, a read data storage register for storing the selected word of data read out of said memory, and a write data storage register for supplying a word of new data written into said memory.

20. The data processing system in accordance with claim 19, wherein said bistable elements are formed of a magnetic thin-film having a thickness sufficiently small so that the thin-film exhibits single domain switching properties.

21. In a data processing system, a processor capable of processing data in a plurality of self-sequencing system operating cycles including system cycles of short and long duration, each of said system cycles including logical operations and control thereof for performance of predetermined logical operations of each of the individual operation blocks of a command for processing of data in said system; an internal main memory capable of being accessed a plurality of times by said processor in any desired one of said system operating cycles; means cooperating with said memory to provide access thereto in discrete memory cycles, each memory cycle having a duration of the same order as a short system operating cycle; timing means coupled to said processor and to said memory, said timing means producing timing signals for initiating system operating cycles of short and long duration including a single memory cycle for reading out words of data or a plurality of successive memory cycles including a memory cycle for writing new words of data; and control means for said system including means coupled to said timing means to inhibit said timing signals for initiating system operating cycles for a time perod of said long duration to thereby selectively extend the duration of said system operating cycles of short duration in order to include said successive memory cycles.

22. The data processing system according to claim 21 in which said control means provide for initiating a memory cycle in said memory for reading-out and restoring data at any first storage location therein in the time period of a short system operating cycle and for initiating another memory cycle for clearing and writing data in said memory, said accessing means further including means for accessing a different storage location from said first storage location during any operating cycle of extended duration including said memory cycle for clearing and writing data.

23. A data processing system for performing logical operations on data according to a command in successive system operating cycles, comprising: a large capacity, internal main memory for storing a large number of words of data in individually addressable word storage locations, said memory comprising an array of magnetic thin-film elements having single domain switching properties and accessing circuit means for reading-out and restoring a word of data at any selected one of said word storage locations in a first memory cycle for performing logical operations thereon after read-out and during said restoring of the word of data in said memory in said first memory cycle; logical circuit means for performing logical operations on words of data read out of said memory; a data storage register coupled to said memory and to said logical circuit means for providing temporary storage of the words of data read out of said memory from any selected word location during said first memory cycle; timing control means providing timing signals for timing the logical operations of said processing system and timing of said main memory during each system operating cycle including successive first and second memory cycles in predetermined system operating cycles extended in duration to include second memory cycles for clearing and writing any words of data stored in said data storage register, said first memory cycle being a continuous read-out and restore such that a second memory cycle is required to store said word of data including modifications thereof resulting from said logical operations performed during said first memory cycle; and program control means coupled to said logical circuit means and data storage register for controlling the operations thereof for processing data accessed from said memory and coupled to said timing control means for extending the time duration of said predetermined system operating cycles to include a second memory cycle.

24. In a data processing system, the combination comprising: a large capacity, thin-film main memory providing individually addressable storage locations for words of data to be processed by said system, said main memory comprising a plurality of individual three-dimensional matrices, each matrix comprising an array of magnetic thin-film elements having single domain switching properties disposed in alignment in a plane to form a three-dimensional array; selective circuit means including driver means capable of being coupled to at least any one word group of said thin-film elements of said matrices for magnetically switching of thin-film elements of any selected word group comprising at least one word storage location for memory operations including reading-out and writing-back data; output means for sensing the magnetic switching of any of said elements of said group during read-out to produce data signals for at least one word; input-output data storage circuit means coupled to said output means for temporarily storing said data signals for said word during performance of logical operations thereon; logical circuit means coupled to said data storage circuit means for performing said logical operations on any word of data stored in the data storage means during writing-back of said word; and control circuit means coupled to said data storage means and logical circuit means for controlling said memory operations and performance of said logical operations on any word of data stored in said data storage circuit means to be concurrent with writing-back of said data in said storage means and the other words of said word group.

25. In a data processing system, the combination comprising: an internal main memory for said data processing system including a plurality of matrices for magnetically storing individually accessible words of data therein, each matrix including an array of bistable magnetic thin-film elements having single domain switching properties and internal circuit means inductively coupled to said elements for applying magnetic fields to a plurality of data elements for at least one word location and producing output data signals during a change in state of said bistable elements in response to said magnetic fields; selective circuit means for individually accessing any selected word group of thin-film elements in said matrices, said selective circuit means including driver means coupled to said internal circuit means for selectively producing said magnetic fields for said thin-film elements for at least any one selected word group to produce output data signals representing said words of data during read-out, said internal circuit means including means for restoring said words of data of the selected group; logical circuit means for performing a plurality of different logical operations on data, said logical circuit means being coupled to said internal circuit means for receiving said output data signals and performing logical operations thereon during restoring of said words of data; and control means for controlling the operation of said memory and said logical circuit means to selectively access different words of data and selectively perform different logical operations on said data during the restoring of said words of data of said selected group.

26. In a data processing system, the combination comprising: a data processor including logical circuit means for performing logical operations of a command on words of data in a controllable number of successive system operating cycles; a high speed thin-film internal main memory having a storage capacity for approximately 20,000 words of data or more for processing by said logical operations of said logical circuit means, said main memory including word storage locations consisting of thin-film elements having single domain switching properties capable of being switched at high speeds to provide high speed access to said storage locations for reading-out words of data stored therein or writing new words of data therein in a memory cycle; timing means coupled to said logical circuit means and to said memory, said timing means producing timing signals for initiating system operating cycles of different time durations including a single memory cycle for reading-out words of data or a plurality of successive memory cycles including a memory cycle for writing new words of data; and control means coupled to said logical circuit means and providing control signals for controlling the logical operations performed on said words of data, said control means being coupled also to said timing means to selectively extend the system operating cycle to include a plurality of successive memory cycles in said memory and to said memory for producing control signals for selectively producing said memory cycles in said system operating cycles.

27. The data processing system according to claim 26 in which said thin-film memory is constructed and arranged to provide for accessing data from a plurality of word storage locations and selection means are provided to select the word of data to be logically operated on by said logical circuit means.

28. The data processing system according to claim 26 in which said thin-film memory includes circuit means for reading-out words from a plurality of word storage locations, writing-in a new word of data in a selected one of said word storage locations and restoring the other words of data in their respective word storage locations.

29. A data processing system for processing data in successive system operating cycles, the combination comprising: a large capacity, thin-film internal main memory storing words of data to be processed in a multiplicity of individually accessible word storage locations, each word storage location consisting of a plurality of magnetic thin-film elements having single domain switching properties to provide high-speed read and write operations of the main memory; a small capacity, thin-film scratch-pad memory storing words of data in word storage locations therefor, each word storage location consisting of a plurality of magnetic thin-film elements having single domain switching properties to provide high-speed read and write operations of the scratch-pad memory; memory timing means including individual memory timing circuit means for each of said memories for producing timing pulses during each operating cycle for timing the read and write operations of said main memory and scratch-pad memory in order to provide for individual cycles of operation of said memories; and processor means including arithmetic means for performing arithmetic operations on data supplied from said internal main memory and said scratch-pad memory in predetermined system operating cycles, said processor further including processor timing means and control means for processing said data in system operating cycles of short or long duration including respective time periods for one or successive cycles respectively of said main memory or said scratch-pad memory; said control means including gating circuit means coupling said individual timing circuit means to said main memory and scratch-pad memory, respectively, to provide for separate or concurrent operations of said main memory and said scratch-pad memory.

30. In a data processing system, the combination comprising: a plurality of at least first and second memories, each memory including accessing means for providing individual access to word storage locations in respective memories during memory cycles thereof, first and second address storage registers for respective memories for storing addresses for said word storage locations, first and second data storage registers for respective memories for storing data being read out or written into said memories; logical circuit means coupling said first address storage register and said second data storage register to said accessing means for said first memory; and control means coupled to said logical circuit means for selectively gating the desired address stored in said first address storage register or second data storage register to said accessing mean for said first memory to access the word storage location therein at said desired address during a memory cycle of said first memory.

31. In a data processing system, the combination according to claim 30 in which said first and second memories comprise an internal main memory and a scratch-pad memory respectively, and said first and second memories are capable of being operated concurrently to access word storage locations therein.

32. The combination in accordance with claim 31 in which said data processing sytem is operative to process data in successive system operating cycles, and said control means includes means for selectively gating the address stored in the first address register to said accessing means for said main memory during the first memory cycle of successive memory cycles in a single system operating cycle for accessing the data at the word storage location of the main memory at the address stored in said first address storage register, and gating the address stored in said second data storage register for said scratch-pad memory during the following memory cycle for accessing the word location in the main memory at the address stored in said second data register for moving data to different word storage locations in said main memory during a single system operating cycle.

References Cited

UNITED STATES PATENTS

| 3,061,192 | 10/1966 | Terzian | 235—157 |
| 3,223,980 | 12/1965 | Gunderson | 340—172.5 |
| 3,332,069 | 7/1967 | Joseph | 340—172.5 |
| 3,334,333 | 8/1967 | Gunderson | 340—172.5 |

PAUL J. HENON, *Primary Examiner.*

I. S. KAVRUKOV, *Assistant Examiner.*